US011133134B2

(12) United States Patent
Strauss et al.

(10) Patent No.: US 11,133,134 B2
(45) Date of Patent: Sep. 28, 2021

(54) SIMPLE ROUTE TO HIGHLY CONDUCTIVE POROUS GRAPHENE FROM CARBON NANODOTS FOR SUPERCAPACITOR APPLICATIONS

(71) Applicant: The Regents of the University of California, Oakland, CA (US)

(72) Inventors: Volker Strauss, Los Angeles, CA (US); Richard B. Kaner, Pacific Palisades, CA (US); Maher F. El-Kady, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 16/033,266

(22) Filed: Jul. 12, 2018

(65) Prior Publication Data

US 2019/0019630 A1    Jan. 17, 2019

Related U.S. Application Data

(60) Provisional application No. 62/532,684, filed on Jul. 14, 2017.

(51) Int. Cl.
| | |
|---|---|
| *H01G 11/36* | (2013.01) |
| *H01G 11/24* | (2013.01) |
| *C01B 32/184* | (2017.01) |
| *H01G 11/86* | (2013.01) |
| *H01G 11/32* | (2013.01) |

(Continued)

(52) U.S. Cl.
CPC .......... *H01G 11/36* (2013.01); *C01B 32/184* (2017.08); *H01G 11/24* (2013.01); *H01G 11/32* (2013.01); *H01G 11/86* (2013.01); *B82Y 30/00* (2013.01); *B82Y 40/00* (2013.01);
(Continued)

(58) Field of Classification Search
CPC ........ H01G 11/36; H01G 11/32; H01G 11/24; H01G 11/86; C01B 32/184
See application file for complete search history.

(56) References Cited

U.S. PATENT DOCUMENTS

| | | | |
|---|---|---|---|
| 2,800,616 | A | 7/1957 | Becker |
| 3,288,641 | A | 11/1966 | Rightmire |

(Continued)

FOREIGN PATENT DOCUMENTS

| | | |
|---|---|---|
| CN | 100372035 C | 2/2008 |
| CN | 101723310 A | 6/2010 |

(Continued)

OTHER PUBLICATIONS

Garg et al., May 26, 2017, Nanowire-Mesh-Templated Growth of Out-of-Plane Three-Dimensional Fizzy Graphene, ACS Nano, 11, 6, 6301-6311 (Year: 2017).*

(Continued)

*Primary Examiner* — David M Sinclair
(74) *Attorney, Agent, or Firm* — Withrow & Terranova, P.L.L.C.

(57) ABSTRACT

Disclosed herein are methods and compositions directed to a promising class of nanomaterials called organic nanoparticles, or carbon nanodots. The present disclosure provides a facile method for the conversion of biomolecule-based carbon nanodots into high surface area three-dimensional graphene networks with excellent electrochemical properties.

27 Claims, 14 Drawing Sheets

(51) Int. Cl.
  *B82Y 40/00* (2011.01)
  *B82Y 30/00* (2011.01)
(52) U.S. Cl.
  CPC ...... *C01B 2204/22* (2013.01); *C01B 2204/32* (2013.01); *C01P 2006/16* (2013.01)

(56) References Cited

U.S. PATENT DOCUMENTS

| | | |
|---|---|---|
| 3,536,963 A | 10/1970 | Boos |
| 3,652,902 A | 3/1972 | Hart et al. |
| 4,327,157 A | 4/1982 | Himy et al. |
| 4,645,713 A | 2/1987 | Shioya et al. |
| 5,143,709 A | 9/1992 | Labes |
| 5,225,296 A | 7/1993 | Ohsawa et al. |
| 5,442,197 A | 8/1995 | Andrieu et al. |
| 5,744,258 A | 4/1998 | Bai et al. |
| 6,043,630 A | 3/2000 | Koenck et al. |
| 6,117,585 A | 9/2000 | Anani et al. |
| 6,252,762 B1 | 6/2001 | Amatucci |
| 6,356,433 B1 | 3/2002 | Shi et al. |
| 6,451,074 B2 | 9/2002 | Bluvstein et al. |
| 6,510,043 B1 | 1/2003 | Shiue et al. |
| 6,522,522 B2 | 2/2003 | Yu et al. |
| 6,982,517 B2 | 1/2006 | Reineke et al. |
| 7,623,340 B1 | 11/2009 | Song et al. |
| 7,833,663 B2 | 11/2010 | Phillips et al. |
| 7,875,219 B2 | 1/2011 | Zhamu et al. |
| 8,315,039 B2 | 11/2012 | Zhamu et al. |
| 8,503,161 B1 | 8/2013 | Chang et al. |
| 8,593,714 B2 | 11/2013 | Agrawal et al. |
| 8,753,772 B2 | 6/2014 | Liu et al. |
| 8,771,630 B2 | 7/2014 | Wu et al. |
| 8,828,608 B2 | 9/2014 | Sun et al. |
| 8,906,495 B2 | 12/2014 | Chen |
| 8,951,675 B2 | 2/2015 | Bhardwaj et al. |
| 9,118,078 B2 | 8/2015 | Huang et al. |
| 9,295,537 B2 | 3/2016 | Cao |
| 9,437,372 B1 | 9/2016 | Zhamu et al. |
| 2002/0136881 A1 | 9/2002 | Yanagisawa et al. |
| 2002/0160257 A1 | 10/2002 | Lee et al. |
| 2003/0013012 A1 | 1/2003 | Ahn et al. |
| 2003/0169560 A1 | 9/2003 | Welsch et al. |
| 2004/0090736 A1 | 5/2004 | Bendale et al. |
| 2004/0099641 A1 | 5/2004 | Mathieu et al. |
| 2004/0131889 A1 | 7/2004 | Leddy et al. |
| 2005/0153130 A1 | 7/2005 | Long et al. |
| 2006/0121342 A1 | 6/2006 | Sano et al. |
| 2006/0201801 A1 | 9/2006 | Bartlett et al. |
| 2006/0207878 A1 | 9/2006 | Myung et al. |
| 2006/0269834 A1 | 11/2006 | West et al. |
| 2007/0172739 A1 | 7/2007 | Visco et al. |
| 2007/0204447 A1 | 9/2007 | Bernstein et al. |
| 2008/0090141 A1 | 4/2008 | Meitav et al. |
| 2008/0158778 A1 | 7/2008 | Lipka et al. |
| 2008/0180883 A1 | 7/2008 | Palusinski et al. |
| 2008/0199737 A1 | 8/2008 | Kazaryan et al. |
| 2008/0220293 A1 | 9/2008 | Marmaropoulos et al. |
| 2008/0265219 A1 | 10/2008 | Whitehead et al. |
| 2009/0059474 A1 | 3/2009 | Zhamu et al. |
| 2009/0117467 A1 | 5/2009 | Zhamu et al. |
| 2009/0289328 A1 | 11/2009 | Tanioku |
| 2009/0290287 A1 | 11/2009 | Lipka et al. |
| 2010/0159346 A1 | 6/2010 | Hinago et al. |
| 2010/0159366 A1 | 6/2010 | Shao-Horn et al. |
| 2010/0195269 A1 | 8/2010 | Kim et al. |
| 2010/0203362 A1 | 8/2010 | Lam et al. |
| 2010/0221508 A1 | 9/2010 | Huang et al. |
| 2010/0226066 A1 | 9/2010 | Sweeney et al. |
| 2010/0237296 A1 | 9/2010 | Gilje |
| 2010/0266964 A1 | 10/2010 | Gilje |
| 2010/0273051 A1 | 10/2010 | Choi et al. |
| 2010/0317790 A1 | 12/2010 | Jang et al. |
| 2011/0026189 A1 | 2/2011 | Wei et al. |
| 2011/0111283 A1 | 5/2011 | Rust, III et al. |
| 2011/0111299 A1 | 5/2011 | Liu et al. |
| 2011/0143101 A1 | 6/2011 | Sandhu |
| 2011/0159372 A1 | 6/2011 | Zhamu et al. |
| 2011/0163274 A1 | 7/2011 | Plee et al. |
| 2011/0163699 A1 | 7/2011 | Elder et al. |
| 2011/0183180 A1 | 7/2011 | Yu et al. |
| 2011/0227000 A1 | 9/2011 | Ruoff et al. |
| 2011/0242730 A1 | 10/2011 | Zhou et al. |
| 2011/0256454 A1 | 10/2011 | Nicolas et al. |
| 2011/0318257 A1 | 12/2011 | Sokolov et al. |
| 2012/0111730 A1 | 5/2012 | Choi et al. |
| 2012/0129736 A1 | 5/2012 | Tour et al. |
| 2012/0134072 A1 | 5/2012 | Bae et al. |
| 2012/0145234 A1 | 6/2012 | Roy-Mayhew et al. |
| 2012/0300364 A1 | 11/2012 | Cai et al. |
| 2012/0313591 A1 | 12/2012 | Brambilla et al. |
| 2013/0026409 A1 | 1/2013 | Baker et al. |
| 2013/0048949 A1 | 2/2013 | Xia et al. |
| 2013/0056346 A1 | 3/2013 | Sundara et al. |
| 2013/0056703 A1 | 3/2013 | Elian et al. |
| 2013/0100581 A1 | 4/2013 | Jung et al. |
| 2013/0155578 A1 | 6/2013 | Tsai et al. |
| 2013/0161570 A1 | 6/2013 | Hwang et al. |
| 2013/0168611 A1 | 7/2013 | Zhou et al. |
| 2013/0171502 A1 | 7/2013 | Chen et al. |
| 2013/0180912 A1 | 7/2013 | Li |
| 2013/0182373 A1 | 7/2013 | Yu et al. |
| 2013/0189602 A1 | 7/2013 | Lahiri et al. |
| 2013/0217289 A1 | 8/2013 | Nayfeh et al. |
| 2013/0230747 A1 | 9/2013 | Patolsky et al. |
| 2013/0264041 A1 | 10/2013 | Zhamu et al. |
| 2013/0266858 A1 | 10/2013 | Inoue et al. |
| 2013/0280601 A1 | 10/2013 | Geramita et al. |
| 2013/0314844 A1 | 11/2013 | Chen et al. |
| 2013/0330617 A1 | 12/2013 | Yoshimura et al. |
| 2014/0029161 A1 | 1/2014 | Beidaghi et al. |
| 2014/0030590 A1 | 1/2014 | Wang et al. |
| 2014/0045058 A1 | 2/2014 | Zhao et al. |
| 2014/0050947 A1 | 2/2014 | Donnelly |
| 2014/0065447 A1 | 3/2014 | Liu et al. |
| 2014/0099558 A1 | 4/2014 | Itakura et al. |
| 2014/0118883 A1 | 5/2014 | Xie |
| 2014/0120453 A1 | 5/2014 | Ajayan et al. |
| 2014/0134503 A1 | 5/2014 | Lockett et al. |
| 2014/0154164 A1 | 6/2014 | Chen et al. |
| 2014/0170476 A1 | 6/2014 | Tan et al. |
| 2014/0178763 A1 | 6/2014 | Mettan |
| 2014/0205841 A1 | 7/2014 | Qiu et al. |
| 2014/0255776 A1 | 9/2014 | Song et al. |
| 2014/0255785 A1 | 9/2014 | Do et al. |
| 2014/0287308 A1 | 9/2014 | Okada et al. |
| 2014/0313636 A1 | 10/2014 | Tour et al. |
| 2014/0323596 A1 | 10/2014 | Jeong et al. |
| 2015/0050554 A1 | 2/2015 | Fukumine et al. |
| 2015/0098167 A1 | 4/2015 | El-Kady et al. |
| 2015/0103469 A1 | 4/2015 | Lee et al. |
| 2015/0111449 A1 | 4/2015 | Cruz-Silva et al. |
| 2015/0218002 A1 | 8/2015 | Plomb et al. |
| 2015/0218003 A1 | 8/2015 | Zhamu et al. |
| 2015/0235776 A1 | 8/2015 | Miller |
| 2015/0259212 A1 | 9/2015 | Li et al. |
| 2015/0287544 A1 | 10/2015 | Irazoqui et al. |
| 2015/0311504 A1 | 10/2015 | Hong et al. |
| 2015/0332868 A1 | 11/2015 | Jung et al. |
| 2015/0340171 A1 | 11/2015 | Li et al. |
| 2015/0364738 A1 | 12/2015 | Pope et al. |
| 2015/0364755 A1 | 12/2015 | Liu et al. |
| 2016/0035498 A1 | 2/2016 | Honma et al. |
| 2016/0055983 A1 | 2/2016 | Kurungot et al. |
| 2016/0077074 A1 | 3/2016 | Strong et al. |
| 2016/0099116 A1 | 4/2016 | Yang |
| 2016/0133396 A1 | 5/2016 | Hsieh |
| 2016/0148759 A1 | 5/2016 | El-Kady et al. |
| 2017/0062821 A1* | 3/2017 | Tour .............. H01M 4/587 |
| 2017/0240424 A1* | 8/2017 | Roberts .............. B01J 20/20 |
| 2017/0338472 A1 | 11/2017 | Zhamu et al. |
| 2018/0366280 A1* | 12/2018 | Hwang .............. H01G 11/70 |
| 2019/0006675 A1 | 1/2019 | Cheng et al. |
| 2019/0088420 A1* | 3/2019 | Tour .............. C01B 32/184 |

(56) References Cited

U.S. PATENT DOCUMENTS

| | | |
|---|---|---|
| 2019/0237752 A1 | 8/2019 | El-Kady et al. |
| 2019/0284403 A1 | 9/2019 | Kaner et al. |
| 2020/0090880 A1 | 3/2020 | Kaner et al. |

FOREIGN PATENT DOCUMENTS

| | | | |
|---|---|---|---|
| CN | 101894679 A | 11/2010 | |
| CN | 102187413 A | 9/2011 | |
| CN | 102509632 A | 6/2012 | |
| CN | 102543483 A | 7/2012 | |
| CN | 102923698 A | 2/2013 | |
| CN | 103208373 A | * 7/2013 | |
| CN | 103723715 A | 4/2014 | |
| CN | 203839212 U | 9/2014 | |
| CN | 104299794 A | 1/2015 | |
| CN | 104355306 A | 2/2015 | |
| CN | 104617300 A | 5/2015 | |
| CN | 104637694 A | 5/2015 | |
| CN | 105062074 A | 11/2015 | |
| EP | 1262579 A2 | 12/2002 | |
| EP | 1843362 A1 | 10/2007 | |
| EP | 2088637 A2 | 8/2009 | |
| EP | 2933229 A1 | * 10/2015 | ............ C01B 32/19 |
| JP | S61010855 A | 1/1986 | |
| JP | S62287568 A | 12/1987 | |
| JP | 2002063894 A | 2/2002 | |
| JP | 2003217575 A | 7/2003 | |
| JP | 2004039491 A | 2/2004 | |
| JP | 2004055541 A | 2/2004 | |
| JP | 2004063297 A | 2/2004 | |
| JP | 2005138204 A | 6/2005 | |
| JP | 2005199267 A | 7/2005 | |
| JP | 20050317902 A | 11/2005 | |
| JP | 2006252902 A | 9/2006 | |
| JP | 2007160151 A | 6/2007 | |
| JP | 2009525247 A | 7/2009 | |
| JP | 2010222245 A | 10/2010 | |
| JP | 2011026153 A | 2/2011 | |
| JP | 2011165680 A | 8/2011 | |
| JP | 2012169576 A | 9/2012 | |
| JP | 2012188484 A | 10/2012 | |
| JP | 2013534686 A | 9/2013 | |
| JP | 2014053209 A | 3/2014 | |
| JP | 2014201492 A | 10/2014 | |
| JP | 2015218085 A | 12/2015 | |
| KR | 20070083691 A | 8/2007 | |
| KR | 20080064967 A | 7/2008 | |
| KR | 10-2009-0107498 A | 10/2009 | |
| KR | 1020100114827 B1 | 4/2017 | |
| WO | 9632618 A1 | 10/1996 | |
| WO | 2011019431 A1 | 2/2011 | |
| WO | 2011021982 A1 | 2/2011 | |
| WO | 2011072213 A2 | 6/2011 | |
| WO | 2012006657 A1 | 1/2012 | |
| WO | 2012087698 A1 | 6/2012 | |
| WO | 2012138302 A1 | 10/2012 | |
| WO | 2013024727 A1 | 2/2013 | |
| WO | 2013040636 A1 | 3/2013 | |
| WO | 2013066474 A2 | 5/2013 | |
| WO | 2013070989 A1 | 5/2013 | |
| WO | 2013128082 A1 | 9/2013 | |
| WO | 2013155276 A1 | 10/2013 | |
| WO | 2014011722 A2 | 1/2014 | |
| WO | 2014028978 A1 | 2/2014 | |
| WO | 2014062133 A1 | 4/2014 | |
| WO | 2014072877 A2 | 5/2014 | |
| WO | 2014134663 A1 | 9/2014 | |
| WO | 2014181763 A1 | 11/2014 | |
| WO | 2015023974 A1 | 2/2015 | |
| WO | 2015069332 A1 | 5/2015 | |
| WO | WO-2015069332 A1 | * 5/2015 | ............ H01G 11/46 |
| WO | 2015153895 A1 | 10/2015 | |
| WO | 2015195700 A1 | 12/2015 | |
| WO | 2016094551 A1 | 6/2016 | |
| WO | 2016133571 A2 | 8/2016 | |
| WO | 2016190225 A1 | 12/2016 | |
| WO | 2017035462 A1 | 3/2017 | |

OTHER PUBLICATIONS

Dec. 5, 2012, Shao et al., High-performance flexible asymmetric supercapacitors based on 3D porous graphene/MnO2 nanorod and graphene/Ag hybrid thin-film electrodes, J. Mater. Chem. C, 2013, 1, 1245-1251 (Year: 2012).*

Li et al, Dec. 14, 2007, Carbon nanotubes coated by carbon nanoparticles of turbostratic graphenes,Carbon, vol. 46, Issue 3, Mar. 2008, pp. 434-439 (Year: 2007).*

Acerce, Muharrem et al., "Metallic 1T phase $MoS_2$ nanosheets as supercapacitor electrode materials," Nature Nanotechnology, vol. 10, Mar. 23, 2015, Macmillan Publishers Limited, pp. 1-6.

Allen, Matthew J. et al., "Honeycomb Carbon: A Review of Graphene," Chemical Reviews, vol. 110, Issue 1, Jul. 17, 2009, American Chemical Society, pp. 132-145.

Augustyn, Veronica et al., "High-rate electrochemical energy storage through $Li^+$ intercalation pseudocapacitance," Nature Materials, vol. 12, Jun. 2013, www.nature.com/naturematerials, Macmillan Publishers Limited, pp. 518-522.

Author Unknown, "125 Volt Transportation Module," Maxwell Technologies, retrieved Apr. 13, 2016, website last modified Mar. 14, 2013, www.maxwell.com/products/ultracapacitors/125v-tranmodules, Maxwell Technologies, Inc., 2 pages.

Author Unknown, "ELTON: Super Capactiors," www.elton-cap.com/, Retrieved Apr. 15, 2016, ELTON, 1 page.

Author Unknown, "ELTON: Products and Technology," https://web.archive.org/web/20160306044847/http:/www.elton-cap.com/products/, dated Mar. 6, 2016, retrieved Mar. 15, 2017, ELTON, 2 pages.

Author Unknown, "Monthly battery sales statistics," Battery Association of Japan (BAJ), retrieved Apr. 13, 2016, website last modified Dec. 2010, web.archive.org/web/20110311224259/http://www.baj.or.jp/e/statistics/02.php, Battery Association of Japan, 1 page.

Author Unknown, "Turnigy Graphene Batteries," Batteries & Accessories, https://hobbyking.com/en_us/batteries-accessories/turnigy-graphene-2.html, retrieved Apr. 3, 2017, HobbyKing, 39 pages.

Arthur, Timothy, S. et al., "Three-dimensional electrodes and battery architectures," MRS Bulletin, vol. 36, Jul. 2011, Materials Research Society, pp. 523-531.

Bai, Ming-Hua et al., "Electrodeposition of vanadium oxide-polyaniline composite nanowire electrodes for high energy density supercapacitors," Journal of Materials Chemistry A, vol. 2, Issue 28, Jan. 29, 2014, The Royal Society of Chemistry, pp. 10882-10888.

Beidaghi, Majid, et al., "Capacitive energy storage in micro-scale devices: recent advances in design and fabrication of micro-supercapacitors," Energy and Environmental Science, vol. 7, Issue 3, Jan. 2, 2014, Royal Society of Chemistry, pp. 867-884.

Beidaghi, Majid et al., "Micro-Supercapacitors Based on Interdigital Electrodes of Reduced Graphene Oxide and Carbon Nanotube Composites with Ultra high Power Handling Performance," Advanced Functional Materials, vol. 22, Issue 21, Nov. 2, 2012, Wiley-VCH Verlag GmbH & Co. KGaA, Weinheim, pp. 4501-4510.

Beidaghi, Majid et al.,"Micro-supercapacitors based on three dimensional interdigital polypyrrole/C-MEMS electrodes," Electrochimica Acta, vol. 56, Issue 25, Oct. 30, 2011, Elsevier Ltd., pp. 9508-9514.

Bélanger, Daniel et al., "Manganese Oxides: Battery Materials Make the Leap to Electrochemical Capacitors," Electrochemical Society Interface, vol. 17, Issue 1, Spring 2008, The Electrochemical Society, pp. 49-52.

Bian, Li-Jun et al., "Self-doped polyaniline on functionalized carbon cloth as electroactive materials for supercapacitor," Electrochimica Acta, vol. 64, Dec. 29, 2011, Elsevier Ltd., pp. 17-22.

Bouville, Florian et al., "Strong, tough and stiff bioinspired ceramics from brittle constituents," Nature Materials, vol. 13, Issue 5, Mar. 23, 2014, Macmillan Publishers Limited, pp. 1-7.

(56) References Cited

OTHER PUBLICATIONS

Brain, Marshall et al., "How Batteries Work," Battery Arrangement and Power—HowStuffWorks, http://electronics.howstuffworks.com/everyday-tech/battery6.htm/printable, accessed Dec. 14, 2015, HowStuffWorks, 4 pages.

Burke, Andrew, "R&D considerations for the performance and application of electrochemical capacitors," Electrochimica Acta, vol. 53, Jan. 26, 2007, Elsevier Ltd., pp. 1083-1091.

Cao, Liujun et al., "Direct Laser-Patterned Micro-Supercapacitors from Paintable $MoS_2$ Films," Small, vol. 9, Issue 17, Apr. 16, 2013, Wiley-VCH Verlag GmbH & Co. KGaA, Weinheim, pp. 2905-2910.

Chan, Candace K. et al, "High-performance lithium battery anodes using silicon nanowires," Nature Nanotechnology, vol. 3, Issue 1, Jan. 2008, Nature Publishing Group, pp. 31-35.

Chen, Cheng-Meng et al., "Macroporous 'bubble' graphene film via template-directed ordered-assembly for high rate supercapacitors," Chemical Communications, vol. 48, Issue 57, May 15, 2012, The Royal Society of Chemistry, pp. 1-3.

Chen, Ji et al., "High-yield preparation of graphene oxide from small graphite flakes via an improved Hummers method with a simple purification process," Carbon, vol. 81, Jan. 2015, Elsevier Ltd., pp. 1-9.

Chen, L. Y. et al., "Toward the Theoretical Capacitance of $RuO_2$ Reinforced by Highly Conductive Nanoporous Gold," Advanced Energy Materials, vol. 3, Issue 7, Jul. 2014, Wiley-VCH Verlag GmbH & Co. KGaA, Weinheim, pp. 851-856.

Chen, Wei et al., "High-Performance Nanostructured Supercapacitors on a Sponge," Nano Letters, vol. 11, Issue 12, Sep. 16, 2011, American Chemical Society, 22 pages.

Chen, Zongping et al, "Three-dimensional flexible and conductive interconnected graphene networks grown by chemical vapour deposition," Nature Materials, vol. 10, Issue 6, Jun. 2011, Macmillan Publishers Limited, pp. 424-428.

Cheng, Yingwen et al., "Synergistic Effects from Graphene and Carbon Nanotubes EnableFlexible and Robust Electrodes for High-PerformanceSupercapacitors," Nano Letters, vol. 12, Issue 8, Jul. 23, 2012, American Chemical Society, pp. 4206-4211.

Chi, Kai et al., "Freestanding Graphene Paper Supported Three-Dimensional Porous Graphene—Polyaniline Nanocomposite Synthesized by Inkjet Printing and in Flexible All-Solid-State Supercapacitor," ACS Applied Materials & Interfaces, vol. 6, Issue 18, Sep. 10, 2014, American Chemical Society, 8 pages.

Chmiola, John et al., "Monolithic Carbide-Derived Carbon Films for Micro-Supercapacitors," Science, vol. 328, Issue 5977, Apr. 2010, American Association for the Advancement of Science, 4 pages.

Choi, Bong Gill et al., "3D Macroporous Graphene Frameworks for Supercapacitors with High Energy and Power Densities," ACS Nano, vol. 6, Issue 5, Apr. 23, 2012, American Chemical Society, pp. 4020-4028.

Cooper, A. et al., "The UltraBattery—A new battery design for a new beginning in hybrid electric vehicle energy storage," Journal of Power Sources, vol. 188, Issue 2, Dec. 6, 2008, Elsevier B.V. pp. 642-649.

Deville, Sylvain, "Freeze-Casting of Porous Ceramics: A Review of Current Achievements and Issues," Advanced Engineering Materials, vol. 10, Issue 3, Mar. 20, 2008, Wiley-VCH Verlag GmbH & Co., pp. 155-169.

Deville, Sylvain, "Metastable and unstable cellular solidification of colloidal suspensions," Nature Materials, vol. 8, Dec. 2009, Macmillan Publishers Limited, pp. 966-972.

De Volder, Michaël et al., "Corrugated Carbon Nanotube Microstructures with Geometrically Tunable Compliance," ACS Nano, vol. 5, Issue 9, Aug. 1, 2011, pp. 7310-7317.

Dunn, Bruce et al., "Electrical Energy Storage for the Grid: A Battery of Choices," Science, vol. 334, Issue 928, Nov. 18, 2011, American Association for the Advancement of Science, pp. 928-935.

Eda, Goki et al., "Chemically Derived Graphene Oxide: Towards Large-Area Thin-Film Electronics and Optoelectronics," Advanced Materials, vol. 22, Issue 22, Apr. 28, 2010, Wiley-VCH Verlag GmbH & Co., pp. 2392-2415.

El-Kady, Maher F. et al., "Engineering Three-Dimensional Hybrid Supercapacitors and Micro-Supercapacitors for High-Performance Integrated Energy Storage," Proceedings of the National Academy of Sciences of the United States of America, vol. 112, Issue 14, Apr. 7, 2015, National Academy of Sciences, pp. 4233-4238.

El-Kady, Maher F. et al., "Laser Scribing of High-Performance and Flexible Graphene-Based Electrochemical Capacitors," Science Magazine, Mar. 16, 2012, vol. 335, No. 6074, 6 pages.

El-Kady, Maher F. et al., "Laser Scribing of High-Performance and Flexibile Graphene-Based Electrochemical Capacitors," Science, vol. 335, Issue 6074, Mar. 16, 2012, www.sciencemag.org/cgi/content/full/335/6074/1326/DC1, American Association for the Advancement of Science, 25 pages.

El-Kady, Maher F. et al., "Scalable Fabrication of High-Power Graphene Micro-Supercapacitors for Flexible and On-Chip Energy Storage," Nature Communications, vol. 4, Issue 1475, Feb. 12, 2013, Macmillan Publishers Limited, pp. 1-9.

El-Kady, Maher F. et al., "Supplementary Information: Scalable Fabrication of High-Power Graphene Micro-Supercapacitors for Flexible and On-Chip Energy Storage", Nature Communications, Submitted for Publication: Oct. 1, 2012, 23 pages.

Fan, Zhuangjun et al., "Asymmetric Supercapacitors Based on Graphene/$MnO_2$ and Activated Carbon Nanofiber Electrodes with High Power and Energy Density," Advanced Functional Materials, vol. 21, Issue 12, Jun. 21, 2011, Wiley-VCH Verlag GmbH & Co. KGaA, Weinheim, pp. 2366-2375.

Feng, Jun et al., "Metallic Few-Layered $VS_2$ Ultrathin Nanosheets: High Two-Dimensional Conductivity for In-Plane Supercapacitors," Journal of the American Chemical Society, vol. 133, Issue 44, Sep. 27, 2011, American Chemical Society, pp. 17832-17838.

Fischer, Anne E. et al., "Incorporation of Homogeneous, Nanoscale $MnO_2$ within Ultraporous Carbon Structures via Self-Limiting Electroless Deposition: Implications for Electrochemical Capacitors," Nano Letters, vol. 7, Issue 2, Jan. 13, 2007, American Chemical Society, pp. 281-286.

Foo, Ce Yao et al., "Flexible and Highly Scalable $V_2O_5$—rGO Electrodes in an Organic Electrolyte for Supercapacitor Devices," Advanced Energy Materials, vol. 4, Issue 12, Aug. 26, 2014, Wiley-VCH Verlag GmbH & Co. KGaA, Weinheim, pp. 1-7.

Gan, Shiyu et al., "Spontaneous and Fast Growth of Large-Area Graphene Nanofilms Facilitated by Oil/Water Interfaces," Advanced Materials, vol. 24, Issue 29, Jun. 12, 2012, Wiley-VCH Verlag GmbH & Co, pp. 3958-3964.

Gao, Wei et al., "Direct laser writing of micro-supercapacitors on hydrated graphite oxide films," Nature Nanotechnology, vol. 6, Issue 8, Jul. 2011, Macmillan Publishers Limited, p. 496-500.

Gao, Wei et al., "Direct laser writing of micro-supercapacitors on hydrated graphite oxide films," Supplementary Information, Nature Nanotechnology, vol. 6, Issue 8, Jul. 2011, Macmillan Publishers Limited, 15 pages.

Gao, Hongcai et al., "Flexible All-Solid-State Asymmetric Supercapacitors Based on Free-Standing Carbon Nanotube/Graphene and $Mn_3O_4$ Nanoparticle/Graphene Paper Electrodes," Applied Materials & Interfaces, vol. 4, Issue 12, Nov. 20, 2012, American Chemical Society, pp. 7020-7026.

Gao, Hongcai et al., "High-Performance Asymmetric Supercapacitor Based on Graphene Hydrogel and Nanostructured $MnO_2$," ACS Applied Materials and Interfaces, vol. 4, Issue 5, Apr. 30, 2012, American Chemical Society, pp. 2801-2810.

First Office Action for Canadian Patent Application No. 2,862,806, dated Nov. 22, 2018, 5 pages.

Notification of the First Office Action for Chinese Patent Application No. 201580043429.1, dated Oct. 29, 2018, 19 pages.

International Search Report and Written Opinion for International Patent Application No. PCT/US2018/041728, dated Nov. 9, 2018, 10 pages.

Corrected Notice of Allowability for U.S. Appl. No. 15/319,286, dated Nov. 30, 2018, 5 pages.

(56) References Cited

OTHER PUBLICATIONS

Notice of Reasons for Rejection for Japanese Patent Application No. 2014-561017, dated Mar. 21, 2017, 10 pages.
International Search Report and Written Opinion for PCT/US2013/029022, dated Jun. 26, 2013, 13 pages.
International Preliminary Report on Patentability for PCT/US2013/029022 dated Sep. 18, 2014, 9 pages.
International Search Report and Written Opinion for International Patent Application No. PCT/US2015/036082, dated Aug. 27, 2015, 15 pages.
International Preliminary Report on Patentability for International Patent Application No. PCT/US2015/036082, dated Dec. 29, 2016, 12 pages.
International Search Report and Written Opinion for International Patent Application No. PCT/US2015/061400, dated Mar. 29, 2016, 20 pages.
Invitation to Pay Additional Fees for International Patent Application No. PCT/US2016/067468, dated Feb. 13, 2017, 2 pages.
Conway, B. E., "Chapter 2: Similarities and Differences between Supercapacitors and Batteries for Storing Electrical Energy," Electrochemical Supercapacitors: Scientific Fundamentals and Technological Applications (book), 1999, New York, Springer Science + Business Media, pp. 11-12.
Conway, B. E., "Chapter 3: Energetics and Elements of the Kinetics of Electrode Processes," Electrochemical Supercapacitors: Scientific Fundamentals and Technological Applications (book), 1999, New York, Springer Science + Business Media, pp. 33-34.
Ozawa, Kazunori, "Lithium-Cell System—Nonaqueous Electrolyte System," Lithium Ion Rechargeable Batteries (book), Chapter 1: General Concepts, Section 1.1.2, 2009, Wiley-VCH Verlag GmbH & Co. KGaA, 5 pages.
Root, Michael, "Electric Vehicles," The TAB™ Battery Book: An In-Depth Guide to Construction, Design, and Use (book), Chapter 2: The Many Uses of Batteries, 2011, The McGraw-Hill Companies, 4 pages.
Kaewsongpol, Tanon et al., "High-performance supercapacitor of electrodeposited porous 3Dpolyaniline nanorods on functionalized carbon fiber paper: Effects of hydrophobic and hydrophilic surfaces of conductive carbon paper substrates," Materials Today Communications, vol. 4, Aug. 19, 2015, Elsevier Ltd., pp. 176-185.
Yan, Jun et al., "Preparation of graphene nanosheet/carbon nanotube/polyaniline composite as electrode material for supercapacitors," Journal of Power Sources, vol. 195, Issue 9, Nov. 11, 2009, Elsevier B.V., pp. 3041-3045.
Non-Final Office Action for U.S. Appl. No. 13/725,073, dated Aug. 28, 2017, 41 pages.
Fourth Office Action for Chinese Patent Application No. 201280070343.4, dated Apr. 26, 2017, 22 pages.
Examination Report for European Patent Application No. 12874989.2, dated Jul. 24, 2017, 5 pages.
Notice of Reason for Rejection for Japanese Patent Application No. 2014-548972, dated May 23, 2017, 4 pages.
Second Office Action for Chinese Patent Application No. 201380023699.7, dated Aug. 9, 2017, 8 pages.
Communication pursuant to Article 94(3) EPC for European Patent Application No. 13757195.6, dated Jul. 6, 2017, 3 pages.
International Preliminary Report on Patentability for International Patent Application No. PCT/US2015/061400, dated Jun. 1, 2017, 16 pages.
International Search Report and Written Opinion for International Patent Application No. PCT/US2016/067468, dated Apr. 21, 2017, 10 pages.
International Search Report and Written Opinion for International Patent Application No. PCT/US2017/014126, dated Apr. 20, 2017, 13 pages.
International Search Report and Written Opinion for International Patent Application No. PCT/US2017/024716, dated Jun. 20, 2017, 13 pages.
International Search Report and Written Opinion for International Patent Application No. PCT/US2017/023632, dated May 31, 2017, 11 pages.
International Search Report and Written Opinion for International Patent Application No. PCT/US2017/038992, dated Sep. 21, 2017, 12 pages.
Invitation to Pay Additional Fees for International Patent Application No. PCT/US2017/048883, dated Sep. 29, 2017, 2 pages.
International Search Report and Written Opinion for International Patent Application No. PCT/US2017/048883, dated Dec. 26, 2017, 10 pages.
Non-Final Office Action for U.S. Appl. No. 14/945,232, dated Jan. 29, 2018, 9 pages.
Extended European Search Report for European Patent Application No. 15809519.0, dated Feb. 5, 2018, 10 pages.
Decision on Rejection for Chinese Patent Application No. 201280070343.4, dated Jan. 5, 2018, 18 pages.
Non-Final Office Action for U.S. Appl. No. 15/612,405, dated Feb. 9, 2018, 9 pages.
Decision to Grant a Patent for Japanese Patent Application No. 2014-561017, dated Mar. 13, 2018, 4 pages.
Final Office Action for U.S. Appl. No. 13/725,073, dated Apr. 6, 2018, 37 pages.
Notice of Allowance for U.S. Appl. No. 15/612,405, dated May 16, 2018, 8 pages.
Third Office Action and Search Report for Chinese Patent Application No. 201380023699.7, dated Mar. 9, 2018, 16 pages.
Examination Report for European Patent Application No. 13757195.6, dated Jun. 13, 2018, 7 pages.
Non-Final Office Action for U.S. Appl. No. 15/319,286, dated Jun. 27, 2018, 9 pages.
Final Office Action for U.S. Appl. No. 14/945,232, dated Aug. 10, 2018, 7 pages.
Notification of the First Office Action for Chinese Patent Application No. 201580072540.3, dated Jun. 25, 2018, 14 pages.
Partial Supplementary European Search Report for European Patent Application No. 15861794.4, dated Jun. 28, 2018, 16 pages.
Non-Final Office Action for U.S. Appl. No. 15/382,871, dated Jun. 27, 2018, 11 pages.
International Preliminary Report on Patentability for International Patent Application No. PCT/US2016/067468, dated Jul. 5, 2018, 7 pages.
International Preliminary Report on Patentability for International Patent Application No. PCT/US2017/014126, dated Aug. 2, 2018, 10 pages.
Non-Final Office Action for U.S. Appl. No. 15/472,409, dated Jun. 29, 2018, 11 pages.
Examination Report for European Patent Application No. 13757195.6, dated Jan. 29, 2020, 4 pages.
Office Action for Brazilian Patent Application No. 112016029468, dated Jan. 21, 2020, 6 pages.
Third Office Action for Chinese Patent Application No. 201580043429.1, dated Jan. 3, 2020, 20 pages.
Office Action for Israeli Patent Application No. 249506, dated Dec. 3, 2019, 8 pages.
Office Action for Brazilian Patent Application No. 112017010257, dated Jan. 28, 2020, 7 pages.
First Office Action for Chinese Patent Application No. 2017800076125, dated Nov. 28, 2019, 20 pages.
International Preliminary Report on Patentability for International Patent Application No. PCT/US2018/041728, dated Jan. 23, 2020, 7 pages.
Final Office Action for U.S. Appl. No. 15/466,425, dated Jan. 28, 2020, 8 pages.
Supplemental Notice of Allowability for U.S. Appl. No. 14/945,232, dated Feb. 12, 2020, 5 pages.
Wang, Xu et al., "Manganese Oxide Micro-Supercapacitors with Ultra-high Areal Capacitance," Electronic Supplementary Material (ESI) for Nanoscale, vol. 5, Mar. 21, 2013, The Royal Society of Chemistry, 6 pages.
Wang, Xuebin et al., "Three-dimensional strutted graphene grown by substrate-free sugar blowing for high-power-density supercapaci-

(56) References Cited

OTHER PUBLICATIONS tors," Nature Communications, vol. 4, Issue 2905, Dec. 16, 2013, Macmillan Publishers Limited, pp. 1-8.
Wassei, Jonathan K et al., "Oh the Places You'll Go with Graphene", Accounts of Chemical Research, Dec. 20, 2012, Vers. 9, 11 pages.
Weng, Zhe et al., "Graphene-Cellulose Paper Flexible Supercapacitors," Advanced Energy Materials, vol. 1, Issue 5, Aug. 10, 2011, Wiley-VCH Verlag GmbH & Co., pp. 917-922.
Wu, Zhong-Shuai et al., "Graphene Anchored with $Co_3O_4$ Nanoparticles as Anode of Lithium Ion Batteries with Enhanced Reversible Capacity and Cyclic Performance," ACS Nano, vol. 4, Issue 6, May 10, 2010, American Chemical Society, pp. 3187-3194.
Xie, Guoxin, "Direct Electrochemical Synthesis of Reduced Graphene Oxide (rGO)/Copper Composite Films and Their Electrical/ Electroactive Properties," Applied Materials & Interfaces, vol. 6, Issue 10, May 1, 2014, American Chemical Society, pp. 7444-7455.
Xu, Bin et al., "Sustainable nitrogen-doped porous carbon with high surface areas prepared from gelatin for supercapacitors," Journal of Materials Chemistry, vol. 22, Issue 36, Jul. 25, 2012, The Royal Society of Chemistry, pp. 19088-19093.
Xu, Jing et al., "Flexible Asymmetric Supercapacitors Based upon $Co_9S_8$ Nanorod//$Co_3O_4$@$RuO_2$ Nanosheet Arrays on Carbon Cloth," ACS Nano, vol. 7, Issue 6, May 6, 2013, American Chemical Society, pp. 5453-5462.
Xu, Yuxi et al., "Flexible Solid-State Supercapacitors Based on Three-Dimensional Graphene Hydrogel Films," ACS Nano, vol. 7, Issue 5, Apr. 4, 2013, American Chemical Society, 8 pages.
Xu, Zhanwei et al., "Electrochemical Supercapacitor Electrodes from Sponge-like Graphene Nanoarchitectures with Ultrahigh Power Density," The Journal of Physical Chemistry Letters, vol. 3, Issue 20, Sep. 25, 2012, American Chemical Society, pp. 2928-2933.
Yan, Jun et al., "Fast and reversible surface redox reaction of graphene-MnO2composites as supercapacitor electrodes," Carbon, vol. 48, Issue 13, Jun. 25, 2010, Elsevier Ltd., pp. 3825-3833.
Yan, Jun et al., "Recent Advances in Design and Fabrication of Electrochemical Supercapacitors with High Energy Densities," Advanced Energy Materials, vol. 4, Issue 4, 1300816, Dec. 23, 2013, Wiley-VCH Verlag GmbH & Co., pp. 1-43.
Yang, Xiaowei et al, "Bioinspired Effective Prevention of Restacking in Multilayered Graphene Films: Towards the Next Generation of High-Performance Supercapacitors," Advanced Materials, vol. 23, Issue 25, May 10, 2011, Wiley-VCH Verlag GmbH & Co., pp. 2833-2838.
Yang, Peihua et al., "Low-Cost High-Performance Solid-State Asymmetric Supercapacitors Based on $MnO_2$ Nanowires and $Fe_2O_3$ Nanotubes," Nano Letters, vol. 14, Issue 2, Jan. 1, 2014, American Chemical Society, pp. 731-736.
Yang, Xiaowei et al, "Liquid-Mediated Dense Integration of Graphene Materials for Compact Capacitive Energy Storage," Science, vol. 341, Issue 6145, Aug. 2, 2013, American Association for the Advancement of Science, 5 pages.
Yoo, Eunjoo et al., "Large Reversible Li Storage of Graphene Nanosheet Families for Use in Rechargeable Lithium Ion Batteries," Nano Letters, vol. 8, Issue 8, Jul. 24, 2008, American Chemical Society, pp. 2277-2282.
Yoo, Jung Joon et al., "Ultrathin Planar Graphene Supercapacitors," Nano Letters, vol. 11, Issue 4, Mar. 7, 2011, American Chemical Society, pp. 1423-1427.
Yu, Dingshan et al., "Scalable synthesis of hierarchically structured carbon nanotube-graphene fibres for capacitive energy storage," Nature Nanotechnology, vol. 9, Issue 7, May 11, 2014, Macmillan Publishers Limited, pp. 1-8.
Yu, Guihua et al., "Solution-Processed Graphene/$MnO_2$ Nanostructured Textiles for High-Performance Electrochemical Capacitors," Nano Letters, vol. 11, Issue 7, Jun. 13, 2011, American Chemical Society, pp. 2905-2911.
Yu, Pingping et al., "Graphene-Wrapped Polyaniline Nanowire Arrays on Nitrogen-Doped Carbon Fabric as Novel Flexible Hybrid Electrode Materials for High-Performance Supercapacitor," Langmuir, vol. 30, Issue 18, Apr. 24, 2014, American Chemical Society, pp. 5306-5313.
Yu, Pingping et al., "Polyaniline Nanowire Arrays Aligned on Nitrogen-Doped Carbon Fabric for High-Performance Flexible Supercapacitors," Langmuir, vol. 29, Issue 38, Aug. 28, 2013, American Chemical Society, 8 pages.
Yu, Zenan et al., "Supercapacitor electrode materials: nanostructures from 0 to 3 dimensions," Energy & Environmental Science, vol. 8, Issue 3, Dec. 3, 2014, The Royal Society of Chemistry, pp. 702-730.
Zhang, Jintao et al., "A high-performance asymmetric supercapacitor fabricated with graphene-based electrodes," Energy & Environmental Science, vol. 4, Issue 10, Aug. 2, 2011, The Royal Society of Chemistry, pp. 4009-4015.
Zhang, Li et al., "High Voltage Super-capacitors for Energy Storage Devices Applications," 14th Symposium on Electromagnetic Launch Technology, Jun. 10-13, 2008, IEEE, pp. 1-4.
Zhang, Long et al., "Porous 3D graphene-based bulk materials with exceptional high surface area and excellent conductivity for supercapacitors," Scientific Reports, vol. 3, Issue 1408, Mar. 11, 2013, Nature Publishing Group, pp. 1-9.
Zhang, Yonglai et al., "Direct imprinting of microcircuits on graphene oxides film by femtosecond laser reduction," Nano Today, vol. 5, Issue 1, Jan. 19, 2010, Elsevier Ltd., pp. 15-20.
Zhang, Zheye et al., "Facile Synthesis of 3D $MnO_2$ -Graphene and Carbon Nanotube-Graphene Composite Networks for High-Performance, Flexible, All-Solid-State Asymmetric Supercapacitors," Advanced Energy Materials, vol. 4, Issue 10, Jul. 15, 2014, Wiley-VCH Verlag GmbH & Co. KGaA, Weinheim, pp. 1-9.
Zhang, Zhongshen et al., "A New-Type Ordered Mesoporous Carbon/ Polyaniline Composites Prepared by a Two-step Nanocasting Method for High Performance Supercapacitor Applications," Journal of Materials Chemistry A, vol. 2, Issue 39, Aug. 13, 2014, Royal Society of Chemistry, pp. 1-25.
Zhao, Xin et al., "Incorporation of Manganese Dioxide within Ultraporous Activated Graphene for High-Performance Electrochemical Capacitors," ACS Nano, vol. 6, Issue 6, May 3, 2012, American Chemical Society, pp. 5404-5412.
Zhi, Mingjia et al, "Nanostructured carbon-metal oxide composite electrodes for supercapacitors: a review," Nanoscale, vol. 5, Issue 1, Oct. 23, 2012,The Royal Society of Chemistry, pp. 72-88.
Zhou, Chuanqiang et al., "Synthesis of Polyaniline Hierarchical Structures in a Dilute SDS/HCI Solution: Nanostructure-Covered Rectangular Tubes," Macromolecules, vol. 42, Issue 4, Jan. 27, 2009, American Chemical Society, pp. 1252-1257.
Zhou, Guangmin et al., "Graphene-Wrapped $Fe_3O_4$ Anode Material with Improved Reversible Capacity and Cyclic Stability for Lithium Ion Batteries," Chemistry of Materials, vol. 22, Issue 18, Aug. 26, 2010, American Chemical Society, pp. 5306-5313.
Zhu, Xianjun et al., "Nanostructured Reduced Graphene Oxide/ $Fe_2O_3$ Composite As a High-Performance Anode Material for Lithium Ion Batteries," ACS Nano, vol. 5, Issue 4, Mar. 28, 2011, American Chemical Society, pp. 3333-3338.
Zhu, Yanwu et al., "Carbon-Based Supercapacitors Produced by Activation of Graphene," Science, vol. 332, May 12, 2011, www.sciencemag.org, pp. 1537-1541.
Zoski, Cynthia G., "Handbook of Electrochemistry," First Edition, 2007, Las Cruces, New Mexico, USA, Elsevier B. V., 935 pages.
Non-Final Office Action for U.S. Appl. No. 13/725,073, dated Apr. 15, 2016, 32 pages.
Final Office Action for U.S. Appl. No. 13/725,073, dated Oct. 4, 2016, 38 pages.
First Examination Report for Australian Patent Application No. 2012378149, dated Jul. 28, 2016, 3 pages.
First Office Action for Chinese Patent Application No. 201280070343. 4, dated Jul. 23, 2015, 29 pages.
Second Office Action for Chinese Patent Application No. 201280070343. 4, dated Apr. 6, 2016, 8 pages.
Third Office Action for Chinese Patent Application No. 201280070343. 4, dated Sep. 7, 2016, 25 pages.
Extended European Search Report for European Patent Application No. 12874989.2, dated Jun. 17, 2015, 6 pages.

(56) References Cited

OTHER PUBLICATIONS

Notice of Reason for Rejection for Japanese Patent Application No. 2014-548972, dated Feb. 7, 2017, 5 pages.
International Search Report and Written Opinion for PCT/US2012/071407, dated Nov. 12, 2013, 9 pages.
International Preliminary Report on Patentability for PCT/US2012/071407 dated Jul. 3, 2014, 6 pages.
Non-Final Office Action for U.S. Appl. No. 14/382,463, dated Jan. 6, 2017, 23 pages.
Notice of Allowance for U.S. Appl. No. 14/382,463, dated Apr. 6, 2017, 7 pages.
First Examination Report for Australian Patent Application No. 2013230195, dated May 27, 2016, 4 pages.
First Office Action and Search Report for Chinese Patent Application No. 201380023699.7, dated Nov. 21, 2016, 21 pages.
Extended European Search Report for European Patent Application No. 13757195.6, dated Jul. 1, 2015, 9 pages.
Park, S. et al., "Colloidal Suspensions of Highly Reduced Graphene Oxide in a Wide Variety of Organic Solvents," Nano Letters, vol. 9, No. 4, 2009, American Chemical Society, pp. 1593-1597.
Applicant-Initiated Interview Summary for U.S. Appl. No. 15/427,210, dated May 29, 2019, 3 pages.
Notice of Reexamination for Chinese Patent Application No. 201280070343.4, dated Jun. 27, 2019, 14 pages.
Non-Final Office Action for U.S. Appl. No. 15/466,425, dated Jul. 10, 2019, 8 pages.
Non-Final Office Action for U.S. Appl. No. 15/612,405, dated Jun. 18, 2019, 12 pages.
Notification of the Second Office Action for Chinese Patent Application No. 201580043429.1, dated Jun. 20, 2019, 9 pages.
Final Office Action for U.S. Appl. No. 14/945,232, dated Jul. 17, 2019, 8 pages.
Notice of Acceptance for Australian Patent Application No. 2015349949, dated Jul. 12, 2019, 3 pages.
Notice of Allowance for U.S. Appl. No. 15/382,871, dated May 17, 2019, 10 pages.
Extended European Search Report for European Patent Application No. 16879927.8, dated Jul. 9, 2019, 14 pages.
Non-Final Office Action for U.S. Appl. No. 15/410,404, dated May 24, 2019, 9 pages.
Applicant-Initiated Interview Summary for U.S. Appl. No. 16/029,930, dated Jul. 29, 2019, 4 pages.
Partial Supplementary European Search Report for European Patent Application No. 17741923.1, dated Jul. 23, 2019, 13 pages.
Non-Final Office Action for U.S. Appl. No. 15/472,409, dated May 31, 2019, 12 pages.
Gao, Yu et al., "High power supercapcitor electrodes based on flexible TiC-CDC nano-felts," Journal of Power Sources, vol. 201, Issue 1, Mar. 2012, Elsevier B.V., pp. 368-375.
Gao, Lijun et al., "Power Enhancement of an Actively Controlled Battery/Ultracapacitor Hybrid," IEEE Transactions on Power Electronics, vol. 20, Issue 1, Jan. 2005, IEEE, pp. 236-243.
Ghasemi, S. et al., "Enhancement of electron transfer kinetics on a polyaniline-modified electrode in the presence of anionic dopants," Journal of Solid State Electrochemistry, vol. 12, Issue 3, Jul. 28, 2007, Springer-Verlag, pp. 259-268.
Ghidiu, Michael et al., "Conductive two-dimensional titanium carbide 'clay' with high volumetric capacitance," Nature, vol. 516, Dec. 4, 2014, Macmillan Publishers Limited, pp. 78-81.
Gilje, Scott et al., "A Chemical Route to Graphene for Device Applications," Nano Letters, vol. 7, Issue 11, Oct. 18, 2007, American Chemical Society, pp. 3394-3398.
Gilje, Scott et al., "Photothermal Deoxygenation of Graphene Oxide for Patterning and Distributed Ignition Applications," Advanced Materials, vol. 22, Issue 3, Oct. 26, 2009, Wiley-VCH Verlag GmbH & Co. KGaA, Weinheim, Germany, pp. 419-423.
Glavin, M.E et al, "A Stand-alone Photovoltaic Supercapacitor Battery Hybrid Energy Storage System," Proceedings of the 13th International Power Electronics and Motion Control Conference (EPE-PEMC), Sep. 1-3, 2008, Poznań, Poland, IEEE, pp. 1688-1695.
Gogotsi, Y. et al., "True Performance Metrics in Electrochemical Energy Storage," Science Magazine, vol. 334, Issue 6058, Nov. 18, 2011, 4 pages.
Gracia, J. et al., "Corrugated layered heptazine-based carbon nitride: the lowest energy modifications of $C_3N_4$ ground state," Journal of Materials Chemistry, vol. 19, 2009, pp. 3013-3019.
Griffiths, Katie et al., "Laser-scribed graphene presents an opportunity to print a new generation of disposable electrochemical sensors," Nanoscale, vol. 6, Sep. 22, 2014, The Royal Society of Chemistry, pp. 13613-13622.
Guardia, L. et al., "UV light exposure of aqueous graphene oxide suspensions to promote their direct reduction, formation of graphene-metal nanoparticle hybrids and dye degradation," Carbon, vol. 50, Issue 3, Oct. 12, 2011, Elsevier Ltd., pp. 1014-1024.
Guerrero-Contreras, Jesus et al., "Graphene oxide powders with different oxidation degree, prepared by synthesis variations of the Hummers method," Materials Chemistry and Physics, vol. 153, Mar. 1, 2015, Elsevier B.V., pp. 1-12.
Günes, Fethullah et al., "Layer-by-Layer Doping of Few-Layer Graphene Film," ACS Nano, vol. 4, Issue 8, Jul. 27, 2010, American Chemical Society, pp. 4595-4600.
He, Xinping et al., "A new nanocomposite: Carbon cloth based polyaniline for an electrochemical supercapacitor," Electrochimica Acta, vol. 111, Aug. 17, 2013, Elsevier Ltd., pp. 210-215.
Hu, Liangbing et al., "Symmetrical $MnO_2$-Carbon Nanotube-Textile Nanostructures for Wearable Pseudocapacitors with High Mass Loading," ACS Nano, vol. 5, Issue 11, Sep. 16, 2011, American Chemical Society, pp. 8904-8913.
Huang, Yi et al., "An Overview of the Applications of Graphene-Based Materials in Supercapacitors," Small, vol. 8, Issue 12, Jun. 25, 2012, Wiley-VCH Verlag GmbH & Co. KGaA, Weinheim, pp. 1-30.
Huang, Ming et al., "Self-Assembly of Mesoporous Nanotubes Assembled from Interwoven Ultrathin Birnessite-type $MnO_2$ Nanosheets for Asymmetric Supercapacitors," Scientific Reports, vol. 4, Issue 3878, Jan. 27, 2014, ww.nature.com/scientificreports, pp. 1-8.
Hwang, Jee Y. et al., "Direct preparation and processing of graphene/$RuO2$ nanocomposite electrodes for high-performance capacitive energy storage," Nano Energy, vol. 18, Sep. 25, 2015, Elsevier B.V., pp. 57-70.
Jana, Milan et al., "Non-covalent functionalization of reduced graphene oxide using sulfanilic acid azocromotrop and is application as a supercapacitor electrode material," Journal of Materials Chemistry A, vol. 3, Issue 14, Feb. 24, 2015, The Royal Society of Chemistry, pp. 7323-7331.
Ji, Junyi et al., "Nanoporous $Ni(OH)_2$ Thin Film on 3D Ultrathin-Graphite Foam for Asymmetric Supercapacitor," ACS Nano, vol. 7, Issue 7, Jun. 11, 2013, American Chemical Society, pp. 6237-6243.
Jimbo, "Transistors," Sparkfun, https://learn.sparkfun.com/tutorials/transistors/extending-the-water-analogy, accessed Dec. 14, 2015, SparkFun Electronics, 3 pages.
Jin, H. Y. et al., "Controllable functionalized carbon fabric for high-performance all-carbon-based supercapacitors," RSC Advances, vol. 4, Issue 62, Jul. 15, 2014, The Royal Society of Chemistry, pp. 33022-33028.
Kang, Yu Jin et al., "All-solid-state flexible supercapacitors based on papers coated with carbon nanotubes and ionic-liquid-based gel electrolytes," Nanotechnology, vol. 23, Issue 6, Jan. 17, 2012, IOP Publishing Ltd, pp. 1-6.
Khaligh, Alireza et al., "Battery, Ultracapacitor, Fuel Cell, and Hybrid Energy Storage Systems for Electric, Hybrid Electric, Fuel Cell, and Plug-In Hybrid Electric Vehicles: State of the Art," IEEE Transactions on Vehicular Technology, vol. 59, Issue 6, Jul. 2010, IEEE, pp. 2806-2814.
Khomenko, V. et al., "Optimisation of an asymmetric manganese oxide/activated carbon capacitor working at 2 V in aqueous medium," Journal of Power Sources, vol. 153, Issue 1, Mar. 14, 2005, Elsevier B.V., pp. 183-190.

(56) References Cited

OTHER PUBLICATIONS

Kiani, Mohammad Ali et al., "Fabrication of High Power LiNi0.5Mn1.5O4 Battery Cathodes by Nanostructuring of Electrode Materials," RSC Advances, vol. 5, Issue 62, May 26, 2015, The Royal Society of Chemistry, pp. 1-6.

Kiani, M.A. et al., "Size effect investigation on battery performance: Comparison between micro- and nano-particles of 3-Ni(OH)$_2$ as nickel battery cathode material," Journal of Power Sources, vol. 195, Issue 17, Apr. 2, 2010, Elsevier B.V., pp. 5794-5800.

Kiani, M.A. et al., "Synthesis of Nano- and Micro-Particles of LiMn$_2$O$_4$: Electrochemical Investigation and Assessment as a Cathode in Li Battery," International Journal of Electrochemical Science, vol. 6, Issue 7, Jul. 1, 2011, ESG, pp. 2581-2595.

Kovtyukhova, Nina, I. et al., "Layer-by-Layer Assembly of Ultrathin Composite Films from Micron-Sized Graphite Oxide Sheets and Polycations," Kovtyukhova, et al, Chemistry of Materials, vol. 11, Issue 3, Jan. 28, 1999, American Chemical Society, pp. 771-778.

Lam, L.T. et al., "Development of ultra-battery for hybrid-electric vehicle applications," Journal of Power Sources, vol. 158, Issue 2, May 2, 2006, Elsevier B.V., pp. 1140-1148.

Lang, Xingyou et al., "Nanoporous metal/oxide hybrid electrodes for electrochemical supercapacitors," Nature Nanotechnology, vol. 6, Apr. 2011, Macmillan Publishers Limited, pp. 232-236.

Lee, Kyu Hyung et al., "Large scale production of highly conductive reduced graphene oxide sheets by a solvent-free low temperature reduction," Carbon, vol. 69, Dec. 16, 2013, Elsevier Ltd., pp. 327-335.

Lee, Kyoung, G. et al, "Sonochemical-assisted synthesis of 3D graphene/nanoparticle foams and their application in supercapacitor," Ultrasonics Sonochemistry, vol. 22, May 2, 2014, Elsevier B.V., pp. 422-428.

Lee, Seung Woo et al., "Carbon Nanotube/Manganese Oxide Ultrathin Film Electrodes for Electrochemical Capacitors," ACS Nano, vol. 4, Issue 7, Jun. 16, 2010, American Chemical Society, pp. 3889-3896.

Lei, Zhibin et al., "Platelet CMK-5 as an Excellent Mesoporous Carbon to Enhance the Pseudocapacitance of Polyaniline," ACS Applied Materials & Interfaces, vol. 5, Issue 15, Jul. 12, 2013, American Chemical Society, pp. 7501-7508.

Li, Dan et al., "Processable aqueous dispersions of graphene nanosheets," Nature Nanotechnology, vol. 3, -Feb. 2008, Nature Publishing Group, pp. 101-105.

Li, Lei et al., "Nanocomposite of Polyaniline Nanorods Grown on Graphene Nanoribbons for Highly Capacitive Pseudocapacitors," ACS Applied Materials and Interfaces, vol. 5, Issue 14, Jun. 21, 2013, American Chemical Society, 6 pages.

Li, Peixu et al., "Core-Double-Shell, Carbon Nanotube@Polypyrrole@MnO$_2$ Sponge as Freestanding, Compressible Supercapacitor Electrode," ACS Applied Materials and Interfaces, vol. 6, Issue 7, Mar. 12, 2014, American Chemical Society, pp. 5228-5234.

Li, Qi et al., "Design and Synthesis of MnO$_2$/Mn/MnO$_2$ Sandwich-Structured Nanotube Arrays with High Supercapacitive Performance for Electrochemical Energy Storage," Nano Letters, vol. 12, Issue 7, Jun. 25, 2012, American Chemical Society, pp. 3803-3807.

Li, Yingzhi et al., "Oriented Arrays of Polyaniline Nanorods Grown on Graphite Nanosheets for an Electrochemical Supercapacitor," Langmuir, vol. 29, Issue 1, Dec. 3, 2012, American Chemical Society, 8 pages.

Li, Zhe-Fei et al., "Fabrication of high-surface-area graphene/polyaniline nanocomposites and their application in supercapacitors," ACS Applied Materials & Interfaces, vol. 5, Issue 7, Mar. 12, 2013, American Chemical Society, pp. 1-25.

Lin, Jian et al., "3-Dimensional Graphene Carbon Nanotube Carpet-Based Microsupercapacitors with High Electrochemical Performance," Nano Letters, vol. 13, Issue 1, Dec. 13, 2012, American Chemical Society, pp. 72-78.

Linden, David et al., "Handbook of Batteries," McGraw-Hill Handbooks, Third Edition, 2010, New York, The McGraw-Hill Companies, Inc., 1,454 pages.

Liu, Wenwen et al., "Novel and high-performance asymmetric micro-supercapacitors based on graphene quantum dots and polyaniline nanofibers," Nanoscale, vol. 5, Apr. 24, 2013, The Royal Society of Chemistry, pp. 6053-6062.

Liu, Wen-Wen et al., "Superior Micro-Supercapacitors Based on Graphene Quantum Dots," Advanced Functional Materials, vol. 23, Issue 33, Mar. 26, 2013, Wiley-VCH Verlag GmbH & Co. KGaA, Weinheim, pp. 4111-4122.

Liu, Yongfeng et al., "Advanced hydrogen storage alloys for Ni/Mh rechargeable batteries," Journal of Materials Chemistry, vol. 21, Issue 11, Dec. 15, 2010, The Royal Society of Chemistry, pp. 4743-4755.

Long, Jeffrey W. et al., "Asymmetric electrochemical capacitors—Stretching the limits of aqueous electrolytes," MRS Bulletin, vol. 36, Jul. 2011, Materials Research Society, pp. 513-522.

Lu, Xihong et al., "Stabilized TiN Nanowire Arrays for High-Performance and Flexible Supercapacitors," Nano Letters, vol. 12, Issue 10, Sep. 4, 2012, American Chemical Society, 6 pages.

Lukatskaya, Maria R. et al., "Cation Intercalation and High Volumetric Capacitance of Two-Dimensional Titanium Carbide," Science, vol. 341, Issue 6153, Sep. 27, 2013, American Association for the Advancement of Science, pp. 1502-1505.

Lukic, Srdjam, M. et al., "Power Management of an Ultracapacitor/Battery Hybrid Energy Storage System in an HEV," IEEE Vehicle Power and Propulsion Conference (VPPC), Sep. 6-8, 2006, IEEE, 6 pages.

Notice of Reexamination for Chinese Patent Application No. 201280070343.4, dated Feb. 3, 2020, 7 pages.

Notice of Preliminary Rejection for Korean Patent Application No. 10-2014-7028084, dated Feb. 17, 2020, 5 pages.

Examination Report for Indian Patent Application No. 201617042976, dated Mar. 13, 2020, 7 pages.

Office Action for Mexican Patent Application No. MX/a/2016/016239, dated Feb. 26, 2020, 5 pages.

Notification of Reasons for Rejection for Japanese Patent Application No. 2017-526533, dated Mar. 16, 2020, 7 pages.

Second Office Action for Chinese Patent Application No. 2016800753323, dted Mar. 5, 2020, 15 pages.

First Office Action for Chinese Patent Application No. 2017800249783, dated Jan. 6, 2020, 15 pages.

Supplemental Notice of Allowability for U.S. Appl. No. 14/945,232, dated Feb. 26, 2020, 5 pages.

Office Action for Eurasian Patent Application No. 201990587/31, dated Mar. 26, 2020, 4 pages.

Cannarella et al., "Mechanical Properties of a Battery Separator under Compression and Tension," Journal of the Electrochemical Society, vol. 161, No. 11, Sep. 26, 2014, pp. F3117-F3122.

Non-Final Office Action for U.S. Appl. No. 15/427,210, dated Sep. 3, 2019, 16 pages.

Notice of Preliminary Rejection for Korean Patent Application No. 10-2014-7028084, dated Aug. 22, 2019, 30 pages.

Notice of Acceptance for Australian Patent Application No. 2015277264, dated Jul. 31, 2019, 3 pages.

Non-Final Office Action for U.S. Appl. No. 14/945,232, dated Sep. 3, 2019, 8 pages.

Notification of the Third Office Action for Chinese Patent Application No. 201580072540.3, dated Jul. 17, 2019, 9 pages.

Notification of Reasons for Rejection for Japanese Patent Application No. 2017-526533, dated Aug. 20, 2019, 4 pages.

Non-Final Office Action for U.S. Appl. No. 15/382,871, dated Sep. 16, 2019, 9 pages.

Non-Final Office Action for U.S. Appl. No. 16/428,409, dated Sep. 16, 2019, 12 pages.

Luo, Zhi-Jia et al., "A timesaving, low-cost, high-yield method for the synthesis of ultrasmall uniform graphene oxide nanosheets and their application in surfactants," Nanotechnology, vol. 27, Issue 5, Dec. 16, 2015, IOP Publishing Ltd, pp. 1-8.

Maiti, Sandipan et al., "Interconnected Network of MnO$_2$ Nanowires with a "Cocoonlike" Morphology: Redox Couple-Mediated Performance Enhancement in Symmetric Aqueous Supercapacitor," ACS Applied Materials & Interfaces, vol. 6, Issue 13, Jun. 16, 2014, American Chemical Society, pp. 10754-10762.

(56) References Cited

OTHER PUBLICATIONS

Maiti, Uday Narayan et al., "Three-Dimensional Shape Engineered, Interfacial Gelation of Reduced Graphene Oxide for High Rate, Large Capacity Supercapacitors," vol. 26, Issue 4, Jan. 29, 2014, Wiley-VCH Verlag GmbH & Co., pp. 615-619.

Mao, Lu et al., "Surfactant-stabilized graphene/polyaniline nanofiber composites for high performance supercapacitor electrode," Journal of Materials Chemistry, vol. 22, Issue 1, Oct. 12, 2011, The Royal Society of Chemistry, pp. 80-85.

Marcano, Daniela C. et al., "Improved Synthesis of Graphene Oxide," ACS Nano, vol. 4, Issue 8, Jul. 22, 2010, American Chemical Society, pp. 4806-4814.

Miller, John R. et al., "Electrochemical Capacitors for Energy Management," Materials Science, vol. 321, Aug. 1, 2008, AAAS, pp. 651-652.

Moosavifard, Seyyed E. et al., "Designing 3D highly ordered nanoporous CuO electrodes for high-performance asymmetric supercapacitors," ACS Applied Materials & Interfaces, vol. 7, Issue 8, American Chemical Society, 13 pages.

Moussa, Mahmoud et al, "Free-Standing Composite Hydrogel Film for Superior Volumetric Capacitance," Journal of Materials Chemistry A, vol. 3, Issue 30, Jun. 19, 2015, The Royal Society of Chemistry, pp. 1-8.

Naoi, Katsuhiko et al., "Second generation 'nanohybrid supercapacitor': Evolution of capacitive energy storage devices," Energy & Environmental Science, vol. 5, Issue 11, Sep. 14, 2012, The Royal Society of Chemistry, pp. 9363-9373.

Nathan, Arokia et al., "Flexible Electronics: The Next Ubiquitous Platform," Proceedings of the IEEE, vol. 100, Special Centennial Issue, May 13, 2012, IEEE, pp. 1486-1517.

Niu, Zhiqiang et al., "A Leavening Strategy to Prepare Reduced Graphene Oxide Foams," Advanced Materials, vol. 24, Issue 30, Aug. 8, 2012, Wiley-VCH Verlag GmbH & Co., pp. 1-7.

Oudenhoven, Jos F. M. et al., "All-Solid-State Lithium-Ion Microbatteries: A Review of Various Three-Dimensional Concepts," Advanced Energy Matterials, vol. 1, Issue 1, Wiley-VCH Verlag GmbH & Co. KGaA, Weinheim, pp. 10-33.

Paravannoor, Anjali et al., "High voltage supercapacitors based on carbon-grafted NiO nanowires interfaced with an aprotic ionic liquid," Chemical Communications, vol. 51, Issue 28, Feb. 26, 2015, The Royal Society of Chemistry, pp. 1-4.

Patel, Mehul N. et al., "Hybrid $MnO_2$-disordered mesoporous carbon nanocomposites: synthesis and characterization as electrochemical pseudocapacitor electrodes," Journal of Materials Chemistry, vol. 20, Issue 2, Nov. 11, 2009, The Royal Society of Chemistry, pp. 390-398.

Pech, David et al, "Ultrahigh-power micrometre-sized supercapacitors based on onion-like carbon," Nature Nanotechnology, vol. 5, Sep. 2010, Macmillan Publishers Limited, 10 pages.

Pendashteh, Afshin et al., "Fabrication of anchored copper oxide nanoparticles on graphene oxide nanosheets via an electrostatic coprecipitation and its application as supercapacitor," Electrochimica Acta, vol. 88, Oct. 29, 2012, Elsevier Ltd., pp. 347-357.

Pendashteh, Afshin et al., "Facile synthesis of nanostructured $CuCo_2O_4$ as a novel electrode material for high-rate supercapacitors," vol. 50, Issue 16, Dec. 17, 2013, The Royal Society of Chemistry, 4 pages.

Pendashteh, Afshin et al., "Highly Ordered Mesoporous $CuCo_2O_4$ Nanowires, a Promising Solution for High-Performance Supercapacitors," Chemistry of Materials, vol. 27, Issue 11, Apr. 20, 2015, American Chemical Society, pp. 1-11.

Qing, Xutang et al., "P/N/O co-doped carbonaceous materials based supercapacitor with voltage up to 1.9 V in the aqueous electrolyte," RSC Advances, vol. 4, Issue 99, Oct. 21, 2014, Royal Society of Chemistry, pp. 1-22.

Qiu, Ling et al., "Controllable Corrugation of Chemically Converted Graphene Sheets in Water and Potential Application for Nanofiltration," Chemical Communications, vol. 47, 2011, pp. 5810-5812.

Qu, Qunting et al., "Core-Shell Structure of Polypyrrole Grown on $V_2O_5$ Nanoribbon as High Performance Anode Material for Supercapacitors," Advanced Energy Materials, vol. 2, Issue 8, 2012, Wiley-VCH Verlag GmbH & Co., pp. 1-6.

Raccichini, Rinaldo et al., "The role of graphene for electrochemical energy storage," Nature Materials, vol. 14, Issue 3, Dec. 22, 2014, Macmillan Publishers Limited, pp. 1-9.

Samitsu, Sadaki et al., "Flash freezing route to mesoporous polymer nanofibre networks," Nature Communications, vol. 4, Issue 2653, Oct. 22, 2013, Macmillan Publishers Limited, pp. 1-7.

Shae, Yuanlong et al., "Fabrication of large-area and high-crystallinity photoreduced graphene oxide films via reconstructed two-dimensional multilayer structures," NPG Asia Materials, vol. 6, Issue 8, e119, Aug. 15, 2014, Nature Publishing Group, pp. 1-9.

Shao, Yuanlong et al., "Graphene-based materials for flexible supercapacitors," Chemical Society Review, vol. 44, Issue 11, Apr. 22, 2015, The Royal Society of Chemistry, 27 pages.

Shao, Yuanlong et al., "High-performance flexible asymmetric supercapacitors based on 3D porous graphene/$MnO_2$ nanorod and graphene/Ag hybrid thin-film electrodes," Journal of Materials Chemistry C, vol. 1, Dec. 5, 2012, The Royal Society of Chemistry, pp. 1245-1251.

Sheats, James R., "Manufacturing and commercialization issues in organic electronics," Journal of Materials Research, vol. 19, Issue 7, Jul. 2004, Materials Research Society, pp. 1974-1989.

Shen, Caiwei et al., "A high-energy-density micro supercapacitor of asymmetric $MnO_2$-carbon configuration by using micro-fabrication technologies," Journal of Power Sources, vol. 234, Feb. 9, 2013, Elsevier B.V., pp. 302-309.

Shen, Jiali et al., "High-Performance Asymmetric Supercapacitor Based on Nano-architectured Polyaniline/Graphene/Carbon Nanotube and Activated Graphene Electrodes," ACS Applied Materials & Interfaces, vol. 5, Issue 17, Aug. 9, 2013, American Chemical Society, 36 pages.

Shown, Indrajit et al., "Conducting polymer-based flexible supercapacitor," Energy Science & Engineering, vol. 3, Issue 1, Nov. 19, 2014, Society of Chemical Industry and John Wiley & Sons Ltd., pp. 1-25.

Simon, P. et al., "Capacitive Energy Storage in Nanostructured Carbon-Electrolyte Systems," Accounts of Chemical Research, vol. 46, Issue 5, Jun. 6, 2012, American Chemical Society, 10 pages.

Simon, Patrice et al., "Materials for electrochemical capacitors," Nature Materials, vol. 7, Issue 11, Nov. 2008, Macmillan Publishers Limited, pp. 845-854.

Simon, Patrice et al., "Where Do Batteries End and Supercapacitors Begin?" Science, vol. 343, Issue 6176, Mar. 14, 2014, American Association for the Advancement of Science, 3 pages.

Snook, Graeme A. et al., "Conducting-polymer-based supercapacitor devices and electrodes," Journal of Power Sources, vol. 196, Jul. 15, 2010, Elsevier B.V., pp. 1-12.

Stoller, Meryl D. et al., "Graphene-Based Ultracapacitors," Nano Letters, vol. 8, Issue 10, Sep. 13, 2008, American Chemical Society, pp. 3498-3502.

Strong, Veronica et al., "Patterning and Electronic Tuning of Laser Scribed Graphene for Flexible All-Carbon Devices," ACS Nano, vol. 6, Issue 2, Jan. 13, 2012, American Chemical Society, p. 1395-1403.

Su, Zijin et al., "Scalable fabrication of $MnO_2$ nanostructure deposited on free-standing Ni nanocone arrays for ultrathin, flexible, high-performance micro-supercapacitor," Energy and Environmental Science, vol. 7, May 28, 2014, The Royal Society of Chemistry, pp. 2652-2659.

Sumboja, Afriyanti et al., "Large Areal Mass, Flexible and Free-Standing Reduced Graphene Oxide/Manganese Dioxide Paper for Asymmetric Supercapacitor Device," Advanced Materials, vol. 25, Issue 20, May 28, 2013, Wiley-VCH Verlag GmbH & Co. KGaA, Weinheim, pp. 2809-2815.

Tian, Yuyu et al., "Synergy of $W_{18}O_{49}$ and Polyaniline for Smart Supercapacitor Electrode Integrated with Energy Level Indicating Functionality," Nano Letters, vol. 14, Issue 4, Mar. 4, 2014, American Chemical Society, pp. 2150-2156.

Toupin, Mathieu et al., "Charge Storage Mechanism of $MnO_2$ Electrode Used in Aqueous Electrochemical Capacitor," Chemistry of Materials, vol. 16, Issue 16, Jul. 16, 2004, American Chemical Society, pp. 3184-3190.

(56) References Cited

OTHER PUBLICATIONS

Tran, Henry D. et al., "The oxidation of aniline to produce "polyaniline": a process yielding many different nanoscale structures," Journal of Materials Chemistry, vol. 21, Issue 11, Nov. 25, 2010, The Royal Society of Chemistry, pp. 3534-3550.
Viculis, Lisa M. et al., "A Chemical Route to Carbon Nanoscrolls," Science, vol. 299, Issue 5611, Feb. 28, 2003, American Association for the Advancement of Science, 2 pages.
Vonlanthen, David et al., "A Stable Polyaniline-Benzoquinone-Hydroquinone Supercapacitor," Advanced Materials, vol. 26, Issue 30, Jun. 13, 2014, Wiley-VCH Verlag GmbH & Co., pp. 1-6.
Wallace, Gordon G. et al., "Processable aqueous dispersions of graphene nanosheets," Nature Nanotechnology, vol. 3, Issue 2, 2008, Nature Publishing Group, pp. 101-105.
Wang, Gongkai et al., "Flexible Pillared Graphene-Paper Electrodes for High-Performance Electrochemical Supercapacitors," Small, vol. 8, Issue 3, Dec. 8, 2011, pp. 452-459.
Wang, Guoping et al, "A review of electrode materials for electrochemical supercapacitors," Chemical Society Reviews, vol. 41, Jul. 21, 2011, The Royal Society of Chemistry, pp. 797-828.
Wang, Guoxiu et al., "Graphene nanosheets for enhanced lithium storage in lithium ion batteries," Carbon, vol. 47, Issue 8, Apr. 1, 2009, Elsevier Ltd., pp. 2049-2053.
Wang, Hailiang et al., "$Mn_3O_4$-Graphene Hybrid as a High-Capacity Anode Material for Lithium Ion Batteries," Journal of the American Chemical Society, vol. 132, Issue 40, Oct. 13, 2010, American Chemical Society, pp. 13978-13980.
Wang, Huanlei et al., "Graphene—Nickel Cobaltite Nanocomposite Asymmetrical Supercapacitor with Commercial Level Mass Loading," Nano Research, vol. 5, Issue 9, Sep. 2012, Tsinghua University Press and Springer-Verlag Berlin Heidelberg, pp. 605-617.
Wang, Kai et al., "Flexible supercapacitors based on cloth-supported electrodes of conducting polymer nanowire array/SWCNT composites," Journal of Materials Chemistry, vol. 21, Issue 41, Sep. 20, 2011, The Royal Society of Chemistry, pp. 16373-16378.
Gao, C. et al., "Superior Cycling Performance of $SiO_x$/C Composite with Arrayed Mesoporous Architecture as Anode Material for Lithium-Ion Batteries," Journal of the Electrochemical Society, vol. 161, No. 14, 2014, The Electrochemical Society, pp. A2216-A2221.
Vranes, M. et al., "Physicochemical Characterization of 1-Butyl-3-methylimidazolium and 1-Butyl-1-methylpyrrolidinium Bis{trifluoromethylsulfonyl}imide," Journal of Chemical & Engineering Data, vol. 57, Mar. 7, 2012, American Chemical Society, pp. 1072-1077.
Notice of Allowance for U.S. Appl. No. 15/427,210, dated Dec. 18, 2019, 9 pages.
Grant of Patent for Korean Patent Application No. 10-2014-7020353, dated Oct. 29, 2019, 3 pages.
Final Office Action for U.S. Appl. No. 15/612,405, dated Dec. 27, 2019, 17 pages.
Office Action for Canadian Patent Application No. 2,866,250, dated Dec. 17, 2019, 3 pages.
Examination Report for European Patent Application No. 15809519.0, dated Dec. 9, 2019, 7 pages.
Notice of Allowance for U.S. Appl. No. 14/945,232, dated Dec. 20, 2019, 9 pages.
Official Action for Eurasian Patent Application No. 201791078, dated Nov. 6, 2019, 4 pages.
Applicant-Initiated Interview Summary for U.S. Appl. No. 15/382,871, dated Dec. 31, 2019, 5 pages.
Corrected Notice of Allowability for U.S. Appl. No. 15/410,404, dated Dec. 3, 2019, 6 pages.
Non-Final Office Action for U.S. Appl. No. 16/692,123, dated Dec. 27, 2019, 11 pages.
Notice of Allowance for U.S. Appl. No. 15/472,409, dated Dec. 11, 2019, 11 pages.
Official Action for Eurasian Patent Application No. 201892199, dated Nov. 28, 2019, 6 pages.
Extended European Search Report for European Patent Application No. 17816292.1, dated Jan. 7, 2020, 9 pages.
Examination Report for Indian Patent Application No. 201817044642, dated Nov. 26, 2019, 7 pages.
Official Action for Eurasian Patent Application No. 201892118, dated Nov. 28, 2019, 4 pages.
Huang, L. et al., "Pulsed laser assisted reduction of graphene oxide," Carbon, vol. 49, 2011, Elsevier, pp. 2431-2436.
Kumar, P. et al., "Graphene produced by radiation-induced reduction of graphene oxide," Sep. 26, 2010, DOI: DOI:10.1142/S0219581X11008824, 23 pages.
Notice of Preliminary Rejection for Korean Patent Application No. 10-2014-7020353, dated Apr. 15, 2019, 11 pages.
Non-Final Office Action for U.S. Appl. No. 16/029,930, dated Apr. 3, 2019, 13 pages.
Examination Report No. 1 for Australian Patent Application No. 2015277264, dated Mar. 7, 2019, 4 pages.
Interview Summary for U.S. Appl. No. 14/945,232, dated Apr. 11, 2019, 3 pages.
Notification of the Second Office Action for Chinese Patent Application No. 201580072540.3, dated Mar. 7, 2019, 12 pages.
Official Action for Eurasian Patent Application No. 201791078, dated Mar. 27, 2019, 5 pages.
Interview Summary for U.S. Appl. No. 15/382,871, dated Apr. 1, 2019, 10 pages.
Advisory Action for U.S. Appl. No. 15/382,871, dated Apr. 24, 2019, 3 pages.
Non-Final Office Action for U.S. Appl. No. 15/688,342, dated Mar. 26, 2019, 9 pages.
Decision on Rejection for Chinese Patent Application No. 201380023699.7, dated Aug. 16, 2018, 11 pages.
International Preliminary Report on Patentability for International Patent Application No. PCT/US2017/024716, dated Oct. 11, 2018, 10 pages.
International Preliminary Report on Patentability for International Patent Application No. PCT/US2017/023632, dated Oct. 4, 2018, 8 pages.
Invitation to Pay Additional Fees for International Patent Application No. PCT/US2018/041728, dated Sep. 12, 2018, 2 pages.
Notice of Allowance for U.S. Appl. No. 15/319,286, dated Oct. 1, 2018, 8 pages.
Non-Final Office Action for U.S. Appl. No. 15/410,404, dated Sep. 27, 2018, 9 pages.
Advisory Action for U.S. Appl. No. 14/945,232, dated Oct. 15, 2018, 3 pages.
Braz, Elton P., et al., "Effects of Gamma Irradiation in Graphene/Poly(ethylene Oxide) Nanocomposites," 2013 International Nuclear Atlantic Conference—INAC 2013, Nov. 24-29, 2013, Recife, PE, Brazil, 7 pages.
Hu, Liangbing, et al., "Lithium-Ion Textile Batteries with Large Areal Mass Loading," Advanced Energy Materials, vol. 1, Issue 6, Oct. 6, 2011, pp. 1012-1017.
Extended European Search Report for European Patent Application No. 15861794.4, dated Oct. 2, 2018, 13 pages.
Corrected Notice of Allowability for U.S. Appl. No. 15/319,286, dated Oct. 29, 2018, 5 pages.
Office Action for Canadian Patent Application No. 2,862,806, dated Sep. 30, 2019, 3 pages.
Decision of Rejection for Japanese Patent Application No. 2016-573846, dated Oct. 29, 2019, 9 pages.
First Office Action for Chinese Patent Application No. 2016800753323, dated Aug. 27, 2019, 15 pages.
Extended European Search Report for European Patent Application No. 17741923.1, dated Nov. 15, 2019, 18 pages.
Extended European Search Report for European Patent Application No. 17776536.9, dated Oct. 30, 2019, 8 pages.
Extended European Search Report for European Patent Application No. 17771081.1, dated Oct. 22, 2019, 6 pages.
Fernandez-Merino, M.J. et al., "Vitamin C Is an Ideal Substitute for Hydrazine in the Reduction of Graphene Oxide Suspensions," The Journal of Physical Chemistry C, vol. 114, No. 14, Mar. 4, 2010, American Chemical Society, pp. 6426-6432.

(56) References Cited

OTHER PUBLICATIONS

Lu, J. et al., "Advanced applications of ionic liquids in polymer science," Progress in Polymer Science, vol. 34, 2009, Elsevier Ltd., pp. 431-448.
Yan, Jun et al., "High-performance supercapacitor electrodes based on highly corrugated graphene sheets," Carbon, vol. 50, 2012, Elsevier Ltd., pp. 2179-2188.
Final Office Action for U.S. Appl. No. 16/029,930, dated Nov. 15, 2019, 16 pages.
Notice of Allowance and Examiner-Initiated Interview Summary for U.S. Appl. No. 15/410,404, dated Oct. 25, 2019, 11 pages.
Final Office Action for U.S. Appl. No. 15/688,342, dated Oct. 17, 2019, 11 pages.
Non-Final Office Action for U.S. Appl. No. 15/630,758, dated Oct. 11, 2019, 11 pages.
Applicant-Initiated Interview Summary for U.S. Appl. No. 15/466,425, dated Oct. 22, 2019, 3 pages.
Examination Report for European Patent Application No. 12874989.2, dated Mar. 5, 2019, 5 pages.
Non-Final Office Action for U.S. Appl. No. 16/029,930, dated Jan. 14, 2019, 8 pages.
Office Action for Canadian Patent Application No. 2,866,250, dated Jan. 11, 2019, 3 pages.
Corrected Notice of Allowability for U.S. Appl. No. 15/319,286, dated Jan. 18, 2019, 5 pages.
Notice of Reasons for Rejection for Japanese Patent Application No. 2016-573846, dated Feb. 26, 2019, 8 pages.
Search Report for Japanese Patent Application No. 2016-573846, dated Feb. 28, 2019, 44 pages.
Non-Final Office Action for U.S. Appl. No. 14/945,232, dated Jan. 9, 2019, 7 pages.
Examination Report No. 1 for Australian Patent Application No. 2015349949, dated Mar. 8, 2019, 4 pages.
Final Office Action for U.S. Appl. No. 15/382,871, dated Jan. 25, 2019, 16 pages.
Final Office Action for U.S. Appl. No. 15/410,404, dated Feb. 21, 2019, 9 pages.
Final Office Action for U.S. Appl. No. 15/472,409, dated Jan. 18, 2019, 12 pages.
International Preliminary Report on Patentability for International Patent Application No. PCT/US2017/048883, dated Mar. 14, 2019, 7 pages.
International Preliminary Report on Patentability for International Patent Application No. PCT/US2017/038992, dated Jan. 3, 2019, 10 pages.
Non-Final Office Action for U.S. Appl. No. 15/427,210, dated Feb. 28, 2019, 17 pages.
Non-Final Office Action for U.S. Appl. No. 16/791,504, dated Nov. 18, 2020, 16 pages.
Second Office Action for Chinese Patent Application No. 201811438766.2, dated Oct. 28, 2020, 10 pages
Notification of Reexamination for Chinese Patent Application No. 2015800725403, dated Oct. 12, 2020, 9 pages.
Office Action for Israeli Patent Application No. 252320, dated Sep. 17, 2020, 11 pages.
Examination Report for Australian Patent Application No. 2016378400, dated Sep. 22, 2020, 5 pages.
Examination Report for Taiwanese Patent Application No. 105142233, dated Sep. 25, 2020, 19 pages.
Examination Report for Australian Patent Application No. 2017209117, dated Oct. 5, 2020, 5 pages.
Examination Report for Taiwanese Patent Application No. 106109733, dated Oct. 20, 2020, 11 pages.
Notice of Allowance for U.S. Appl. No. 16/223,869, dated Jul. 9, 2020, 9 pages.
Notice of Allowance for U.S. Appl. No. 16/692,123, dated Jul. 15, 2020, 9 pages.
Advisory Action for U.S. Appl. No. 15/466,425, dated Jul. 7, 2020, 3 pages.
Non-Final Office Action for U.S. Appl. No. 15/466,425, dated Jul. 28, 2020, 8 pages.
Office Action for Vietnamese Patent Application No. 1-2016-05086, dated May 29, 2020, 2 pages.
First Office Action and Search Report for Chinese Patent Application No. 201811438766.2, dated Mar. 31, 2020, 32 pages.
Official Notification for Eurasian Patent Application No. 201990068, dated Jun. 23, 2020, 5 pages.
Official Action for Eurasian Patent Application No. 201791078, dated Jun. 23, 2020, 4 pages.
Examination Report for Indian Patent Application No. 201717016755, dated Jul. 2, 2020, 6 pages.
Examination Report for Indian Patent Application No. 201817020826, dated Jul. 13, 2020, 7 pages.
Extended European Search Report for European Patent Application No. 17847303.9, dated Jul. 13, 2020, 9 pages.
First Office Action and Search Report for Chinese Patent Application No. 2017800273161, dated Jun. 5, 2020, 15 pages.
Author Unknown, "Sulfuric Acid—Density," The Engineering Toolbox, accessed Apr. 10, 2020 at https://www.engineeringtoolbox.com/indsulfuric-acid-density-d_2163.html, 6 pages.
Dubal, D. P., et al., "Hybrid energy storage: the merging of battery and supercapacitor chemistries," Chemical Society Review, vol. 44, No. 7, 2015, pp. 1777-1790.
Gong, M. et al., "Ultrafast high-capacity NiZn battery with NiAlCo-layered double hydroxide," Energy & Environmental Science, vol. 7, No. 6, 2014, pp. 2025-2032.
Humble, P. H., et al., "Microscopic nickel-zinc batteries for use in autonomous microsystems," Journal of the Electrochemical Society, vol. 148, No. 12, 2001, pp. A1357-A1361.
Kang, J.H et al., "Hidden Second Oxidation Step of Hummers Method," Chemistry of Materials, vol. 28, 2016, American Chemical Society, pp. 756-764.
Mishra, G., et al., "Layered double hydroxides: A brief review from fundamentals to application as evolving biomaterials," Applied Clay Science, vol. 153, 2018, Elsevier B.V., pp. 172-186.
Parker, J. F., et al. "Rechargeable nickel-3D zinc batteries: An energy-dense, safer alternative to lithium-ion," Science, vol. 356, No. 6336, 2017, American Association for the Advancement of Science, pp. 415-418.
Non-Final Office Action for U.S. Appl. No. 15/688,342, dated Apr. 9, 2020, 10 pages.
Final Office Action for U.S. Appl. No. 15/630,758, dated Apr. 15, 2020, 13 pages.
Office Action for Eurasian Patent Application No. 201790003, dated Feb. 26, 2020, 6 pages.
Examination Report No. 1 for Australian Patent Application No. 2019250120, dated Apr. 24, 2020, 4 pages.
Decision of Rejection for Chinese Patent Application No. 201580072540.3, dated Apr. 22, 2020, 8 pages.
Partial Supplemental European Search Report for European Patent Application No. 17847303.9, dated Apr. 3, 2020, 10 pages.
Author Unknown, "Sulfuric Acid—Density," The Engineering ToolBox, www.engineeringtoolbox.com/indsulfuric-acid-density-d_2163.html, accessed Oct. 2, 2020, 3 pages.
Notice of Allowance and Examiner-Initiated Interview Summary for U.S. Appl. No. 16/784,578, dated Oct. 15, 2020, 9 pages.
Notice of Allowability for U.S. Appl. No. 16/223,869, dated Sep. 15, 2020, 5 pages.
Non-Final Office Action for U.S. Appl. No. 16/428,409, dated Oct. 1, 2020, 14 pages.
Notice of Allowance for U.S. Appl. No. 16/692,123, dated Oct. 21, 2020, 8 pages.
Non-Final Office Action for U.S. Appl. No. 15/630,758, dated Oct. 1, 2020, 14 pages.
Reexamination Decision for Chinese Patent Application No. 201280070343.4, dated Aug. 31, 2020, 19 pages.
Examination Report for Taiwanese Patent Application No. 106111115, dated Aug. 25, 2020, 17 pages.
Advisory Action for U.S. Appl. No. 15/612,405, dated Jun. 24, 2020, 3 pages.
Non-Final Office Action for U.S. Appl. No. 16/029,930, dated Jun. 24, 2020, 16 pages.

(56) References Cited

OTHER PUBLICATIONS

Final Office Action for U.S. Appl. No. 16/428,409, dated Jun. 23, 2020, 16 pages.
Wikipedia, "Ferromagnetism," Feb. 13, 2017, Retrieved Aug. 7, 2018 from https://en.wikipedia.org/w/index.php?title=Ferromagnetism&oldid=765289868, 1 page.
Grosu, Yaroslav et al., "Natural Magnetite for thermal energy storage: Excellent thermophysical properties, reversible latent heat transition and controlled thermal conductivity," Solar Energy Materials & Solar Cells, vol. 161, Available online Dec. 6, 2016, Elsevier B.V., pp. 170-176.
Hwang, J. Y., et al., "Boosting the Capacitance and Voltage of Aqueous Supercapacitors via Redox Charge Contribution from both Electrode and Electrolyte," Nano Today, vol. 15, Available online Jul. 22, 2017, pp. 15-25.
Karami, Hassan et al., "Sodium Sulfate Effects on the Electrochemical Behaviors of Nanostructured Lead Dioxide and Commercial Positive Plates of Lead-Acid Batteries," International Journal of Electrochemical Science, vol. 5, 2010, ESG, pp. 1046-1059.
Lee, Juhan, et al., "High Performance Hybrid Energy Storage with Potassium Ferricyanide Redox Electrolyte," Applications of Materials and Interfaces, vol. 8, Aug. 2016, ACS, pp. 23676-23687.
Notice of Allowance for U.S. Appl. No. 15/612,405, dated Sep. 8, 2020, 7 pages.
Examination Report for Indian Patent Application No. 201817023184, dated Aug. 13, 2020, 6 pages.
Examination Report for Indian Patent Application No. 201817034180, dated Aug. 13, 2020, 6 pages.
Examination Report for European Patent Application No. 17816292.1, dated Aug. 24, 2020, 4 pages.
Examination Report for Indian Patent Application No. 201817033309, dated Aug. 28, 2020, 6 pages.
Invitation to Pay Additional Fees for International Patent Application No. PCT/US2018/036846, dated Aug. 24, 2018, 2 pages.
International Search Report and Written Opinion for International Patent Application No. PCT/US2018/036846, dated Nov. 9, 2018, 14 pages.
International Preliminary Report on Patentability for International Patent Application No. PCT/US2018/036846, dated Dec. 26, 2019, 10 pages.
Non-Final Office Action for U.S. Appl. No. 16/0004,818, dated Jun. 24, 2020, 18 pages.
Zhang, Luojiang, et al., "3D porous layered double hydroxides grown on graphene as advanced electrochemical pseudocapacitor materials," Journal of Materials Chemistry A, vol. 1, 2013, pp. 9046-9053.
Notice of Acceptance for Australian Patent Application No. 2019250120, dated Nov. 11, 2020, 3 pages.
Notification of Decision of Rejection for Japanese Patent Application No. 2017-526533, dated Nov. 17, 2020, 6 pages.
Official Notification for Eurasian Patent Application No. 20182199, dated Dec. 11, 2020, 6 pages.
Notification of the Second Office Action for Chinese Patent Application No. 2017800249783, dated Dec. 2, 2020, 9 pages.
Official Action for Eurasion Patent Application No. 201892118, dated Dec. 11, 2020, 6 pages.
Invitation to Pay Additional Fees and Partial Search for International Patent Application No. PCT/US2020/052618, dated Nov. 30, 2020, 2 pages.
Yang, Wanlu, et al., "Solvothermal One-Step Synthesis of Ni—Al Layered Double Hydroxide/Carbon Nanotube/Reduced Graphene Oxide Sheet Ternary Nanocomposite with Ultrahigh Capacitance for Supercapacitors," Applied Materials and Interfaces, vol. 5, 2013, American Chemical Society, pp. 5443-5454.
Decision of Reexamination for Chinese Patent Application No. 201580072540.3, dated Feb. 2, 2021, 18 pages.
Notification of Reasons for Rejection for Japanese Patent Application No. 2018-532233, dated Dec. 15, 2020, 8 pages.
Examination Report for Australian Patent Application No. 185870, dated Jan. 28, 2021, 5 pages.

Official Notification for Eurasian Patent Application No. 201990068, dated Jan. 14, 2021, 6 pages.
Notice of Preliminary Rejection for Korean Patent Application No. 10-2018-7029515, dated Jan. 21, 2021, 9 pages.
International Search Report and Written Opinion for International Patent Application No. PCT/US2020/052618, dated Feb. 17, 2021, 19 pages.
Notice of Allowance for U.S. Appl. No. 15/466,425, dated Mar. 10, 2021, 9 pages.
Final Office Action for U.S. Appl. No. 16/004,818, dated Feb. 25, 2021, 24 pages.
Notice of Allowance for U.S. Appl. No. 15/612,405, dated Dec. 17, 2020, 8 pages.
Non-Final Office Action for U.S. Appl. No. 16/029,930, dated Jan. 6, 2021, 15 pages.
Notification of Reasons for Rejection for Japanese Patent Application No. 2018-538110, dated Jan. 20, 2021, 9 pages.
Notification of Reasons for Rejection for Japanese Patent Application No. 2018-550836, dated Feb. 12, 2021, 6 pages.
Examination Report for Taiwanese Patent Application No. 106121056, dated Feb. 3, 2021, 10 pages.
Non-Final Office Action for U.S. Appl. No. 16/791,517, dated Apr. 1, 2021, 16 pages.
Applicant-Initiated Interview Summary for U.S. Appl. No. 16/428,409, dated Mar. 19, 2021, 2 pages.
Notice of Preliminary Rejection for Korean Patent Application No. 10-2018-7030385, dated Mar. 13, 2021, 10 pages.
Notice of Reasons for Rejection for Japanese Patent Application No. 2018-549538, dated Feb. 15, 2021, 6 pages.
Partial Supplementary European Search Report for European Patent Application No. 18832324.0, dated Mar. 12, 2021, 15 pages.
Shao, et al., "3D Freeze-Casting of Cellular Graphene Films for Ultrahigh-Power-Density Supercapacitors," Advanced Materials, vol. 28, 2016, 8 pages.
Notice of Allowance for U.S. Appl. No. 16/428,409, dated May 14, 2021, 10 pages.
Notice of Allowance for U.S. Appl. No. 15/630,758, dated May 14, 2021, 11 pages.
Examination Report for European Patent Application No. 15861794.4, dated Apr. 14, 2021, 4 pages.
Examination Report for Australian Patent Application No. 2017245151, dated Mar. 25, 2021, 5 pages.
Second Office Action for Chinese Patent Application No. 2017800273161, dated Apr. 6, 2021, 8 pages.
Notification of Reasons for Rejection for Japanese Patent Application No. 2018-567030, dated Apr. 5, 2021, 8 pages.
Examination Report for Australian Patent Application No. 2017238201, dated Mar. 17, 2021, 4 pages.
Final Office Action for U.S. Appl. No. 16/791,504, dated May 27, 2021, 16 pages.
Lin, Jian, et al., "Laser-induced porous graphene films from commercial polymers," Nature Communications, Dec. 2014, 8 pages.
Notice of Reasons for Refusal for Japanese Patent Application No. 2020-034093, dated Jun. 1, 2021, 10 pages.
Intention to Grant for European Patent Application No. 16879927.8, dated Jun. 9, 2021, 5 pages.
Official Notification for Eurasion Patent Application No. 20182199, dated Jun. 4, 2021, 12 pages.
Intention to Grant for European Patent Application No. 17776536.9, dated Jul. 2, 2021, 7 pages.
Request for additional materials for Eurasian Patent Application No. 201990587, dated May 21, 2021, 6 pages.
Written Opinion for Brazilian Patent Application No. 112018076559, dated Jun. 8, 2021, 6 pages.
Notification of the Third Office Action for Chinese Patent Application No. 2017800249783, dated May 21, 2021, 8 pages.
Official Notification for Eurasian Patent Application No. 201892118, dated Jun. 18, 2021, 8 pages.
Examination Report for European Patent Application No. 17771081.1, dated Jun. 17, 2021, 4 pages.
Extended European Search Report for European Patent Application No. 18832324.0, dated Jun. 24, 2021, 15 pages.

(56) References Cited

OTHER PUBLICATIONS

An, et al., "Fabrication of graphene/polypyrrole nanotube/MnO2 nanotube composite and its supercapacitor application," European Physical Journal, Applied Physics, vol. 58, 2012, 9 pages.

Gu, et al., "Synthesis of polyaniline nanotubes with controlled rectangular or square pore shape," Materials Letters, vol. 121, 2014, pp. 12-14.

Liu, Jianhua, et al., "Synthesis of a Graphene-Polypyrrole Nanotube Composite and Its Application in Supercapacitor Electrode," Journal of the Electrochemical Society, vol. 159, Issue 6, Apr. 2012, 6 pages.

Wang, et al., "Polyaniline nanotube arrays as high-performance flexible electrodes for electrochemical energy storage devices," Journal of Materials Chemistry, vol. 22, 2012, pp. 2401-2404.

Non-Final Office Action for U.S. Appl. No. 16/751,314, dated Jul. 13, 2021, 13 pages.

Office Action for Canadian Patent Application No. 2,952,233, dated Jun. 29, 2021, 4 pages.

Office Action for Eurasian Patent Application No. 201790003, dated May 20, 2021, 7 pages.

Written Opinion for Brazilian Patent Application No. 112019004128, dated Jun. 25, 2021, 6 pages.

Notice of Acceptance for Australian Patent Application No. 2016378400, dated Jul. 30, 2021, 3 pages.

\* cited by examiner

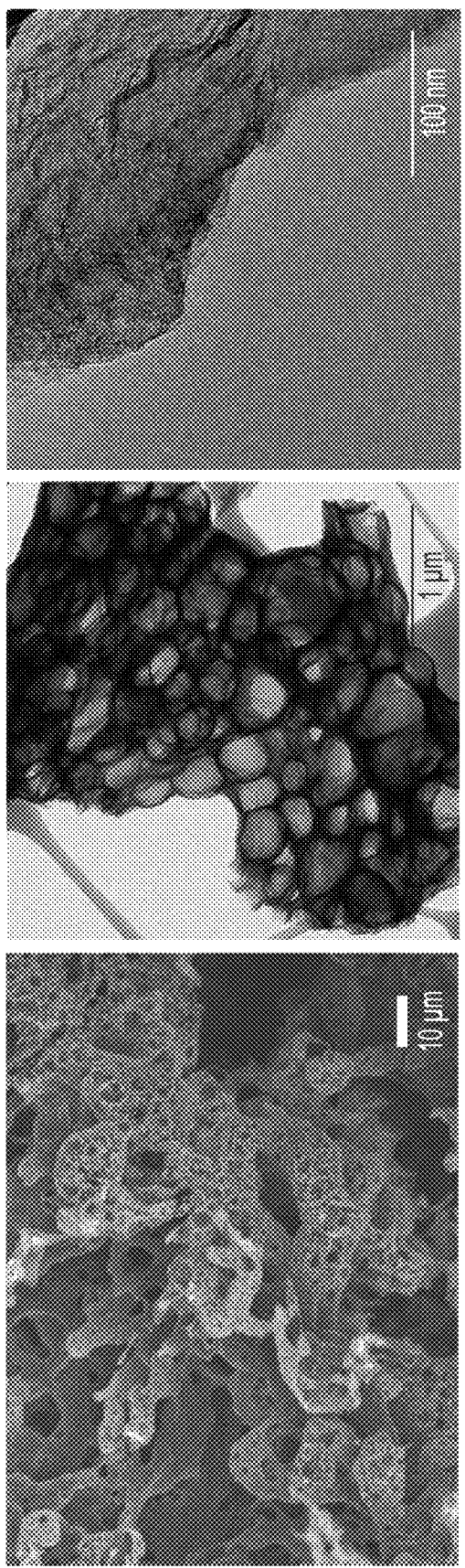

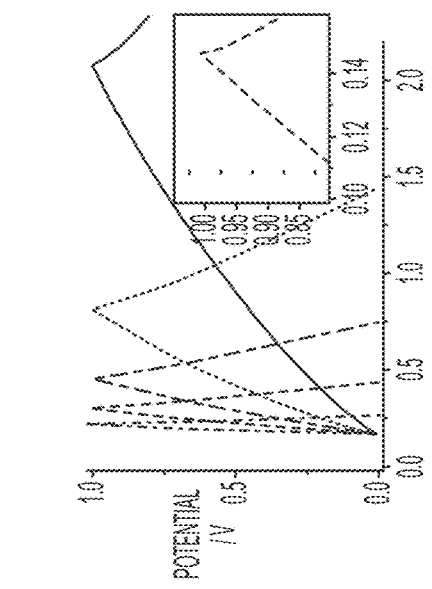
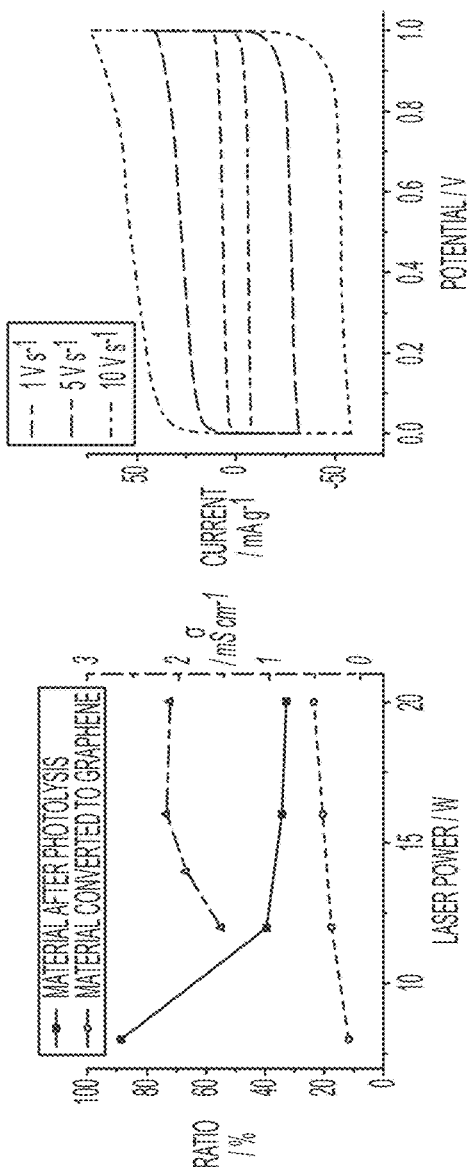
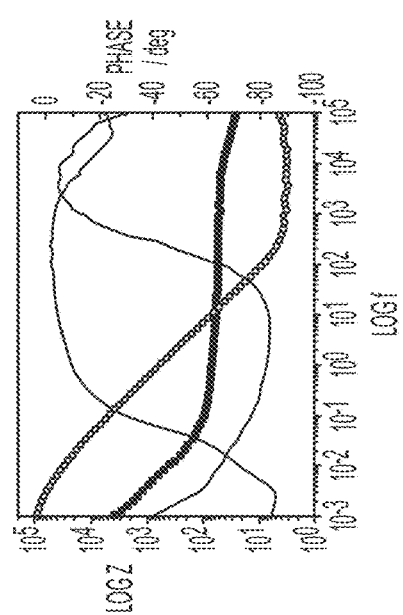
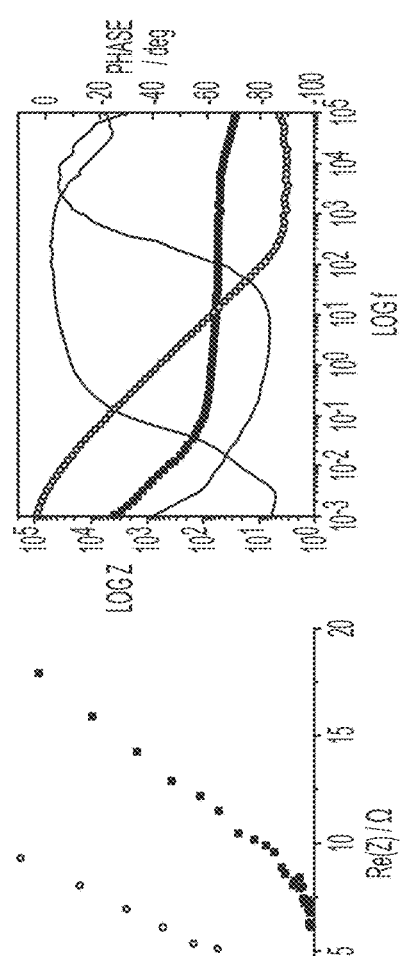
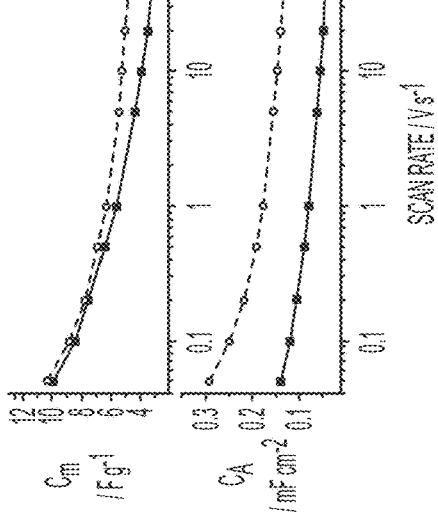
FIG. 10A  FIG. 10B  FIG. 10C
FIG. 10D  FIG. 10E  FIG. 10F

SIMPLE ROUTE TO HIGHLY CONDUCTIVE POROUS GRAPHENE FROM CARBON NANODOTS FOR SUPERCAPACITOR APPLICATIONS

RELATED APPLICATIONS

This application claims the benefit of provisional patent application Ser. No. 62/532,684, filed Jul. 14, 2017, the disclosure of which is hereby incorporated herein by reference in its entirety.

BACKGROUND

The global energy supply is one of the biggest issues facing materials science and technology. For the transition from fossil fuels to renewables, major improvements in current technology and investigation of new materials are essential.

SUMMARY

Disclosed herein are methods and compositions directed to a promising class of nanomaterials called organic nanoparticles, or carbon nanodots (CNDs), which have multiple applications in fields ranging from optoelectronics to biomedicine. The present disclosure provides a facile method for the conversion of biomolecule-based CNDs into high surface area three-dimensional graphene networks with excellent electrochemical properties.

In some embodiments, CNDs are prepared by either oxidative cutting of larger graphitic carbons or carbonization of amorphous precursors. Carbonization of amorphous precursors transforms amorphous carbon to graphitic carbon using various biomaterials and biomolecules containing a high amount of oxidized groups. Key electrochemical properties of CNDs can be altered by controlling the conditions during the carbonization process, such as temperature and pressure, and selecting a suitable precursor.

It is recognized herein that the tunable and optimal morphological and electronic properties of CNDs, such as surface area, crystalline domains, and charge trapping centers, enable use of CNDs as electroactive components in energy storage devices such as electrochemical capacitors, supercapacitors, batteries, hybrid supercapacitors, and pseudocapacitors. Although CNDs have intrinsically low electrical conductivity and complex electrochemical behavior that may hinder their direct application in supercapacitors, their abundance of surface functional groups enables a multitude of modifications and reactions. As an example, in some embodiments, thermal treatment (thermolysis) is used to enable the modification of such material properties or conversion into graphene by light or laser irradiation. Moreover, as CNDs contain a graphitic/graphenic core to form smaller homologues of graphene, they can be used as precursors for larger extended π-systems.

Provided herein is a carbon network comprising turbostratic graphene. In some embodiments, the carbon network comprising turbostratic graphene has an active surface area of at least about 230 square meters per gram ($m^2/g$). In some embodiments, the carbon network comprising turbostratic graphene has an active surface area of at least about 100 $m^2/g$, at least about 120 $m^2/g$, at least about 140 $m^2/g$, at least about 160 $m^2/g$, at least about 180 $m^2/g$, at least about 200 $m^2/g$, at least about 220 $m^2/g$, at least about 240 $m^2/g$, at least about 260 $m^2/g$, at least about 280 $m^2/g$, or at least about 300 $m^2/g$. In some embodiments, the carbon network comprising turbostratic graphene has an electrical conductivity of at least about 200 siemens per meter (S/m). In some embodiments, the carbon network comprising turbostratic graphene has an electrical conductivity of at least about 100 S/m, at least about 120 S/m, at least about 140 S/m, at least about 160 S/m, at least about 180 S/m, at least about 200 S/m, at least about 220 S/m, at least about 240 S/m, at least about 260 S/m, at least about 280 S/m, or at least about 300 S/m.

In some embodiments, the porous carbon network has an average pore size of about 10 nm to about 100,000 nm. In some embodiments, the porous carbon network has an average pore size of at least about 10 nm. In some embodiments, the porous carbon network has an average pore size of at most about 100,000 nm. In some embodiments, the porous carbon network has an average pore size of about 10 nm to about 50 nm, about 10 nm to about 100 nm, about 10 nm to about 500 nm, about 10 nm to about 1,000 nm, about 10 nm to about 5,000 nm, about 10 nm to about 10,000 nm, about 10 nm to about 50,000 nm, about 10 nm to about 100,000 nm, about 50 nm to about 100 nm, about 50 nm to about 500 nm, about 50 nm to about 1,000 nm, about 50 nm to about 5,000 nm, about 50 nm to about 10,000 nm, about 50 nm to about 50,000 nm, about 50 nm to about 100,000 nm, about 100 nm to about 500 nm, about 100 nm to about 1,000 nm, about 100 nm to about 5,000 nm, about 100 nm to about 10,000 nm, about 100 nm to about 50,000 nm, about 100 nm to about 100,000 nm, about 500 nm to about 1,000 nm, about 500 nm to about 5,000 nm, about 500 nm to about 10,000 nm, about 500 nm to about 50,000 nm, about 500 nm to about 100,000 nm, about 1,000 nm to about 5,000 nm, about 1,000 nm to about 10,000 nm, about 1,000 nm to about 50,000 nm, about 1,000 nm to about 100,000 nm, about 5,000 nm to about 10,000 nm, about 5,000 nm to about 50,000 nm, about 5,000 nm to about 100,000 nm, about 10,000 nm to about 50,000 nm, about 10,000 nm to about 100,000 nm, or about 50,000 nm to about 100,000 nm. In some embodiments, the porous carbon network has an average pore size of about 10 nm, about 50 nm, about 100 nm, about 500 nm, about 1,000 nm, about 5,000 nm, about 10,000 nm, about 50,000 nm, or about 100,000 nm. In some embodiments, the porous carbon network has an average pore size of at least about 10 nm, at least about 50 nm, at least about 100 nm, at least about 500 nm, at least about 1,000 nm, at least about 5,000 nm, at least about 10,000 nm, at least about 50,000 nm, or at least about 100,000 nm. In some embodiments, the porous carbon network has an average pore size of no more than about 10 nm, no more than about 50 nm, no more than about 100 nm, no more than about 500 nm, no more than about 1,000 nm, no more than about 5,000 nm, no more than about 10,000 nm, no more than about 50,000 nm, or no more than about 100,000 nm.

In some embodiments, the carbon network has a Raman spectrum with D-, G-, D', and G'-bands at about 1323 $cm^{-1}$, about 1570 $cm^{-1}$, about 1604 $cm^{-1}$, and about 2636 $cm^{-1}$. In some embodiments, the carbon network further comprises an amorphous carbon structure having a Raman spectrum with a D band at about 1324 $cm^{-1}$. In some embodiments, the carbon network further comprises an amorphous carbon structure having a Raman spectrum with a D** band at about 1468 $cm^{-1}$. In some embodiments, the carbon network further comprises an amorphous carbon structure having a Raman spectrum with a G bands at about 1574 $cm^{-1}$. In some embodiments, the carbon network has a G' band spectrum curve with a full width at half maximum of about 74 $cm^{-1}$. In some embodiments, the carbon network has an elemental composition of about 89% carbon, about 8% oxygen, and nitrogen. In some embodiments, the carbon network has an elemental composition of about 89% carbon, about 8% oxygen, and about 3% nitrogen. In some embodiments, the carbon network has an elemental composition of 89% carbon, 8% oxygen, and 3% nitrogen. In yet other embodiments, the carbon network has an elemental composition of about 90% carbon, about 8% oxygen, and nitrogen.

Another aspect provided herein is an energy storage device comprising: a first electrode; and a second electrode separated from the first electrode by a dielectric, wherein at least one of the first electrode and the second electrode comprises a carbon network comprising turbostratic graphene.

In some embodiments, the energy storage device has an active surface area of at least about 230 m²/g. In some embodiments, the energy storage device has an active surface area of at least about 100 m²/g, at least about 120 m²/g, at least about 140 m²/g, at least about 160 m²/g, at least about 180 m²/g, at least about 200 m²/g, at least about 220 m²/g, at least about 240 m²/g, at least about 260 m²/g, at least about 280 m²/g, or at least about 300 m²/g. In some embodiments, the energy storage device has an electrical conductivity of at least about 200 S/m. In some embodiments, the energy storage device has an electrical conductivity of at least about 100 S/m, at least about 120 S/m, at least about 140 S/m, at least about 160 S/m, at least about 180 S/m, at least about 200 S/m, at least about 220 S/m, at least about 240 S/m, at least about 260 S/m, at least about 280 S/m, or at least about 300 S/m. In some embodiments, the energy storage device has an energy density of about 7.5 watt-hours per kilogram (Wh/kg) at a power density of at least about 860 kilowatts. In some embodiments, the energy storage device has an energy density of at least about 3.0 Wh/kg, at least about 3.5 Wh/kg, at least about 4.0 Wh/kg, at least about 4.5 Wh/kg, at least about 5.0 Wh/kg, at least about 5.5 Wh/kg, at least about 6.0 Wh/kg, at least about 6.5 Wh/kg, at least about 7.0 Wh/kg, at least about 7.5 Wh/kg, at least about 8.0 Wh/kg, at least about 8.5 Wh/kg, or at least about 9.0 Wh/kg at a power density of at least about 800 kW kg$^{-1}$, at least about 820 kW kg$^{-1}$, at least about 840 kW kg$^{-1}$, at least about 860 kW kg$^{-1}$, at least about 880 kW kg$^{-1}$, at least about 900 kW kg$^{-1}$, at least about 920 kW kg$^{-1}$, at least about 940 kW kg$^{-1}$, at least about 960 kW kg$^{-1}$, at least about 980 kW kg$^{-1}$, or at least about 1000 kW kg$^{-1}$.

In some embodiments, the energy storage device has a charge-discharge cycling rate time constant of about 0.5 milliseconds (ms) to about 10 ms. In some embodiments, the energy storage device has a charge-discharge cycling rate time constant of about 0.5 ms to about 0.75 ms, about 0.5 ms to about 1 ms, about 0.5 ms to about 1.5 ms, about 0.5 ms to about 2 ms, about 0.5 ms to about 3 ms, about 0.5 ms to about 4 ms, about 0.5 ms to about 5 ms, about 0.5 ms to about 6 ms, about 0.5 ms to about 8 ms, about 0.5 ms to about 10 ms, about 0.75 ms to about 1 ms, about 0.75 ms to about 1.5 ms, about 0.75 ms to about 2 ms, about 0.75 ms to about 3 ms, about 0.75 ms to about 4 ms, about 0.75 ms to about 5 ms, about 0.75 ms to about 6 ms, about 0.75 ms to about 8 ms, about 0.75 ms to about 10 ms, about 1 ms to about 1.5 ms, about 1 ms to about 2 ms, about 1 ms to about 3 ms, about 1 ms to about 4 ms, about 1 ms to about 5 ms, about 1 ms to about 6 ms, about 1 ms to about 8 ms, about 1 ms to about 10 ms, about 1.5 ms to about 2 ms, about 1.5 ms to about 3 ms, about 1.5 ms to about 4 ms, about 1.5 ms to about 5 ms, about 1.5 ms to about 6 ms, about 1.5 ms to about 8 ms, about 1.5 ms to about 10 ms, about 2 ms to about 3 ms, about 2 ms to about 4 ms, about 2 ms to about 5 ms, about 2 ms to about 6 ms, about 2 ms to about 8 ms, about 2 ms to about 10 ms, about 3 ms to about 4 ms, about 3 ms to about 5 ms, about 3 ms to about 6 ms, about 3 ms to about 8 ms, about 3 ms to about 10 ms, about 4 ms to about 5 ms, about 4 ms to about 6 ms, about 4 ms to about 8 ms, about 4 ms to about 10 ms, about 5 ms to about 6 ms, about 5 ms to about 8 ms, about 5 ms to about 10 ms, about 6 ms to about 8 ms, about 6 ms to about 10 ms, or about 8 ms to about 10 ms. In some embodiments, the energy storage device has a charge-discharge cycling rate time constant of about 0.5 ms, about 0.75 ms, about 1 ms, about 1.5 ms, about 2 ms, about 3 ms, about 4 ms, about 5 ms, about 6 ms, about 8 ms, or about 10 ms. In some embodiments, the energy storage device has a charge-discharge cycling rate time constant of at least about 0.5 ms, at least about 0.75 ms, at least about 1 ms, at least about 1.5 ms, at least about 2 ms, at least about 3 ms, at least about 4 ms, at least about 5 ms, at least about 6 ms, at least about 8 ms, or at least about 10 ms. In some embodiments, the energy storage device has a charge-discharge cycling rate time constant of at most about 0.5 ms, at most about 0.75 ms, at most about 1 ms, at most about 1.5 ms, at most about 2 ms, at most about 3 ms, at most about 4 ms, at most about 5 ms, at most about 6 ms, at most about 8 ms, or at most about 10 ms.

In some embodiments, the porous carbon network has an average pore size of about 10 nm to about 100,000 nm. In some embodiments, the porous carbon network has an average pore size of at least about 10 nm. In some embodiments, the porous carbon network has an average pore size of at most about 100,000 nm. In some embodiments, the porous carbon network has an average pore size of about 10 nm to about 50 nm, about 10 nm to about 100 nm, about 10 nm to about 500 nm, about 10 nm to about 1,000 nm, about 10 nm to about 5,000 nm, about 10 nm to about 10,000 nm, about 10 nm to about 50,000 nm, about 10 nm to about 100,000 nm, about 50 nm to about 100 nm, about 50 nm to about 500 nm, about 50 nm to about 1,000 nm, about 50 nm to about 5,000 nm, about 50 nm to about 10,000 nm, about 50 nm to about 50,000 nm, about 50 nm to about 100,000 nm, about 100 nm to about 500 nm, about 100 nm to about 1,000 nm, about 100 nm to about 5,000 nm, about 100 nm to about 10,000 nm, about 100 nm to about 50,000 nm, about 100 nm to about 100,000 nm, about 500 nm to about 1,000 nm, about 500 nm to about 5,000 nm, about 500 nm to about 10,000 nm, about 500 nm to about 50,000 nm, about 500 nm to about 100,000 nm, about 1,000 nm to about 5,000 nm, about 1,000 nm to about 10,000 nm, about 1,000 nm to about 50,000 nm, about 1,000 nm to about 100,000 nm, about 5,000 nm to about 10,000 nm, about 5,000 nm to about 50,000 nm, about 5,000 nm to about 100,000 nm, about 10,000 nm to about 50,000 nm, about 10,000 nm to about 100,000 nm, or about 50,000 nm to about 100,000 nm. In some embodiments, the porous carbon network has an average pore size of about 10 nm, about 50 nm, about 100 nm, about 500 nm, about 1,000 nm, about 5,000 nm, about 10,000 nm, about 50,000 nm, or about 100,000 nm. In some embodiments, the porous carbon network has an average pore size of at least about 10 nm, at least about 50 nm, at least about 100 nm, at least about 500 nm, at least about 1,000 nm, at least about 5,000 nm, at least about 10,000 nm, at least about 50,000 nm, or at least about 100,000 nm. In some embodiments, the porous carbon network has an average pore size of no more than about 10 nm, no more than about 50 nm, no more than about 100 nm, no more than about 500 nm, no more than about 1,000 nm, no more than about 5,000 nm, no more than about 10,000 nm, no more than about 50,000 nm, or no more than about 100,000 nm.

In some embodiments, the carbon network has a Raman spectrum with a D band at about 1323 cm$^{-1}$. In some embodiments, the carbon network has a Raman spectrum with a G-band at about 1570 cm$^{-1}$. In some embodiments, the carbon network has a Raman spectrum with a D' band at about 1604 cm$^{-1}$. In some embodiments, the carbon network has a Raman spectrum with a G'-band at about 2636 cm$^{-1}$. In some embodiments, the capacitor further comprises an amorphous carbon structure. In some embodiments, the amorphous carbon structure has a Raman spectrum with a D band at about 1324 cm$^{-1}$. In some embodiments, the amorphous carbon structure has a Raman spectrum with a D** band at about 1468 cm$^{-1}$. In some embodiments, the amorphous carbon structure has a Raman spectrum with a G band at about 1574 cm$^{-1}$. In some embodiments, the carbon network has a G' band spectrum curve with a full width at half maximum of about 74 cm$^{-1}$. In some embodiments, the carbon network is porous.

In some embodiments, the carbon network has an elemental composition of about 89% carbon, about 8% oxygen, and about 3% nitrogen. In some embodiments, the carbon network has an elemental composition of about 89% carbon, about 8% oxygen, and nitrogen. In some embodiments, the carbon network has an elemental composition of 89% carbon, 8% oxygen, and 3% nitrogen.

In some embodiments, the capacitor has a specific gravimetric capacitance of at least about 4 farads per gram (F/g), 5 F/g, 6 F/g, 8 F/g, 9 F/g, 10 F/g, 12 F/g, 15 F/g, or 20 F/g. In some embodiments, the capacitor has a specific gravimetric capacitance of about 4 F/g to about 20 F/g. In some embodiments, the capacitor has a specific volumetric capacitance of at least about 10 millifarads per cubic centimeter (mF/cm$^3$), 15 mF/cm$^3$, 20 mF/cm$^3$, 25 mF/cm$^3$, 30 mF/cm$^3$, 40 mF/cm$^3$, 50 mF/cm$^3$, or 60 mF/cm$^3$. In some embodiments, the capacitor has a specific volumetric capacitance of about 10 mF/cm$^3$ to about 60 mF/cm$^3$. In some embodiments, the capacitor has a capacitance after at least about 20,000 charge-discharge cycles of about 85%, 90%, 94%, 98%, or 99% of the initial capacitance. In some embodiments, the capacitor has a capacitance after at least about 20,000 charge-discharge cycles of about 85% to about 99% of the initial capacitance. In some embodiments, the capacitor has an equivalent series resistance of about 3 ohms to about 5 ohms. In some embodiments, the capacitor has an equivalent series resistance of at least about 3 ohms, at least about 4 ohms, or at least about 5 ohms. In some embodiments, the capacitor has an equivalent series resistance of at most about 3 ohms, at most about 4 ohms, or at most about 5 ohms.

Another aspect provided herein is a method for synthesizing a carbon network comprising: dissolving CNDs in a solvent to provide a CND slurry; casting the CND slurry onto a substrate; drying the CND slurry to provide a dry CND film; and irradiating the dry CND film with a light beam with a power level that is sufficient to convert at least a portion of the dry CND film into turbostratic graphene.

In some embodiments, the CNDs are irradiated at a predetermined temperature of about 200° C. to about 400° C. In some embodiments, the CNDs are irradiated at a predetermined temperature of at least about 200° C. In some embodiments, the CNDs are irradiated at a predetermined temperature of at most about 400° C. In some embodiments, the CNDs are irradiated for a predetermined time of about 1 hour to about 4 hours. In some embodiments, the CNDs are irradiated for a predetermined time of at least about 1 hour. In some embodiments, the CNDs are irradiated for a predetermined time of at most about 4 hours. In some embodiments, the solvent is an organic liquid. In some embodiments, the organic liquid is N-methyl-2-pyrrolidone (NMP).

In some embodiments, the CND slurry has a CND-to-NMP ratio of about 0.3:1 to about 0.9:1. In some embodiments, the CND slurry has a CND-to-NMP ratio of at least about 0.3:1, at least about 0.4:1, at least about 0.5:1, at least about 0.6:1, at least about 0.7:1, at least about 0.8:1, or at least about 0.9:1. In some embodiments, the CND slurry has a CND-to-NMP ratio of at most about 0.3:1, at most about 0.4:1, at most about 0.5:1, at most about 0.6:1, at most about 0.7:1, at most about 0.8:1, or at most about 0.9:1. In some embodiments, the CND slurry has a CND-to-NMP ratio of about 0.3:1 to about 0.4:1, about 0.3:1 to about 0.5:1, about 0.3:1 to about 0.6:1, about 0.3:1 to about 0.7:1, about 0.3:1 to about 0.8:1, about 0.3:1 to about 0.9:1, about 0.4:1 to about 0.5:1, about 0.4:1 to about 0.6:1, about 0.4:1 to about 0.7:1, about 0.4:1 to about 0.8:1, about 0.4:1 to about 0.9:1, about 0.5:1 to about 0.6:1, about 0.5:1 to about 0.7:1, about 0.5:1 to about 0.8:1, about 0.5:1 to about 0.9:1, about 0.6:1 to about 0.7:1, about 0.6:1 to about 0.8:1, about 0.6:1 to about 0.9:1, about 0.7:1 to about 0.8:1, about 0.7:1 to about 0.9:1, or about 0.8:1 to about 0.9:1. In some embodiments, the CND slurry has a CND-to-NMP ratio of about 0.3:1, about 0.4:1, about 0.5:1, about 0.6:1, about 0.7:1, about 0.8:1, or about 0.9:1.

In some embodiments, the light beam is generated by a laser. In some embodiments, the laser is a carbon dioxide laser. In some embodiments, the light beam has a power of about 8 W to about 13 W. In some embodiments, the light beam has a power of at least about 8 W, at least about 9 W, at least about 10 W, at least about 11 W, at least about 12 W, or at least about 13 W. In some embodiments, light beam has a power of at most about 13 W. In some embodiments, light beam has a power of about 12 W to about 13 W.

In some embodiments, the method further comprises synthesizing the CNDs from citric acid and urea, before dissolving the CNDs in the solvent. In some embodiments, the turbostratic graphene has an active surface area of at least about 230 square meters per gram (m$^2$/g). In some embodiments, the turbostratic graphene has an active surface area of at least about 100 m$^2$/g, at least about 120 m$^2$/g, at least about 140 m$^2$/g, at least about 160 m$^2$/g, at least about 180 m$^2$/g, at least about 200 m$^2$/g, at least about 220 m$^2$/g, at least about 240 m$^2$/g, at least about 260 m$^2$/g, at least about 280 m$^2$/g, or at least about 300 m$^2$/g. In some embodiments, the turbostratic graphene has an electrical conductivity of at least about 200 S/m. In some embodiments, the turbostratic graphene has an electrical conductivity of at least about 100 S/m, at least about 120 S/m, at least about 140 S/m, at least about 160 S/m, at least about 180 S/m, at least about 200 S/m, at least about 220 S/m, at least about 240 S/m, at least about 260 S/m, at least about 280 S/m, or at least about 300 S/m.

In some embodiments, the method produces a carbon network with a Raman spectrum having a D-band at about 1323 cm$^{-1}$. In some embodiments, the method produces a carbon network with a Raman spectrum having a G-band at about 1570 cm$^{-1}$. In some embodiments, the method produces a carbon network with a Raman spectrum having a D' band at about 1604 cm$^{-1}$. In some embodiments, the method produces a carbon network with a Raman spectrum having a G'-band at about 2636 cm$^{-1}$. In some embodiments, the method produces an amorphous carbon structure with a Raman spectrum having a D band at about 1324 cm$^{-1}$. In some embodiments, the method produces an amorphous carbon structure with a Raman spectrum having a D** band at about 1468 cm$^{-1}$. In some embodiments, the method produces an amorphous carbon structure with a Raman spectrum having a G band at about 1574 cm$^{-1}$. In some embodiments, the carbon network has a G' band spectrum curve with a full width at half maximum of about 74 cm$^{-1}$.

In some embodiments, the porous carbon network has an average pore size of about 10 nm to about 100,000 nm. In some embodiments, the porous carbon network has an average pore size of at least about 10 nm. In some embodiments, the porous carbon network has an average pore size of at most about 100,000 nm. In some embodiments, the porous carbon network has an average pore size of about 10 nm to about 50 nm, about 10 nm to about 100 nm, about 10 nm to about 500 nm, about 10 nm to about 1,000 nm, about 10 nm to about 5,000 nm, about 10 nm to about 10,000 nm, about 10 nm to about 50,000 nm, about 10 nm to about 100,000 nm, about 50 nm to about 100 nm, about 50 nm to about 500 nm, about 50 nm to about 1,000 nm, about 50 nm to about 5,000 nm, about 50 nm to about 10,000 nm, about 50 nm to about 50,000 nm, about 50 nm to about 100,000 nm, about 100 nm to about 500 nm, about 100 nm to about 1,000 nm, about 100 nm to about 5,000 nm, about 100 nm to about 10,000 nm, about 100 nm to about 50,000 nm, about 100 nm to about 100,000 nm, about 500 nm to about 1,000 nm, about 500 nm to about 5,000 nm, about 500 nm to about 10,000 nm, about 500 nm to about 50,000 nm, about 500 nm to about 100,000 nm, about 1,000 nm to about 5,000 nm, about 1,000 nm to about 10,000 nm, about 1,000 nm to about 50,000 nm, about 1,000 nm to about 100,000 nm, about 5,000 nm to about 10,000 nm, about 5,000 nm to about 50,000 nm, about 5,000 nm to about 100,000 nm, about 10,000 nm to about 50,000 nm, about 10,000 nm to about 100,000 nm, or about 50,000 nm to about 100,000 nm. In some embodiments, the porous carbon network has an average pore size of about 10 nm, about 50 nm, about 100 nm, about 500 nm, about 1,000 nm, about 5,000 nm, about 10,000 nm, about 50,000 nm, or about 100,000 nm. In some embodiments, the porous carbon network has an average pore size of at least about 10 nm, at least about 50 nm, at least about 100 nm, at least about 500 nm, at least about 1,000 nm, at least about 5,000 nm, at least about 10,000 nm, at least about 50,000 nm, or at least about 100,000 nm. In some embodiments, the porous carbon network has an average pore size of no more than about 10 nm, no more than about 50 nm, no more than about 100 nm, no more than about 500 nm, no more than about 1,000 nm, no more than about 5,000 nm, no more than about 10,000 nm, no more than about 50,000 nm, or no more than about 100,000 nm.

In some embodiments, the carbon network has an elemental composition of carbon, oxygen, and nitrogen. In some embodiments, the carbon network has an elemental composition of about 89% carbon, about 8% oxygen, and about 3% nitrogen. In some embodiments, the carbon network has an elemental composition of about 89% carbon, about 8% oxygen, and nitrogen. In some embodiments, the carbon network has an elemental composition of 89% carbon, 8% oxygen, and 3% nitrogen. In some embodiments, the carbon network has an elemental composition of at least about 40% carbon. In some embodiments, the carbon network has an elemental composition of at least about 4% oxygen, at least about 5% oxygen, at least about 6% oxygen, at least about 7% oxygen, or at least about 8% oxygen.

Those skilled in the art will appreciate the scope of the present disclosure and realize additional aspects thereof after reading the following detailed description in association with the accompanying drawings.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 1A is an illustration of exemplary synthesized CNDs, in accordance with some embodiments.

FIG. 1B is an illustration of exemplary thermolysis process of converting the CND to CND300, in accordance with some embodiments.

FIG. 1C is an illustration of exemplary process of applying a CND300/NMP (N-methyl-2-pyrrolidone) slurry on a substrate, in accordance with some embodiments.

FIG. 1D is an illustration of exemplary doctor blading apparatus, in accordance with some embodiments.

FIG. 1E is an illustration of an exemplary process of evaporating NMP, in accordance with some embodiments.

FIG. 1F is an illustration of exemplary process of laser-assisted conversion of CND300 into 3D-ts-graphene, in accordance with some embodiments.

FIG. 3A is a graph showing the percent weight loss of an exemplary CND sample at different treatment temperatures in the presence of oxygen or nitrogen, in accordance with some embodiments.

FIG. 3B is an X-ray photoelectron C1s, N1s, and O1s spectra of an exemplary CND100-400, in accordance with some embodiments.

FIG. 3C are Raman spectra of an exemplary CND100-400 upon excitation at a frequency of about 633 nm, in accordance with some embodiments.

FIG. 3D is a powder X-ray diffraction pattern of an exemplary CND100-400, in accordance with some embodiments.

FIG. 3E shows normalized Fourier-transform infrared spectroscopy spectra of an exemplary CND100-400, in accordance with some embodiments.

FIGS. 4A-4C show images of an exemplary 3D-ts-graphene network (laser scribed CND300), in accordance with some embodiments.

FIG. 4A is a scanning electron microscopy image of 3D-ts-graphene obtained at 3 kV, in accordance with some embodiments.

FIG. 4B is a transmission electron microscopy image of a fragment of an exemplary 3D-ts-graphene at 120 kV, in accordance with some embodiments.

FIG. 4C is a high-magnification transmission electron microscopy image of the edge of an exemplary 3D-ts-graphene fragment, in accordance with some embodiments.

FIG. 6A is a typical Raman spectrum of an exemplary 3D-ts-graphene obtained upon excitation at about 633 nm, in accordance with some embodiments.

FIG. 6B is a X-ray photoelectron spectroscopy spectrum of an exemplary CND3001s with a zoom-in to the C1s peak, in accordance with some embodiments.

FIGS. 10A-10F show electrochemical data of an exemplary 3D-ts-graphene electrochemical capacitor with an electrolyte comprising 0.1 M TBAPF$_6$ solution in acetonitrile, in accordance with some embodiments.

FIG. 10A is graph of material conversion versus laser power and conductivity versus laser power for an exemplary 3D-ts-graphene, in accordance with some embodiments.

FIG. 10B are cyclic voltammograms an exemplary 3D-ts-graphene in an operative electrochemical window of 1.0 V at scan rates of 200, 500, and 1000 mV s$^{-1}$, in accordance with some embodiments.

FIG. 10C are galvanostatic charge-discharge curves at different current densities of an exemplary 3D-ts-graphene, in accordance with some embodiments.

FIG. 10D is specific gravimetric and areal capacitances of exemplary 3D-ts-graphene electrochemical capacitors with one or three sequentially applied layers, as a function of the scan rate, in accordance with some embodiments.

FIG. 10E is Nyquist plot of exemplary 3D-ts-graphene electrochemical capacitors with one or three sequentially applied layers, in accordance with some embodiments.

FIG. 10F is impedance phase angle versus frequency (Bode-plot) of exemplary 3D-ts-graphene electrochemical (Bode-plot) of exemplary 3D-ts-graphene electrochemical capacitors in comparison with a commercial activated carbon-based supercapacitor (Panasonic, 5.5 V/22 mF), in accordance with some embodiments.

DETAILED DESCRIPTION

The present disclosure provides a facile method for the conversion of biomolecule-based carbon nanodots (CNDs) into a carbon network comprising turbostratic graphene with a high surface area and excellent electrochemical properties. Further provided herein are carbon networks comprising turbostratic graphene and energy storage devices comprising the carbon network comprising turbostratic graphene.

Figure 1A:
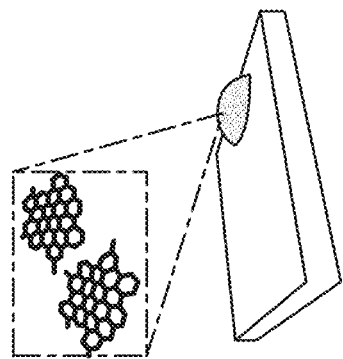
FIGS. 1A-1F show illustrations of an exemplary method of forming three-dimensional turbostratic graphene (3D-ts-graphene) from carbon nanodots (CNDs).
Figure 1B:
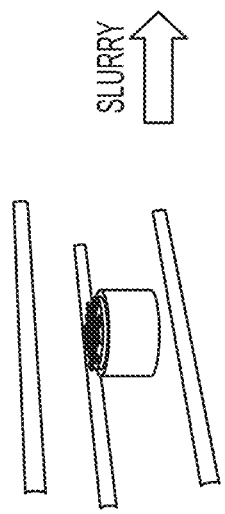
Figure 1C:
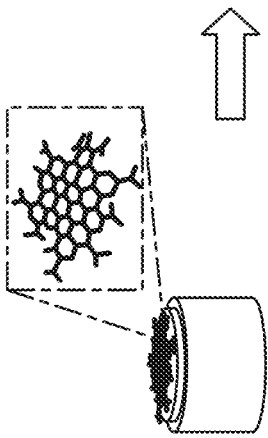
Figure 1D:
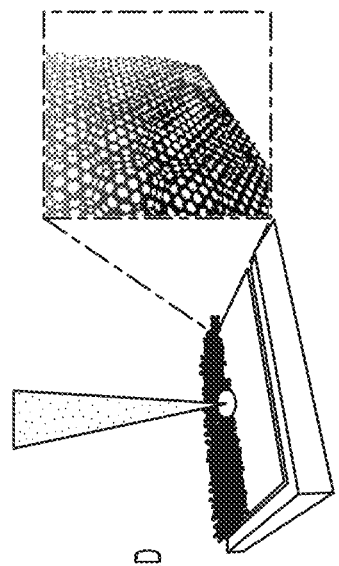
Figure 1E:
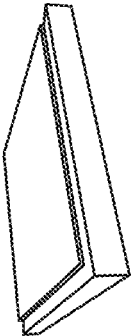
Figure 1F:
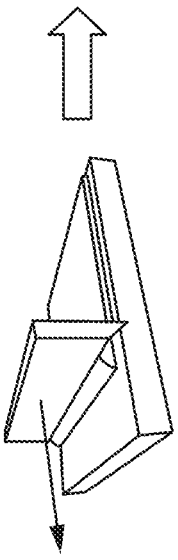

Provided herein, per FIGS. 1A-1F, is a method of converting CNDs into turbostratic graphene through thermolysis and laser treatment. FIG. 1A is an illustration of exemplary synthesized CNDs. FIG. 1B is an illustration of exemplary thermolysis process of converting the CND to CND300, in accordance with some embodiments. FIG. 1C is an illustration of exemplary process of applying a CND300/NMP (N-methyl-2-pyrrolidone) slurry on a substrate, in accordance with some embodiments. FIG. 1D is an illustration of exemplary doctor blading apparatus, in accordance with some embodiments. FIG. 1E is an illustration of an exemplary process of evaporating NMP, in accordance with some embodiments. FIG. 1F is an illustration of exemplary process of laser-assisted conversion of CND300 into three-dimensional turbostratic graphene (3D-ts-graphene), in accordance with some embodiments.

Figure 2:
FIG. 2 shows an image of an exemplary laser reaction chamber.

In some embodiments, the laser comprises an infrared laser. An exemplary laser treatment chamber is shown in FIG. 2. The simple, cost-effective, and environmentally friendly method shown and disclosed herein is capable of readily producing high-performance electrodes with capabilities similar to those of graphene-based electrodes. In some embodiments, the method of converting CNDs into turbostratic graphene employs the reaction of reduced CNDs in a CND/carbon dioxide ($CO_2$) plasma to form hierarchical porous networks of turbostratic graphene.

In some embodiments, the thermolysis is performed with small molecules. The small molecules may comprise, for instance, citric acid and urea. In some embodiments, the small molecule does not comprise graphite. In some embodiments, annealing is performed at temperatures up to about 400° C. The annealing may be performed in a tube furnace. Further, annealing may be performed in an oxygen-free environment. The method may further comprise applying CNDs on a substrate.

In some embodiments, the method comprises initially synthesizing the CNDs by microwave-assisted thermolysis and annealing. In some embodiments, the turbostratic graphene comprises a 3D-ts-graphene network. In some embodiments, the turbostratic graphene comprises a three-dimensional open porous turbostratic graphene network. The 3D-ts-graphene network exhibits excellent electrochemical properties, such as a critical hierarchical porous structure and a high surface area. For example, an exemplary 3D-ts-graphene network provided herein displays ideal capacitive behavior with a gravimetric capacitance of about 9.4 F g$^{-1}$ a scan rate of 0.1 V s$^{-1}$, an energy density of about 7.5 Wh/kg at a power density of about 870 kW kg$^{-1}$, and an extremely fast charge-discharge cycling rate with a time constant of 1.05 ms. The 3D-ts-graphene network further exhibits an ideal morphology similar to graphene aerogels and graphene foam.

Thermolysis of CNDS

Carbon nanodots feature an extended π-system in their core and a variety of functional groups on their surface. Thermal treatment of CNDs induces the cleavage of some of these functional groups such as carboxylates, amides, and hydroxyl groups. Of particular interest is the decarboxylation, as it is typically accompanied with a reduction process.

Figure 3A:
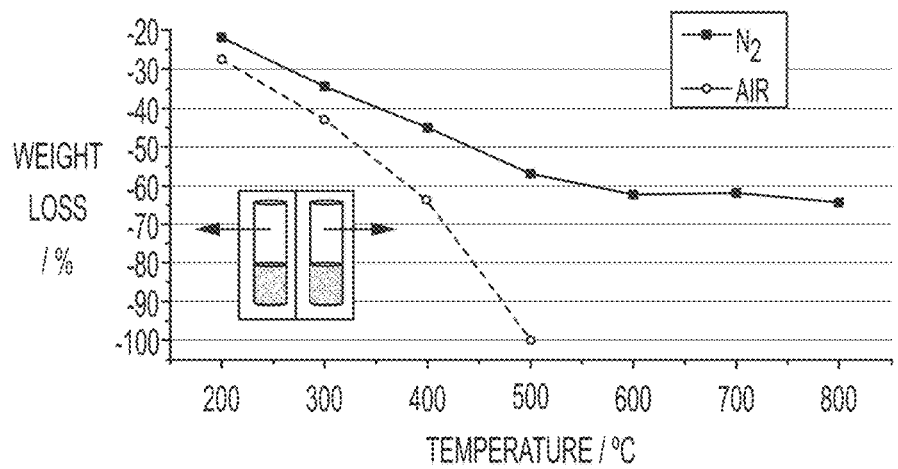
FIGS. 3A-3E are characterization graphs of an exemplary thermolyzed CND (CND100-400), in accordance with some embodiments.

In some embodiments, the as-synthesized CNDs were treated at elevated temperatures. In some embodiments, the as-synthesized CNDs were treated in a tube furnace. In some embodiments, the as-synthesized CNDs were treated in the absence of oxygen to modify their surface functionalities. Some embodiments further comprised employing a constant argon flow over the sample to ensure the transport of the outgassed material. In FIG. 3A, the weight loss of CNDs when treated at different temperatures between 200° C. and 800° C. is shown. Notably, in the presence of oxygen in the carrier gas (air), the exemplary CNDs fully decompose at temperatures of about 500° C. In the absence of oxygen, a continuous weight loss from about 20% to about 60% is observed between about 200° C. and about 500° C., and a constant mass for thermolysis temperatures is observed between about 500° C. and about 800° C.

The reaction temperature and, subsequently, the material conversion are strongly dependent on the presence of oxygen as an oxidizer in the atmosphere. In the absence of oxygen, the functional groups from CND300 may be cleaved off and the remaining electrons in the carbon form a π-conjugated network. In the presence of oxygen, carbon is removed from the conjugated skeleton of the precursors, CND300, and carried away upon reaction with oxygen ($O_2$) in the form of $CO_2$.

Exemplary CND samples were prepared by annealing CNDs at different temperatures and are denoted herein by their annealing temperature, whereby, for example, CND300 represents CNDs annealed at about 300° C. In some embodiments, annealing at higher temperatures causes decreased solubility in polar solvents typically used for CNDs, such as water, dimethyl sulfoxide (DMSO), dimethylformamide (DMF), and N-methyl-2-pyrrolidone (NMP). For example, CND300 may be more soluble in DMSO, DMF, and NMP than in water. CND350 may only be soluble in the previously mentioned solvents in trace amounts even upon applying ultrasonication or heat, as shown in FIG. 3A. In general, all CNDs are insoluble in nonpolar solvents such as toluene or chloroform.

Figure 3B:
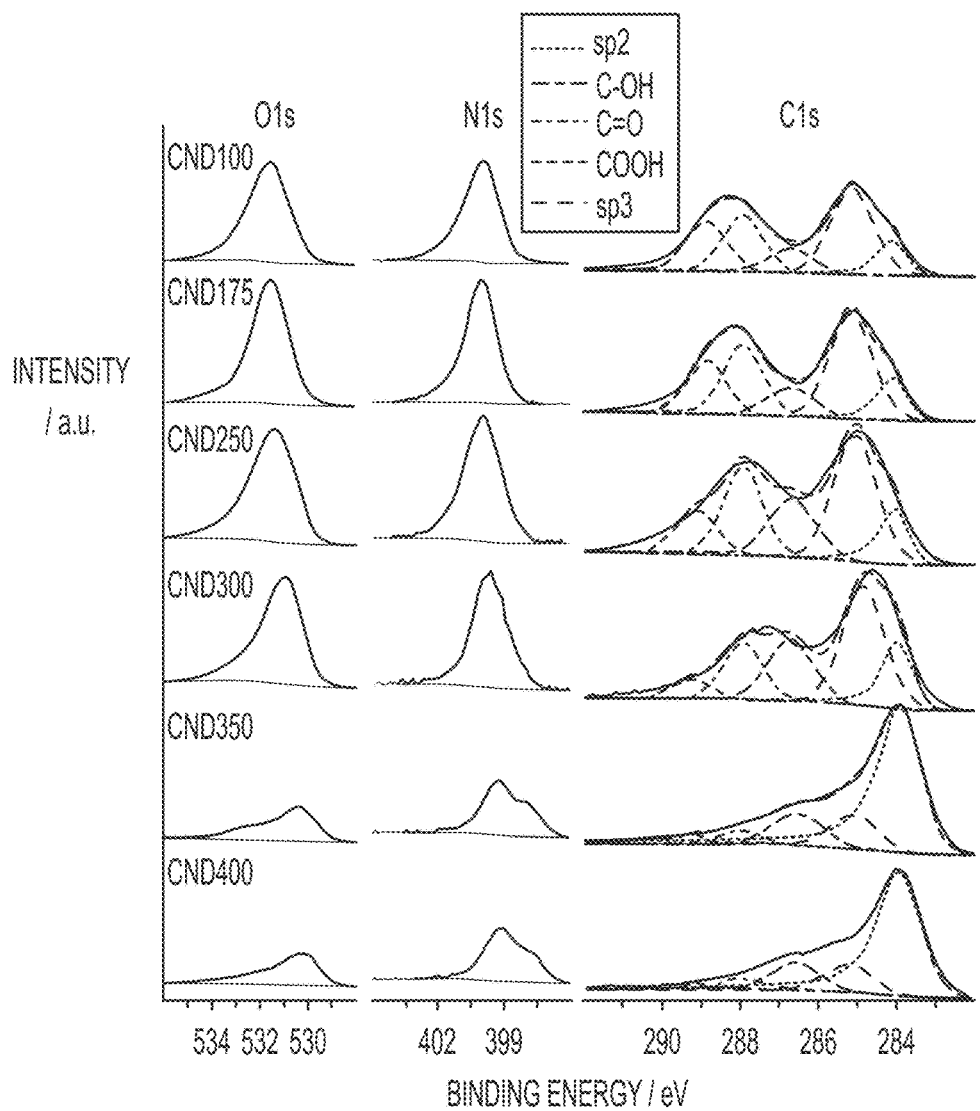

FIG. 3B shows exemplary X-ray photoelectron spectroscopy (XPS) spectra of thermolyzed CNDs, with emphasis on the C1s, N1s, and O1s regions. As seen, the increase in temperature may increase the carbon from about 57% to greater than about 70%, whereby intensity of the O1s peak gradually decreases, showing the elimination of oxygen-containing functional groups. Moreover, at temperatures greater than 300° C. the O1s peak visibly splits up into two separate peaks with maxima at about 530 eV and about 532 eV, which may show the transformation from —COH to C—O—C groups. According to the thermogravimetric analysis/mass spectrometry analysis, —OH and $CO_2$ may be the main leaving groups in this temperature region. A decrease in intensity may also be observed for the N1s peak at about 400 eV; however, at temperatures of greater than about 300° C., a second peak may evolve at about 400 eV. At the C1s region, in the temperature regime between about 100° C. and about 300° C., the oxygen bonded carbons, C—OH, C═O, and COOH, may continuously decrease in intensity. Notably, among these the COOH peak vanishes most significantly. Compared with the other peaks, the $sp^2$-hybridized carbon peak grows with increasing temperature on account of the $sp^3$-hybridized carbon peak and becomes dominant at temperatures greater than about 300° C.

The XPS data may show a conversion of functional groups and an increasing graphitization, that is, an increasing $sp^2$-hybridization upon thermolytic treatment of CNDs. With the elimination of the functional groups, in particular carboxylates, the solubility of the CNDs may decrease. A turning point from highly functionalized carbon dots to graphitized carbon dots occurs in the temperature range between about 300° C. and about 350° C.

Figure 3C:
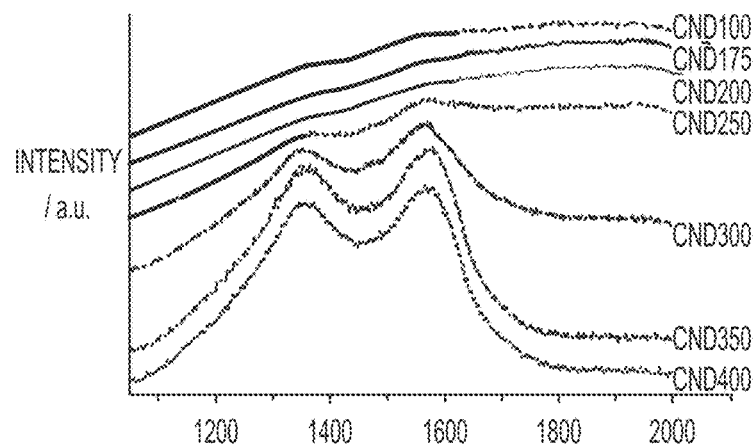

Per FIG. 3C, the Raman spectra of exemplary CNDs thermolyzed at temperatures of greater than about 300° C. are superimposed by background fluorescence, where peaks at about 1350 $cm^{-1}$ and about 1600 $cm^{-1}$ may be noticeable. At higher thermolytic temperatures, of greater than about 250° C., the fluorescence may vanish and the peaks may become more pronounced. Due to the small size of the conjugated π-systems, the D band may be very intense. Raman spectrum of CNDs between about 1000 $cm^{-1}$ and about 1700 $cm^{-1}$ comprise four peaks, namely the D*-, D-, D**-, and G-bands at about 1170 $cm^{-1}$, about 1350 $cm^{-1}$, about 1433 $cm^{-1}$, and about 1585 $cm^{-1}$. The D*- and D** bands may be found in amorphous carbon and nanocrystalline diamond or samples with $CH_3$-rich phases.

Upon annealing, the $sp^3$-carbon in hydrogenated carbon films transform into $sp^2$-carbon, whereby, with increasing thermolysis temperatures, the $sp^3$-signals, especially at about 1170 $cm^{-1}$, are found to gradually decrease. For example, CND200 shows a high intensity in the D* and D region, while for CND250 both the D* and D intensity may be significantly smaller. Since the D peak originates from a double resonant scattering process near defect sites, such as $sp^3$-carbons, its intensity is related to these signals.

Figure 3D:
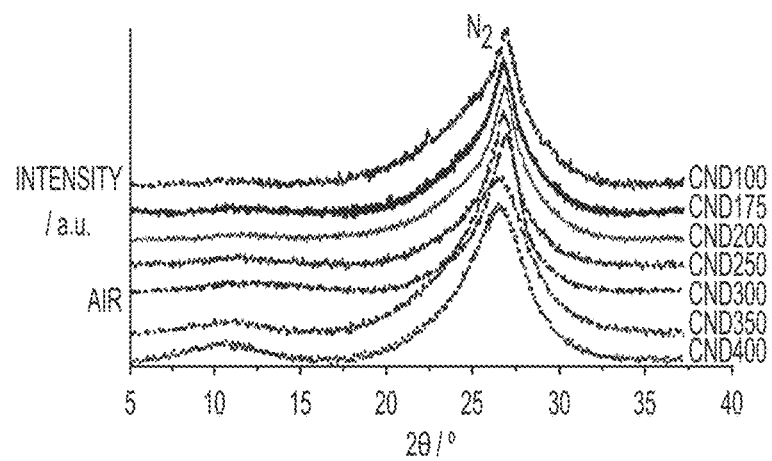

As shown in the x-ray diffraction patterns in FIG. 3D, only the long-range order of crystalline phases is detected, regardless of the presence of amorphous groups. In all samples, a peak in the 26° 2θ range is detected, where the graphitic (002) signal typically occurs, showing the presence of graphitic carbon in each sample. The exemplary samples may show a high degree of disorder, as the peak width is rather broad. In the lower temperature range between about 100° C. and about 300° C., the peaks sharpen with increasing temperature. At temperatures of greater than about 300° C., the peak broadens again and an additional broad peak at 11° 2θ evolves, which is the typical deflection angle originating from the (002) plane spacing of graphite oxide. This trend shows that with increasing temperature, the CND aggregates may gain order and a threshold is passed at which the long-range order in the material changes dramatically. These results suggest that highly disordered CNDs with a large proportion of $sp^3$-hybridized carbon convert into moderately ordered graphite-like materials with a large lattice spacing.

Figure 3E:
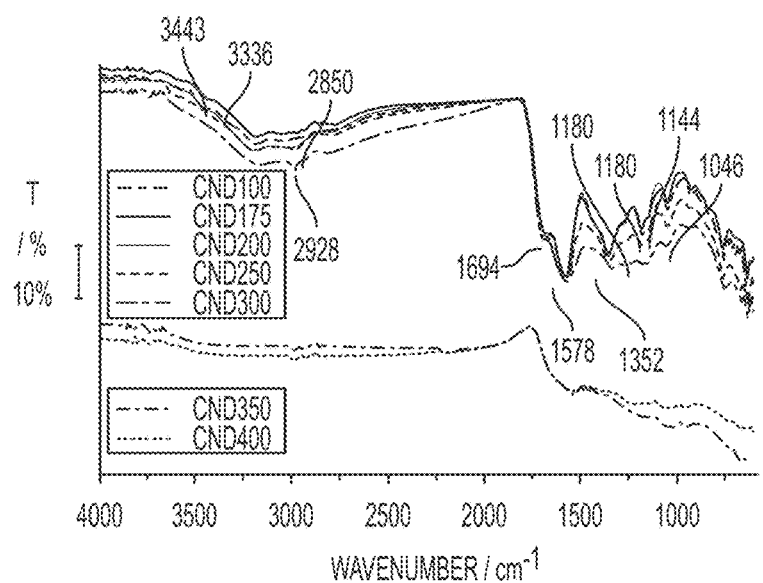
Figure 5C:
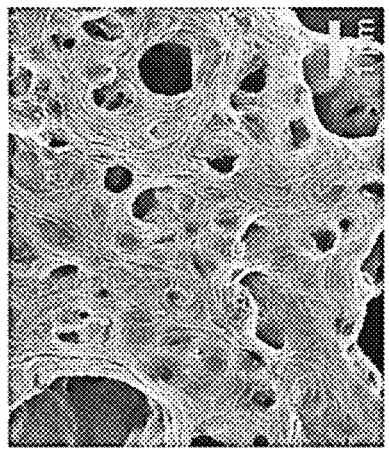
FIG. 5C shows a higher magnification SEM image of an exemplary graphene oxide sample that was laser converted in argon at 3 eV, in accordance with some embodiments.
Figure 5B:
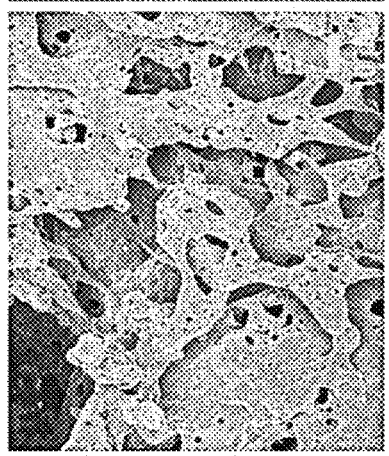
FIG. 5B shows a high-magnification SEM image of an exemplary graphene oxide sample that was laser converted in argon at 3 eV, in accordance with some embodiments.
Figure 5A:
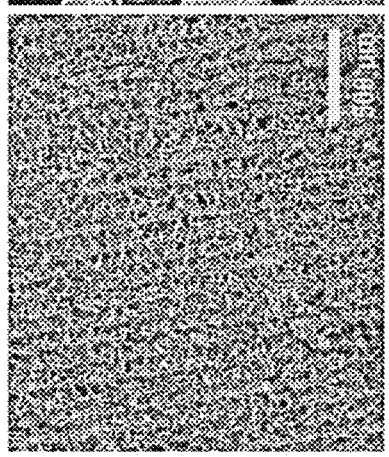
FIG. 5A shows a low-magnification scanning electron microscope (SEM) image of an exemplary graphite oxide sample that was laser-converted in argon at 3 eV, in accordance with some embodiments.
Figure 5F:
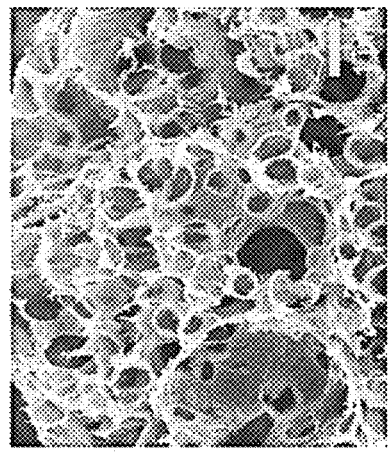
FIG. 5F shows a higher magnification SEM image of an exemplary graphene oxide sample that was laser converted in oxygen at 3 eV, in accordance with some embodiments.
Figure 5E:
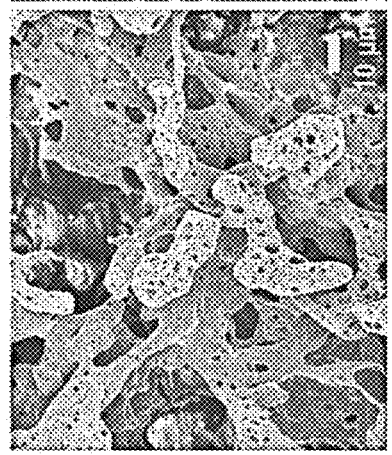
FIG. 5E shows a high-magnification SEM image of an exemplary graphene oxide sample that was laser converted in oxygen at 3 eV, in accordance with some embodiments.
Figure 5D:
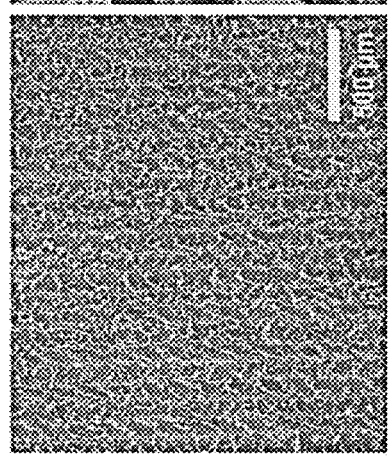
FIG. 5D shows a low-magnification SEM image of an exemplary graphene oxide sample that was laser converted in oxygen at 3 eV, in accordance with some embodiments.

Per the Fourier-transform infrared spectroscopy (FT-IR) spectra in FIG. 3E, the transformation of highly functionalized CNDs to a graphite-like material is also observable. All spectra were normalized at about 1840 $cm^{-1}$ and about 1580 $cm^{-1}$ to ensure comparability. The broad absorption maximizing at about 2793 $cm^{-1}$ and about 3173 $cm^{-1}$ are assigned to OH vibrations. A closer look reveals the presence of two peaks at about 3336 $cm^{-1}$ and about 3443 $cm^{-1}$ that are assigned to NH stretching vibrations. Both of these gradually disappear with higher thermolytic temperatures. A large bimodal peak with maxima at about 1578 $cm^{-1}$ and about 1694 $cm^{-1}$ originates from the C═C stretching vibrations of aromatic carbon and carbonyls (C═O) stemming from carboxylic acids, carboxylates, and amides. The peaks in the about 1000 $cm^{-1}$ to about 1700 $cm^{-1}$ region are typically assigned to oxidized functional groups such as C—OH, C—O—C, —C═O, and —COOH. For example, peaks at about 1046 $cm^{-1}$ and about 1248 $cm^{-1}$ are assigned to C—O—C(epoxides) and C—OH out-of-plane vibrations. The peaks at about 1144 $cm^{-1}$ and about 1180 $cm^{-1}$ may be related to either C—N stretching or C—O—C out-of-plane vibrations. The predominant absorptions of CND350 and CND400 appear at about 1578 cm$^{-1}$ and 1046 cm$^{-1}$, where aromatic C=C and C—O—C stretching vibrations are resonant. Moreover, the C—H stretching vibrations at about 2850 cm$^{-1}$ and about 2928 cm$^{-1}$ are present in all samples with a similar intensity. A gradual elimination of functional groups like —OH, —NH and —COOH is reflected in the FT-IR spectra as the features related to these groups diminish with higher thermolytic temperatures. With respect to the x-ray diffraction peak at 11° 2θ for CND350 and CND400, which is typical for graphene oxide (002), the splitting of the O1s XPS signal and the FT-IR absorptions in the about 1000 cm$^{-1}$ to about 1250 cm$^{-1}$ region, it is assumed that oxygen bound in the form of epoxides remain between the layers of graphitic nanoparticles upon thermolysis at >300° C. Even in reduced graphene oxide these peaks still appear.

The nanographitic nature of these thermolyzed CND samples makes suitable precursors for conversion to large extended graphene networks. In general, solubility is an important criterion for the processability of the samples; however, the amount and the nature of the functional groups are decisive for their reactivity.

Laser-Induced Conversion

Exemplary films of CND300 were formed on different substrates, such as aluminum, copper, polyethylene terephthalate, or glass. A slurry of CND300 was prepared in NMP in a ratio of about 2:3 (CND300/NMP). The slurry may be applied on the substrate by doctor blading to achieve homogeneous films. The films were subsequently irradiated with an infrared laser, as shown in FIG. 1F. Changes to the material are apparent to the naked eye, whereby a large part of the material is removed, and a changes in color from brownish to black occurs. In one example, up to about 60% of the initially cast CND300 material was removed. By contrast to non-irradiated CND300, the irradiated fraction may be insoluble in typical solvents such as DMSO, NMP, and DMF.

The change in morphology of the CND300 film upon laser irradiation is shown in the scanning electron microscopy (SEM) images presented in FIG. 4A. The laser-irradiated CND300 film exhibits a spongy hierarchical porous structure with average pore sizes ranging from several tens of nanometers to tens of microns. In one embodiment, the carbon network is porous having average pore sizes that range from 10 nanometers (nm) to 100 nm. In another embodiment, the carbon network is porous, having average pore sizes that range from 100 nm to 500 nm. In yet another embodiment, the carbon network is porous, having average pore sizes that range from 500 nm to 1000 nm. In still another embodiment, the carbon network is porous, having average pore sizes that range from 1000 nm to 10,000 nm. In still yet another embodiment, the carbon network is porous, having average pore sizes that range from 10,000 nm to 100,000 nm.

Ultrathin layers of carbon are seen in the high-magnification images of an exemplary 3D-ts-graphene in FIG. 4B. As seen, the pores are separated by carbon walls consisting of only a few layers of graphene. Moreover, the turbostratic nature, and the random orientation of the layers, is seen in the high-magnification transmission electron microscope (TEM) image in FIG. 4C.

In the SEM images in FIGS. 5A-5F the same principal structural features, with small differences, are observed independent of the reaction medium. More open pores are found on the surface of the laser-sintered lrCND300 in an oxygen atmosphere, per FIGS. 5D-5F, than on the surface of the laser-sintered lrCND300 in an argon atmosphere, per FIG. 5A-5C.

The exemplary 3D-ts-graphene exhibited an active surface area of about 230 m$^2$/g, determined by the dye adsorption method, which is in line with other open porous carbon networks such as graphene foam or aerographene. The TEM images of the exemplary CND300 sample show individual particles on the order of about a few nanometers and aggregated particles with sizes of about 50 nm.

Figures 6A, 6B:
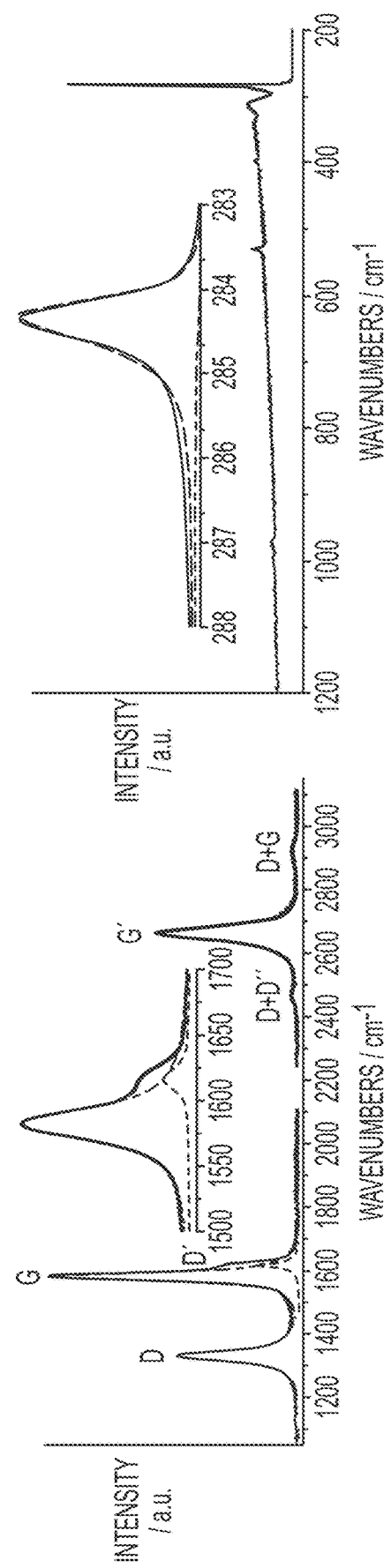
FIGS. 6A and 6B show measurement graphs of an exemplary 3D-ts-graphene network (laser scribed CND300), in accordance with some embodiments.

Raman spectra were recorded at different spots of the sample, and are shown in FIG. 6A, to form Raman maps. For the greater part of the film, a typical Raman pattern of turbostratic graphene is observed with the D-, G–, D'-, D+D'', G'-, and D+G bands at about 1324 cm$^{-1}$, 1582 cm$^{-1}$, 1617 cm$^{-1}$, 2461 cm$^{-1}$, 2655 cm$^{-1}$, and 2922 cm$^{-1}$. The G'-band was fitted with a single Lorentzian with a full width at half maximum (FWHM) of about 49 cm$^{-1}$. Ideal single, bilayer, or trilayer graphene shows either a single Lorentzian or a set of distinguishable Lorentzians with FWHM of about 24 cm$^{-1}$ at about 2700 cm$^{-1}$. The high intensities of both the D- and the D'-bands may demonstrate the high amount of defect sites within the material. Considering the small size of the precursor materials, that is, CND300, the edge states may account for the majority of defect sites.

The graphenic nature of the laser-scribed CND300 is also reflected in the XPS spectrum in FIG. 6B. The spectrum shows a strong signal in the C1s region and negligible signals in the N1s and O1s regions. Moreover, the C1s region was accurately fitted by a single Gaussian-Lorentzian peak maximizing at about 295.9 eV, which is assigned to C=C carbon. From the C1s, O1s, and N1s peak areas an elemental composition of 89% carbon, 8% oxygen, and 3% nitrogen was determined.

Additional evidence for the overall turbostratic graphene-like nature of the material comes from powder x-ray diffraction patterns. In comparison to CND300, the (002) peak is shifted from 26.9° to 26.0° 2θ, indicating a separation of the individual layers. Moreover, an additional shoulder at 22.8° and a tail down to about 15° appear, which is expected for rotationally displaced stacked graphene layers.

Figure 7:
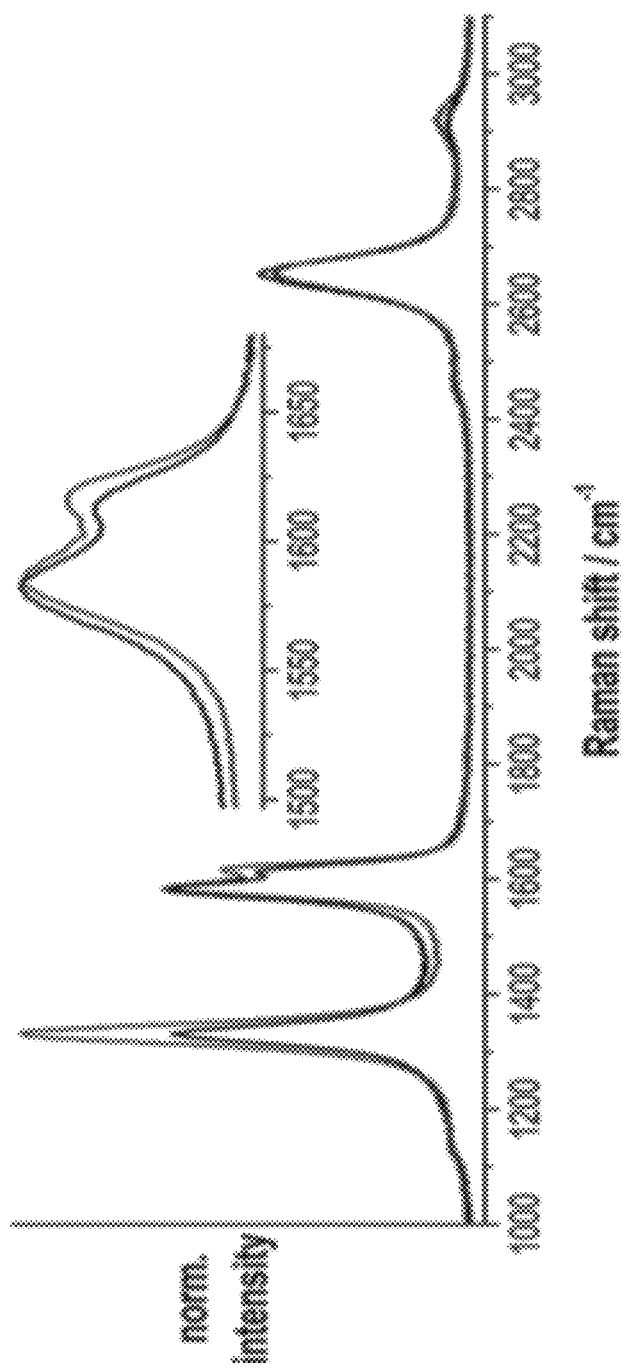
FIG. 7 shows Raman spectra of an exemplary laser-reduced graphene oxide lrGO reduced in argon and oxygen upon excitation at 633 nm, in accordance with some embodiments.

The Raman patterns of all samples show the same set of peaks, namely the D-, the G-, D', and G'-peak at ~1329, ~1578, ~1609, and ~2652 cm$^{-1}$, respectively, as seen in FIG. 7. The intensities of the D and D'-bands relate to defects in the graphitic lattice. Notably, samples reduced under oxygen, lrCND300(O$_2$), show a significantly enhanced D-band, indicating a higher number of defects. A bathochromic shift of the G-band of 3 cm$^{-1}$ from 1584 (lrCND300(O$_2$)) to 1581 cm$^{-1}$ (lrCND300(Ar)) is noted, indicating an increase in electron density when turning from O$_2$ to Ar as a reaction medium.

FIG. 7 shows Raman spectra of an exemplary laser-reduced graphene oxide lrGO reduced in argon and O$_2$ upon excitation at 633 nm, in accordance with some embodiments. As seen, the G-band may be sensitive to electron doping and the size of the crystalline domains, whereby a downshift of the G-band originates either from a shift of electron density into the conduction band of graphene/graphite or a higher degree of crystallinity of the sp$^2$-phases in the graphitic sample. In undoped graphite the G-band is typically located at about 1580 cm$^{-1}$. The oxygen-containing functional groups provide electron trap states and withdraw electron density from the conjugated sp$^2$-network.

Considering the smaller size of CND300 as a starting material, the resulting 3D-carbon network is expected to exhibit a more nanocrystalline nature. The presence of O$_2$ during the reduction of lrCND300 may lead to higher reaction temperatures and a higher conversion ratio of oxy-functionalized carbon into sp$^2$-carbon, resulting in a lower number of oxy-defects and a higher crystallinity. The impact of oxygen in the reaction environment on the resulting materials properties of lrCND300 may not be discernable. In lrCND300(Ar) the sheet conductivity is slightly higher with a conductivity of about 295 S/m compared with lrCND300(O2) having a conductivity of about 248 S/m.

Figure 8:
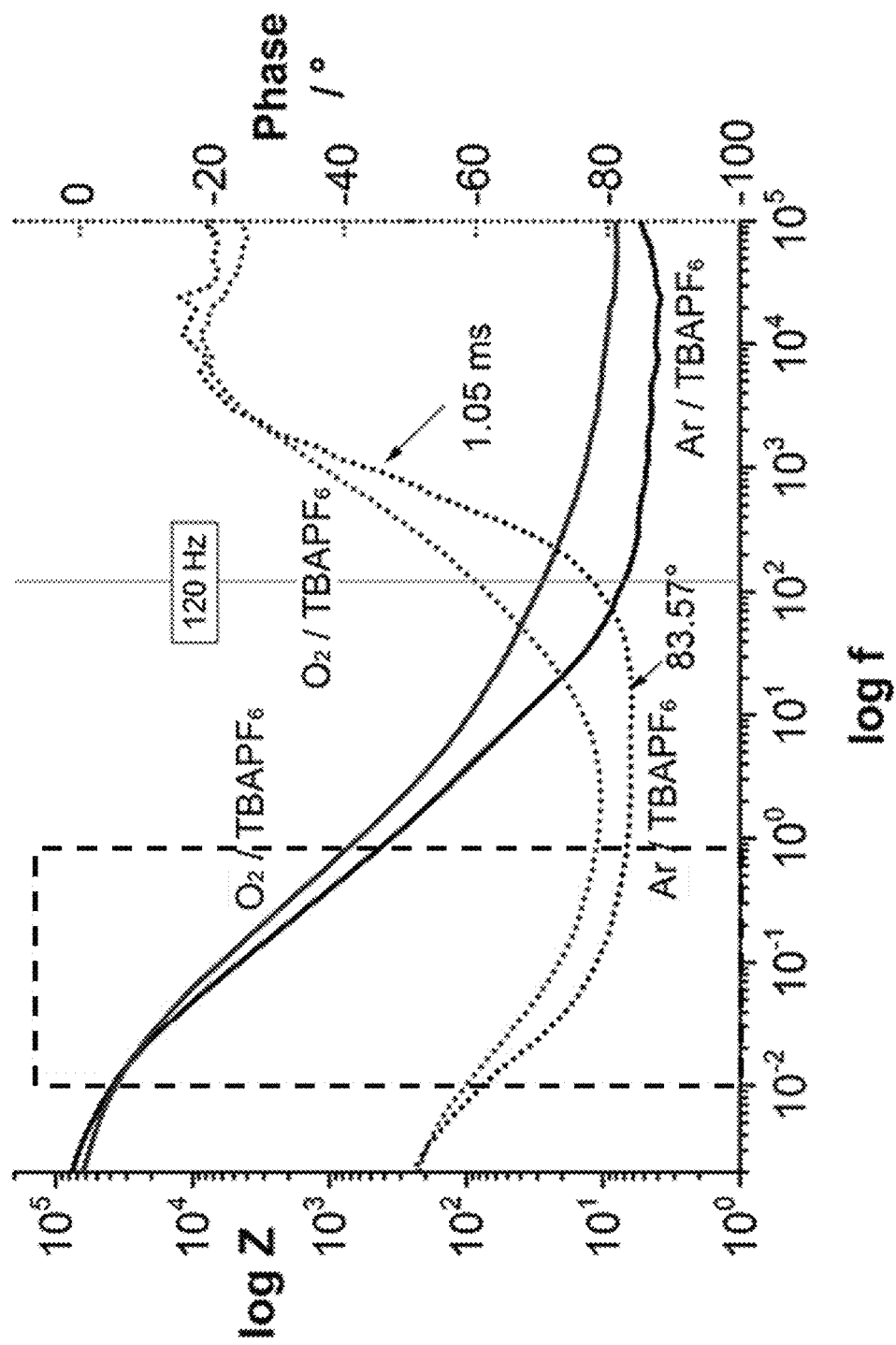
FIG. 8 shows Bode impedance plots of exemplary three double-layer capacitors coated with thin films of lrCND300 (Ar), and lrCND300($O_2$), in 0.1 M TBAPF$_6$/MeCN (tetrabutylammonium hexafluorophosphate/acetonitrile) as an electrolyte, in accordance with some embodiments.

FIG. 8 shows Bode impedance plots of exemplary three double-layer capacitors coated with thin films of lrCND300 (Ar), and lrCND300(O$_2$), in 0.1 M tetrabutylammonium hexafluorophosphate/acetonitrile (TBAPF$_6$/MeCN) as electrolyte, in accordance with some embodiments. The device performance in terms of capacitance, determined by cyclic voltammetry (CV) and frequency response, determined by electrochemical impedance spectroscopy, was measured in different electrolyte systems including a 6 M potassium hydroxide and 0.1 M TBAPF6/MeCN sealed symmetric capacitor assembly.

As seen, both supercapacitor assemblies with electrodes coated with thin films of lrCND300(O$_2$) and lrCND300(Ar) may show a purely capacitive behavior; however, the shape of the of the CV curve is more rectangular for lrCND300 (Ar) than for lrCND300(O$_2$). With lrCND300(O$_2$) higher capacitance is achieved, and the polarization effect displays a higher maximum phase angle of about 84° for lrCND300 (Ar) and about 79° for lrCND300(O$_2$). Significantly, low relaxation times of about 1.05 ms and about 1.95 ms were measured for lrCND300(Ar) and lrCND300(O$_2$), respectively. The frequency region for capacitive behavior is significantly higher for lrCND300(Ar) than for lrCND300 (O$_2$) as a phase angle of about 78° at 120 Hz is reached in lrCND300(Ar) and only about 60° in lrCND300(O$_2$).

Figure 9:
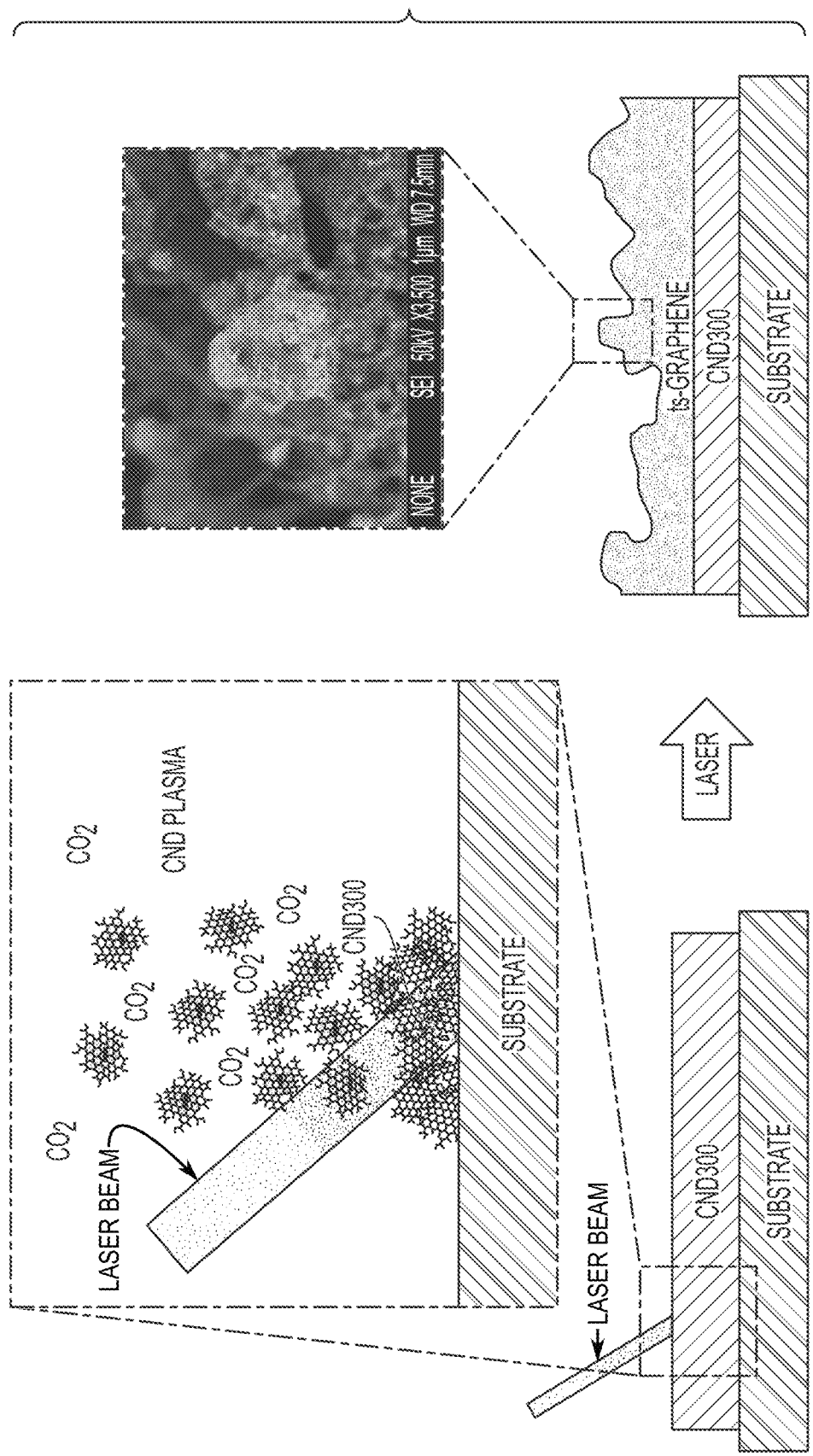
FIG. 9 is an illustration of an exemplary photolytic mechanism of CND300.

Visual inspection of the film displays a noticeable difference in the structures in the upper and the bottom layers, whereby, when the upper layer is scratched off, a brownish layer on the substrate remains, which contrasts with the soluble upper layer. Raman analysis of the bottom layer revealed that it may comprise unconverted CND300, whereby such a layer may be formed regardless of the substrate or the film thickness. An influence of the thermal conductivity of the substrate is ruled out, as the same results are obtained with different metal substrates, such as aluminum, gold, copper, or graphite, and with insulating substrates, such as polyethylene terephthalate, glass, or silicon dioxide. Based on these findings, a formation mechanism was hypothesized, as illustrated in FIG. 9, which form a porous 3D-ts-graphene network upon irradiation of the CNDs with a high-power infrared laser beam.

When CND300 is applied on the substrate, the polar groups on the surface may bind to the substrate via coordinative or hydrogen bonding. Laser irradiation may induce a decarboxylation of the upper lying CNDs similar to other carbon oxide materials. As the carbon dioxide is removed from the CND periphery, a reduced CND core remains. These reduced CNDs, when not bonded to the substrate, are mobile and react with other reduced CNDs by forming new C—C bonds. As such, the reduced CNDs form together with the CO$_2$ a CND plasma and react in colder zones. The flux of the hot plasma enables the formation of a hierarchical porous structure. A confirmation of the postulated mechanism is shown in the typical pillar-like 3D-ts-graphene in the SEM images.

The quality and the conversion ratio from CND300 to 3D-ts-graphene depends strongly on the laser power and, subsequently, on the energy input. An array of exemplary CND300 films were irradiated at different laser powers and subsequently analyzed by Raman spectroscopy. In the low laser power regime between about 4 W and about 8 W, the Raman spectroscopy may show no evidence for 3D-ts-graphene but may additionally show a decrease in the background fluorescence intensity, which may be attributed to the elimination of functional groups. At laser powers above about 8 W, CND300 is converted to 3D-ts-graphene. Notably, with increasing laser power the D- and G-peaks in the Raman spectra sharpen, and both defect-related peaks, namely, the D and D'-peak, considerably decrease in intensity. This shows a drastic improvement of the defect density in the converted 3D-ts-graphene. The bottom layer, however, remains in all samples unconverted. FIG. 10A shows a graph of the weight percentage of an exemplary material converted by the laser and the weight percentage of material remaining in the film after photolysis, whereby higher laser power may convert and remove more material, conversion being achieved using laser power of greater than about 12 W.

CND300 can be converted into 3D-ts-graphene even in bulk quantities. In an exemplary method of converting CND 300 to 3D-ts-graphene even in bulk quantities, photolyzed product of CND300 powder was collected in a separate vial and washed with NMP several times to remove unreacted material. The Raman spectrum of the exemplary washed bulk powder sample showed superimposed signals of turbostratic graphene with sharp D-, G-, D', and G'-bands at about 1323 cm$^{-1}$, 1570 cm$^{-1}$, 1604 cm$^{-1}$, and 2636 cm$^{-1}$ and an amorphous structure with broad D, D**, and G bands at about 1324 cm$^{-1}$, 1469 cm$^{-1}$, and 1574 cm$^{-1}$. The FWHM of the G' band in the exemplary bulk sample is about 74 cm$^{-1}$.

Electrochemical Characterization and Optimization

The hierarchical porous structure of the 3D-ts-graphene film enables a very high surface area that is accessible to solvents and electrolytes, whereby the electronic properties of the 3D-ts-graphene film are dependent on several parameters, including film thickness and laser power.

As shown in FIG. 10A, the conductivity of the graphene film scales with both the laser power and the conversion ratio. The conductivity of the film may depend on the interconnection between the converted carbon dots (CND300), which may be achieved by better interconnection of reduced CND300 within the plasma. In general, higher conductivity is achieved using higher laser power, whereas, a maximum conductivity of about 2.13 S/cm (213 S/m) for a single layer is achieved at a power of at least about 16 W. Films produced with a laser power of below about 12 W may show a very high internal resistance, due to a large amount of unconverted material. As such, increased power produces better interconnections due to the greater conversion from CND300 to 3D-ts-graphene at higher local temperatures. From the Raman spectra of the exemplary CND300 sample, conversion of CND300 is effective at a laser power of greater than about 8 W, and the quality of the graphene increases with higher laser power, as the defect induced D- and the D'-bands decrease.

However, excessive laser power may remove more material, due to higher local temperatures in the CND plasma and subsequently reduce the overall performance. Therefore, a laser power of between about 12 W and about 20 W is optimal to produce high-quality films. In one example, the highest possible material conversion occurs with three irradiations at a power of 12.8 W.

The conductivity of the film was further increased by two orders of magnitude to 198 S/cm by sequentially laser converting two or more layers to ensure the filling of the trenches milled in the first layer.

Exemplary electrodes were fabricated with a mass loading of about 0.05 mg on an area of about 1.8 cm$^2$ (0.03 mg/cm$^2$) and tested under real conditions in sealed coin cells with an electrolyte of 0.1 M solution of TBAPF6 in acetonitrile. Reference measurements with 1.0 M sulfuric acid as an electrolyte were conducted.

The cyclic voltammogram of an exemplary 3D-ts-graphene electrode has a pseudo-rectangular shape, shown in FIG. 10B, in an operating electrochemical window of 1 V, whereby the shape is retained at different scan rates between 0.1 V s$^{-1}$ and 100 V s$^{-1}$. Using the TBAPF6 electrolyte in acetonitrile, this pseudo-rectangular shape was retained in a larger voltage range up to 2.5 V. In this larger voltage window, the specific gravimetric (Cm) and volumetric (CV) capacitances were calculated to be Cm=9.3 F g$^{-1}$ and CV=31 mF cm$^{-3}$ at a scan rate of 0.1 V s$^{-1}$. This preferred capacitive behavior is also reflected in the pseudo-triangular shape of the galvanostatic charge-discharge curves, plotted in FIG. 10C, which is retained within a current density range between 50 A/g and 2000 A/g. After 20,000 cycles, the electrode retained about 94.6% of its capacitance. The gravimetric and areal capacitances as a function of the scan rate are shown in FIG. 10D for two exemplary 3D-ts-graphene cells having an electrode with one layer of 3D-ts-graphene and another with three sequentially applied layers. Upon sequentially applying three layers, the areal capacitance increases by a factor of about 3, whereby the additional material filled into the laser-milled trenches of the first layer, decreasing the overall average pore size and thus increasing the areal capacitance.

A very small internal resistance drop of the three-layer cell of only about 0.02 V at a current density of 100 A g$^{-1}$ is observed at the beginning of the discharge curves, from which is derived an equivalent series resistance of about 4.05Ω. This value is confirmed in the electrochemical impedance spectroscopy data shown in FIGS. 10E and 10F. The Nyquist plot in FIG. 10E presents a direct comparison the two exemplary 3D-ts-graphene electrochemical capacitors with one or three sequentially applied layers for the frequency range between 100 kHz and 0.1 MHz. In both exemplary electrodes, no semicircles are observed in the high-frequency region, indicating essentially no charge-transfer resistance.

Figure 11:
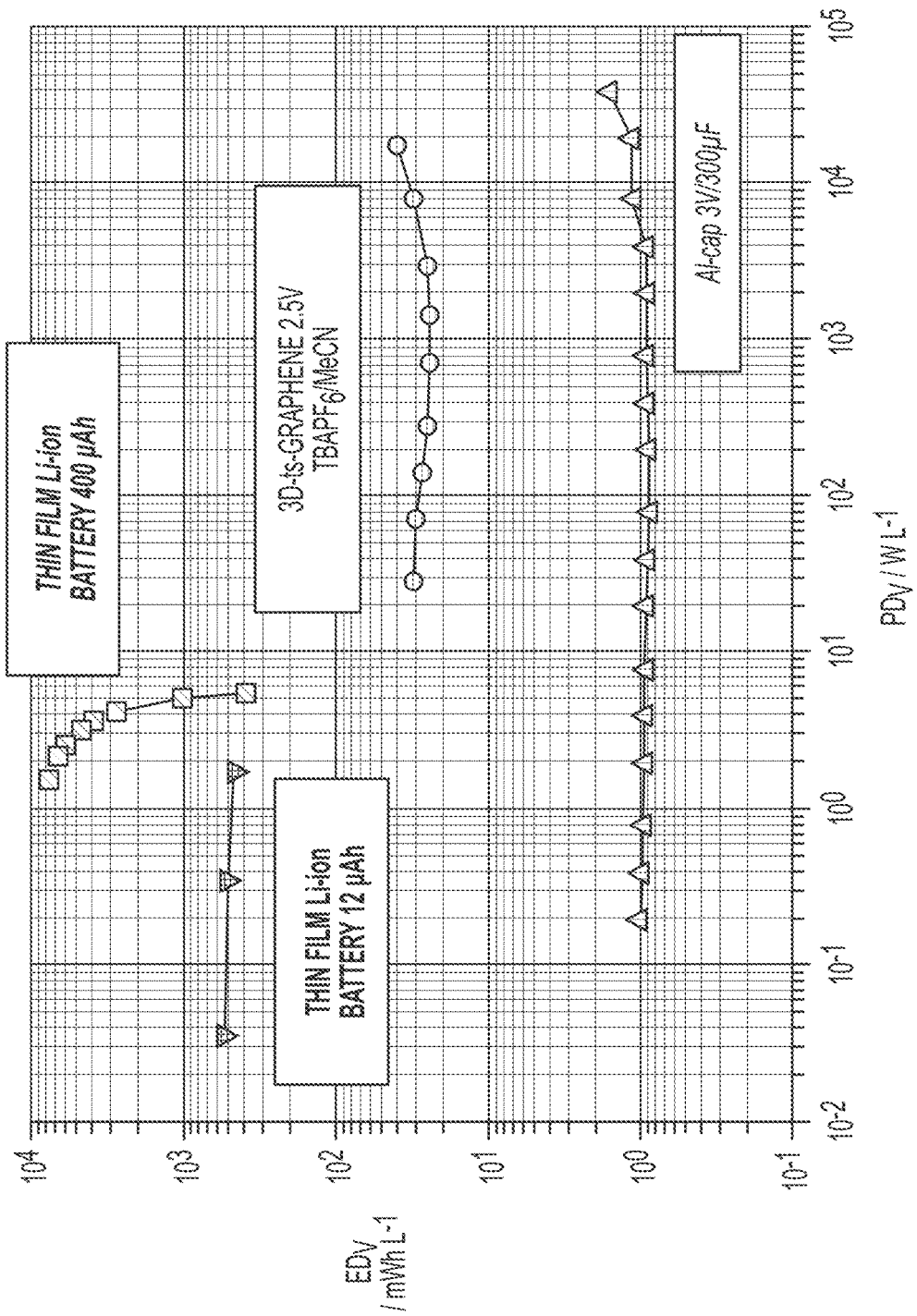
FIG. 11 is a graph of volumetric specific energy and power densities of an exemplary 3D-ts-graphene cell with a 1.0 M tetrabutylammonium TBAPF$_6$/MeCN electrolyte, and of commercial energy storage devices, in accordance with some embodiments.

In FIG. 10F the electrochemical impedance data of an exemplary three-layer 3D-ts-graphene cell are compared with a commercial activated carbon-based capacitor. Notable is the fast charge-discharge rate of the 3D-ts-graphene cell with a relaxation time of about 3.44 ms (291 Hz at a phase angle=45°). A gravimetric specific energy density of about 7.5 Wh/kg at a power density of about 864 kW/kg was determined. These values are comparable to other open porous carbon structures such as carbon foams and holey graphene. In terms of volumetric parameters, the cells exhibit good performance as demonstrated in the energy vs. power density plot in FIG. 11. In comparison to a commercial aluminum-based capacitor, the 3D-ts-graphene cell has a similar charge-discharge rate but a much higher energy density.

Overall, the electrochemical cells based on 3D-ts-graphene electrodes show promising behavior for applications in supercapacitors, in particular, with regard to the simplicity of the preparation process. Improvements in terms of capacitance are expected to be achievable by increasing the specific surface areas, which are low in comparison to values of 1405 m$^2$/g obtained for activated carbon.

Figure 12:
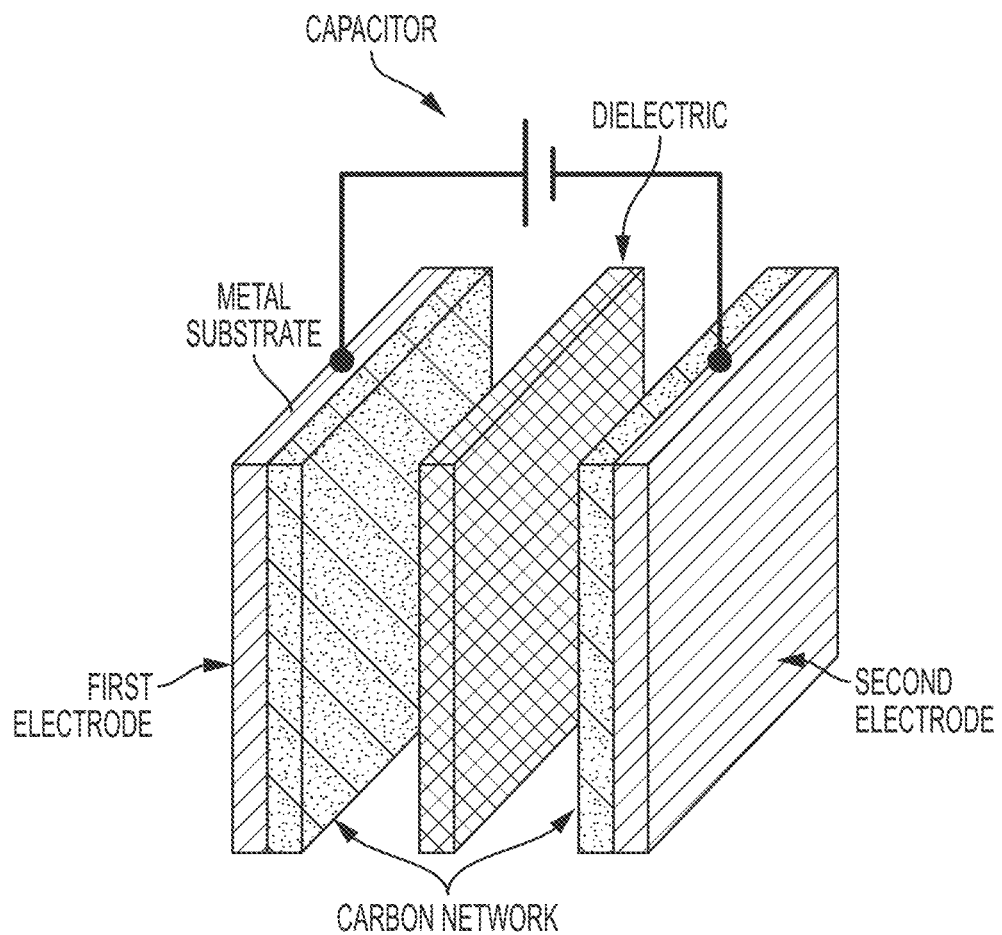
FIG. 12 is a diagram of an exemplary supercapacitor having electrodes comprising a carbon network, in accordance with some embodiments.
Figure 13:
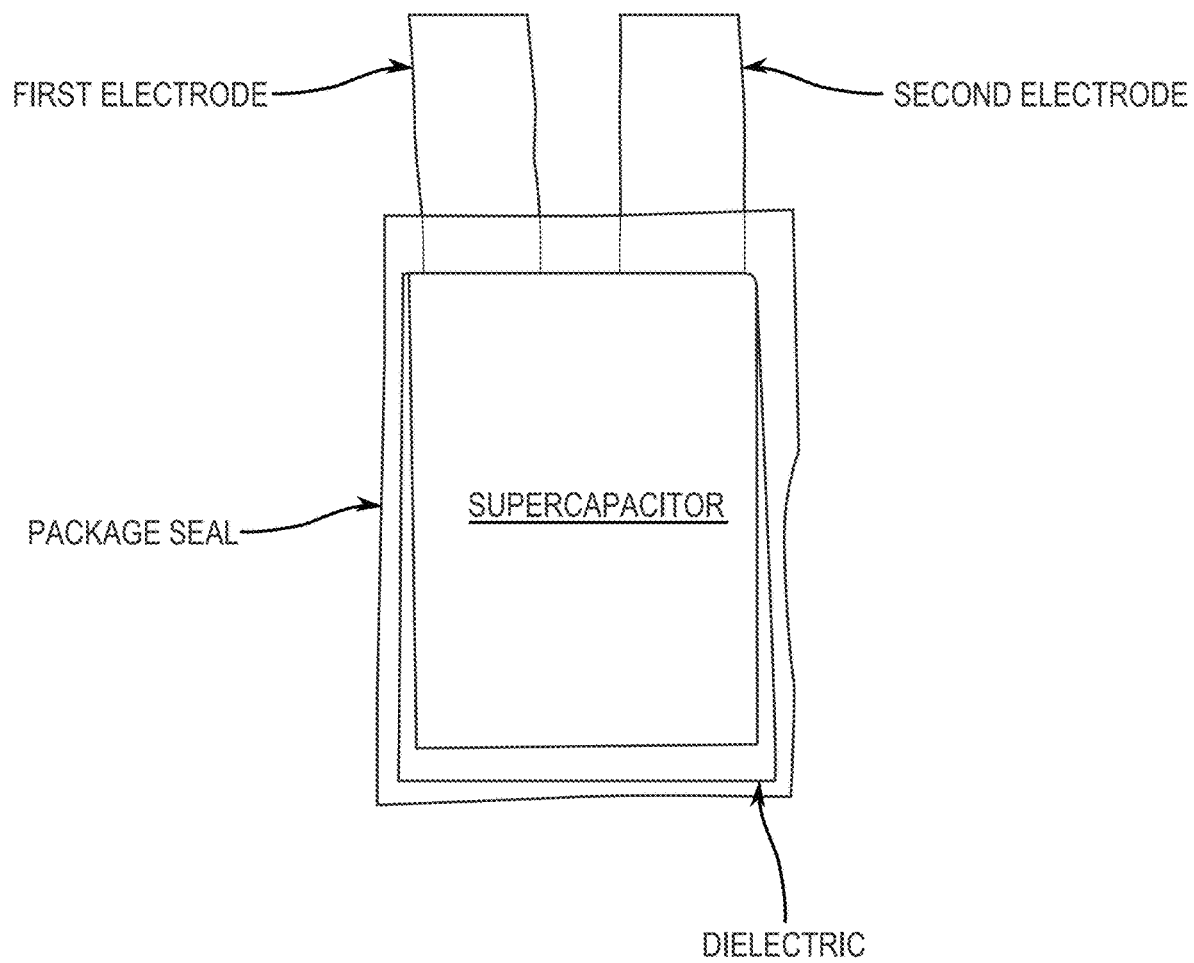
FIG. 13 is an illustration of an exemplary supercapacitor comprising a carbon network disposed onto flexible metal foil substrates with a flexible dielectric separator, in accordance with some embodiments.

FIG. 12 is a diagram of an exemplary supercapacitor having electrodes comprised of the carbon network of the present disclosure. FIG. 13 is an illustration of a realized supercapacitor fabricated in accordance with the present disclosure.

As such, provided herein are 3D-turbostratic graphene networks and methods of forming 3D-turbostratic graphene networks by combining thermolysis and infrared laser treatment of bottom-up synthesized carbon nanodots based on citric acid and urea, whereby increasing infrared temperature treatment removes the functional groups on the surface of the CNDs, and hydroxyls convert to epoxy groups. During subsequent laser treatment, the thermolyzed CNDs are converted to 3D-ts-graphene networks. The hierarchical porous network forms in the flux of a hot CND plasma containing reduced CNDs and $CO_2$, which both form upon decarboxylation of thermolyzed CNDs in the laser beam. Electrodes based on exemplary 3D-ts-graphene networks show promising capacitive performance with specific gravimetric capacitances of 9.37 F g$^{-1}$ obtained at 0.1 V s$^{-1}$, tunable areal capacitances, and extremely fast charging rates with a relaxation time of 3.44 ms. The method herein of forming the three-dimensional graphene networks is simple and allows for the one-step fabrication of three-dimensional graphene materials using inexpensive small molecular precursors. Moreover, the laser-assisted technique enables the production of patterned surfaces with very small feature sizes that is currently under investigation for potential applications.

EXAMPLES

Example 1—Carbon Nanodot Synthesis

Citric acid (5 g) and urea (5 g) were dissolved in deionized water (7.5 mL). A beaker with the reaction mixture was heated in a domestic microwave (700 W) until the solvent was evaporated. The reaction conducted at different scales yields the same products. In all experiments the ratio between citric acid and urea was kept constant. The CNDs from this reaction were thermolyzed at different temperatures between 175° C. and 800° C. in a tube furnace. The reaction vessel, typically quartz or alumina, containing the as-synthesized CNDs, was placed in the center of the tube furnace. The furnace was heated to the final temperature with a heating rate of 6 K/min and kept at the final temperature for 2 h. A gas flow of argon, nitrogen, or air was used to remove gaseous reaction products.

Example 2—Electrode Fabrication

A laser-reaction chamber, per FIG. 2, was fabricated comprising a gas inlet opposite to the gas outlet, and a two-inch zinc selenide window in the lid. A sample was placed in the center of the chamber. A $CO_2$ laser (10.6 μm) was emitted into the gas-reaction chamber through the window while a continuous gas current of 0.1 L/s was inserted into the gas inlet during the reaction.

Example 3—Electrode Fabrication

Carbon nanodots or thermolyzed CNDs (CND300) were dissolved in NMP to obtain highly viscous slurries with a CND/NMP ratio of 40/60. The slurry was cast onto the substrate by doctor blading. Next, the wet film was dried on a hotplate at 200° C. The dry film was irradiated with a 40 W $CO_2$ laser (10.6 μm) using a full spectrum laser engraver at different power settings. Two additional layers of CND300 were sequentially applied and laser-converted. Powder samples of laser-converted CND300 (3D-ts-graphene) were collected from the converted films in vials and washed with NMP. The solvent was added to the sample, the suspension was stirred for 30 min, and then the suspension was centrifuged. After centrifugation, the supernatant containing unreacted CND300 was removed and the precipitate was repeatedly washed until the supernatant was clear. Electrochemical capacitors were assembled in two-electrode configurations in coin cells with electrode diameters of 15 mm. The electrodes were fabricated either directly on stainless steel spacers, typically used in coin cells, or on aluminum foil. Alumina-coated polyethylene membranes were used as separators.

Example 4—Characterization

Fourier-transform infrared spectroscopy was conducted on a FT/IR-4100 FT-IR Spectrometer from Jasco with a single reflection ATR unit attached. X-ray diffraction patterns were recorded on a D8 Discover powder X-ray diffractometer from Bruker using CuKα radiation (λ=1.5406 Å). Raman spectra were recorded with a Renishaw InVia Raman Microscope in either individual spectrum mode or mapping mode. Scanning electron microscopy was conducted on a FEI Nova 230 Nano SEM with an electron acceleration voltage of 3 or 5 kV. Samples were prepared on conductive substrates, either aluminum or copper foil. Transmission electron microscopy was conducted on a T12 TEM from FEI at an acceleration voltage of 120 kV. Transmission electron microscopy samples were prepared by drop-casting 5 µL diluted dispersions of 3D-ts-graphene powder in ethanol onto Lacey-carbon supported TEM grids. X-ray photoelectron spectroscopy spectra were recorded using a Kratos Axis Ultra DLD spectrometer equipped with a monochromatic Al Kα X-ray source (hv=1486.6 eV). High-resolution spectra were calibrated using carbon tape (Ted Pella) with a known C1s binding energy of 284.6 eV. Raw data were processed using CasaXPS software (version 2.3.16). C1s spectra were fit using Gaussian-Lorentzian line-shapes for all spectral components except for the sp² C—C component, which was fitted with an asymmetric line shape to reflect the metallic character of the respective samples.

Example 5—Determination of the Active Surface Area

The active surface area of CND300 and 3D-ts-graphene was determined by the methylene blue adsorption method. In brief, certain amounts of CND300 or 3D-ts-graphene were stirred in solutions of methylene blue (MB) in deionized water with known concentrations for 24 h. The solutions were then centrifuged at 16 kG to remove any suspended material. The number of MB molecules adsorbed to the surface was calculated from the difference in absorption at 665 nm with respect to the reference solution. Every MB molecule is assumed to occupy 1.35 nm² of the active surface area. Activated carbon was used as a reference. For all experiments involving MB, polypropylene beakers and vials were used.

Example 6—Electrochemical Characterization

Electrochemical characterizations were carried out with a Biologic VMP3 electrochemical workstation. Conductivity measurements were performed with a laser converted film on a silicon substrate. Solution-based measurements were conducted with a three-electrode setup using an Ag/Ag+ reference electrode and a platinum wire counter electrode. Electrochemical capacitors were assembled in coin cells with electrode diameters of 15 mm and tested under sealed conditions. The volumetric capacitance (CV) and gravimetric capacitance ($C_m$) are as follows:

$$C_m = \frac{I}{m \cdot \left(\frac{dV}{dt}\right)}, \quad C_V = \frac{I}{V \cdot \left(\frac{dV}{dt}\right)} \quad (1)$$

or by integration of the CV curves according to the following formula:

$$C_m = \frac{\int I dV}{2vm(E_1 - E_0)}, \quad C_V = \frac{\int I dV}{2vV(E_1 - E_0)}, \quad (2)$$

where $\int I\, dV$ is the area of the CV curve between 0 V and 1 V, v is the scan rate in V s⁻¹, V is the volume of the electrodes in cubic centimeters, m is the mass of the active electrode material, and ($E_1-E_0$) is the potential scan window in volts. The specific gravimetric or volumetric energy densities were calculated according to the following:

$$E_m = \frac{C_m \cdot (\Delta V)^2}{2 \cdot 3600}, \quad E_V = \frac{C_V \cdot (\Delta V)^2}{2 \cdot 3600} \quad (3)$$

The specific gravimetric or volumetric power densities were obtained using the following:

$$P_m = \frac{E_m \cdot \left(\frac{dV}{dt}\right) \cdot 3600}{\Delta V}, \quad P_V = \frac{E_V \cdot \left(\frac{dV}{dt}\right) \cdot 3600}{\Delta V}. \quad (4)$$

Those skilled in the art will recognize improvements and modifications to the present disclosure. All such improvements and modifications are considered within the scope of the concepts disclosed herein.

Terms and Definitions

Unless otherwise defined, all technical terms used herein have the same meaning as commonly understood by one of ordinary skill in the art to which this disclosure belongs.

As used herein, the singular forms "a," "an," and "the" include plural references unless the context clearly dictates otherwise. Any reference to "or" herein is intended to encompass "and/or" unless otherwise stated.

As used herein, the term "about" refers to an amount that is near the stated amount by 10%, 5%, or 1%, including increments therein. As used herein, the term "about," when used in reference to a percentage, refers to a percentage within plus or minus 10%, 5%, or 1%, from the listed value, including increments therein.

As used herein, the term "carbonization" refers to a description for a myriad of complex processes occurring during the oxidation of biomaterials.

As used herein, the term "turbostratic graphene" refers to a graphene structure comprising a plurality of layers, having a relative rotation between at least two of the layers.

As used herein, the term "dielectric" refers to an electrical insulator that can be polarized by an applied electric field.

What is claimed is:

1. An energy storage device comprising:
   a. a first electrode; and
   b. a second electrode separated from the first electrode by a dielectric, wherein at least one of the first electrode and the second electrode comprises a 3D turbostratic graphene network comprising a plurality of carbon nanodots interconnected through carbon-carbon bonds, and wherein the energy storage device has a charge-discharge cycling rate time constant of at most about 8 milliseconds.

2. The energy storage device of claim 1, wherein the 3D turbostratic graphene network is porous.

3. The energy storage device of claim 2, wherein the 3D turbostratic graphene network has an average pore size of about 10 nanometers (nm) to about 10,000 nm.

4. The energy storage device of claim 3, wherein the 3D turbostratic graphene network has an elemental composition of about 90% carbon, about 8% oxygen, and nitrogen.

5. The energy storage device of claim 2, wherein the 3D turbostratic graphene network comprises a spongy hierarchical porous structure.

6. The energy storage device of claim 2, wherein the pores are separated by carbon walls consisting of layers of graphene.

7. The energy storage device of claim 1, wherein the at least one of the first electrode and the second electrode has an active surface area of at least about 100 square meters per gram.

8. The energy storage device of claim 1, wherein the at least one of the first electrode and the second electrode has an electrical conductivity of at least about 200 siemens per meter.

9. The energy storage device of claim 1, having an energy density of at least about 3 watt-hours per kilogram at a power density of at least about 860 kilowatts.

10. The energy storage device of claim 1, having a specific gravimetric capacitance of at least about 4 farads per gram.

11. The energy storage device of claim 1, having a specific volumetric capacitance of at least about 30 millifarads per cubic centimeter.

12. The energy storage device of claim 1, retaining at least about 94% capacitance after about 20,000 charge-discharge cycles.

13. The energy storage device of claim 1, wherein the 3D turbostratic graphene network has a Raman spectrum comprising a D band at about 1323 $cm^{-1}$, a G band at about 1570 $cm^{-1}$, a D' band at about 1604 $cm^{-1}$, and a G' band 2636 $cm^{-1}$.

14. The energy storage device of claim 13, wherein G' band has a full width at half maximum of about 74 $cm^{-1}$.

15. The energy storage device of claim 13, wherein the at least one of the first electrode and the second electrode comprises an amorphous carbon structure having a Raman spectrum comprising a D band at about 1324 $cm^{-1}$, a D** band at about 1468 $cm^{-1}$, and a G band at about 1574 $cm^{-1}$.

16. The energy storage device of claim 1, wherein the 3D turbostratic graphene network has a Raman spectrum comprising a D band at about 1324 $cm^{-1}$, a G band at about 1582 $cm^{-1}$, a D' band at about 1617 $cm^{-1}$, and a G' band 2655 $cm^{-1}$.

17. The energy storage device of claim 16, wherein the Raman spectrum further comprises a D+D" band at about 2461 $cm^{-1}$ and a D+G band at about 2922 $cm^{-1}$.

18. A 3D turbostratic graphene network comprising a plurality of carbon nanodots interconnected through carbon-carbon bonds, having an active surface area of at least about 230 square meters per gram and an electrical conductivity of at least about 200 siemens per meter, wherein the 3D turbostratic graphene network is configured to provide an energy storage device with a charge-discharge cycling rate time constant of at most about 8 milliseconds.

19. The 3D turbostratic graphene network of claim 18, wherein the 3D turbostratic graphene network is porous and has an average pore size of about 10 nanometers (nm) to about 100,000 nm.

20. The 3D turbostratic graphene network of claim 18, wherein the 3D turbostratic graphene network has an elemental composition of about 89% carbon, about 8% oxygen, and nitrogen.

21. The 3D turbostratic graphene network of claim 18, wherein the 3D turbostratic graphene network comprises a spongy hierarchical porous structure.

22. The 3D turbostratic graphene network of claim 18, wherein the 3D turbostratic graphene network is porous and has pores separated by carbon walls consisting of layers of graphene.

23. The 3D turbostratic graphene network of claim 18, having an active surface area of at least about 240 square meters per gram.

24. The 3D turbostratic graphene network of claim 18, having an electrical conductivity of at least about 220 siemens per meter.

25. The 3D turbostratic graphene network of claim 18, having a Raman spectrum comprising a D band at about 1323 $cm^{-1}$, a G band at about 1570 $cm^{-1}$, a D' band at about 1604 $cm^{-1}$, and a G' band 2636 $cm^{-1}$.

26. The 3D turbostratic graphene network of claim 18, wherein the 3D turbostratic graphene network has a Raman spectrum comprising a D band at about 1324 $cm^{-1}$, a G band at about 1582 $cm^{-1}$, a D' band at about 1617 $cm^{-1}$, and a G' band 2655 $cm^{-1}$.

27. The 3D turbostratic graphene network of claim 26, wherein the Raman spectrum further comprises a D+D" band at about 2461 $cm^{-1}$ and a D+G band at about 2922 $cm^{-1}$.

* * * * *